(12) United States Patent
Colchester et al.

(10) Patent No.: US 10,696,037 B2
(45) Date of Patent: Jun. 30, 2020

(54) APPARATUS AND METHOD FOR FABRICATION OF THREE-DIMENSIONAL OBJECTS

(71) Applicant: SYNCRONETICS, INC., Costa Mesa, CA (US)

(72) Inventors: Deon Nel Colchester, Huntington Beach, CA (US); Geoffrey Methuen Nel, Huntington Beach, CA (US); Gregory Evan Nel, Northridge, CA (US)

(*) Notice: Subject to any disclaimer, the term of this patent is extended or adjusted under 35 U.S.C. 154(b) by 190 days.

(21) Appl. No.: 15/499,891

(22) Filed: Apr. 28, 2017

(65) Prior Publication Data

US 2017/0313049 A1  Nov. 2, 2017

Related U.S. Application Data

(60) Provisional application No. 62/329,177, filed on Apr. 28, 2016.

(51) Int. Cl.
*B29C 64/245* (2017.01)
*B29C 64/295* (2017.01)
*B33Y 30/00* (2015.01)

(52) U.S. Cl.
CPC ............ *B33Y 30/00* (2014.12); *B29C 64/245* (2017.08); *B29C 64/295* (2017.08)

(58) Field of Classification Search
CPC ....... B33Y 30/00; B33Y 10/00; B29C 64/295; B29C 64/25; B29C 64/245; B29C 64/255; B29C 64/20
See application file for complete search history.

(56) References Cited

U.S. PATENT DOCUMENTS

| | | | | |
|---|---|---|---|---|
| 8,070,473 | B2 * | 12/2011 | Kozlak | B29C 70/70 425/375 |
| 8,827,684 | B1 * | 9/2014 | Schumacher | B29C 64/20 425/375 |
| 2017/0151704 | A1 * | 6/2017 | Go | B33Y 10/00 |

* cited by examiner

*Primary Examiner* — Nahida Sultana
*Assistant Examiner* — Debjani Roy
(74) *Attorney, Agent, or Firm* — Peter Ganjian; Patent Law Agency, LLC

(57) ABSTRACT

A digital fabrication apparatus with rigid frame for large built volume three-dimensional (3D) objects.

11 Claims, 88 Drawing Sheets

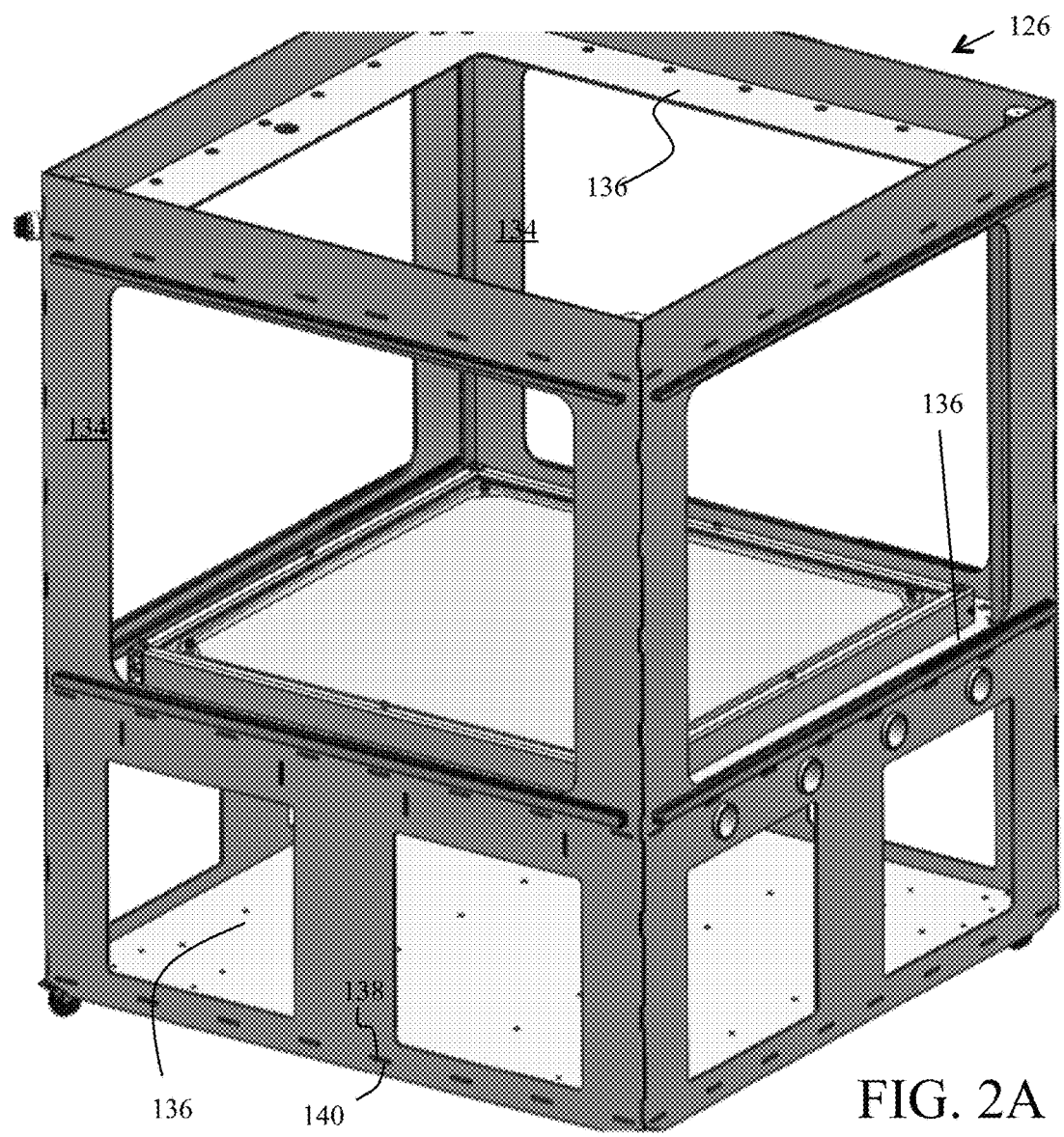
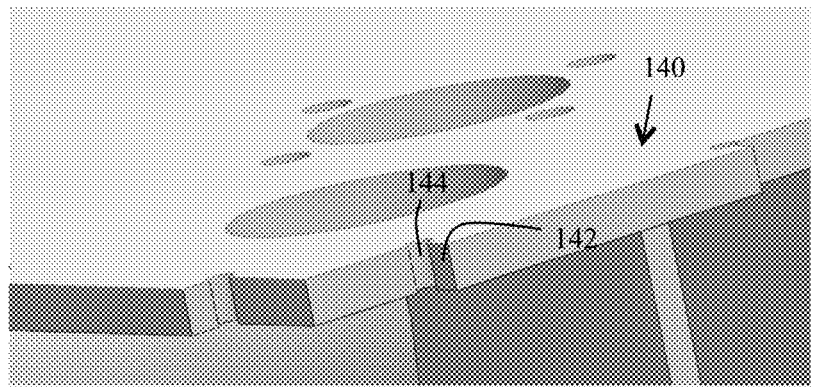
FIG. 2A
FIG. 2B

214

240

APPARATUS AND METHOD FOR FABRICATION OF THREE-DIMENSIONAL OBJECTS

CROSS-REFERENCE TO RELATED APPLICATIONS

This Application claims the benefit of priority of co-pending U.S. Utility Provisional Patent Application 62/329,177, filed 28 Apr. 2016, the entire disclosure of which is expressly incorporated by reference in its entirety herein.

All documents mentioned in this specification are herein incorporated by reference to the same extent as if each individual document was specifically and individually indicated to be incorporated by reference.

It should be noted that throughout the disclosure, where a definition or use of a term in any incorporated document(s) is inconsistent or contrary to the definition of that term provided herein, the definition of that term provided herein applies and the definition of that term in the incorporated document(s) does not apply.

BACKGROUND OF THE INVENTION

Field of the Invention

One or more embodiments of the present invention are related to apparatus and method for fabrication, manipulation, or modification of large built-volume three-dimensional (3D) objects.

Description of Related Art

Conventional 3D printers are well known and have been in use for a number of years. Regrettably, most conventional small sized entry-level 3D printers are designed for an average approximate built-volume of about 6"×6"×6". Unfortunately, conventional small sized entry-level 3D printers use conventional subsystems and components (e.g., frame, drive systems, heating systems, power requirements, control systems, etc.) that are specifically designed for smaller sized built-volumes and not suited for and in fact, not even scalable for larger built-volume fabrications. For example, conventional small sized entry-level 3D printers use a toothed belt drive system for moving a printer-head short distances, but toothed belt drive systems are not suited for actuation and correct positioning of the printer-head at long travel distances due to greater degree of belt-play such as belt-whip or belt-lag caused by longer drive belts. In fact, belt drive systems in general are not well suited for correct positioning of a print head whether for short or long travel distances.

Unfortunately, today's so-called "larger" 3D printers (average approximate built-volume of about 18"×18"×8"), use technologies that are based on traditional Computer Numerical Control (CNC) machines, which are very costly. CNC machines are engineered to apply and to withstand large forces required for a tool that must contact and remove material from a workpiece by cutting, carving, machining, drilling, grinding, milling, etc. Given the large forces required, CNC machines use complex closed-loop control systems for correctly moving and positioning the tool so that it does not "crash" into the workpiece, causing catastrophic damage to the workpiece and possibly to the CNC machine itself.

Further, conventional 3D printers based on traditional CNC machines technologies require the use of proprietary software that recognize proprietary packaged filament materials ("printer cartridge" or canister) used for fabrication of 3D objects. Accordingly, as with inkjet printers, consumers are locked into specific venders for purchasing proprietary packaged filament materials for fabricating their products when using 3D printers based on CNC machine technologies.

Accordingly, in light of the current state of the art and the drawbacks to 3D printers mentioned above, a need exists for an apparatus and a method for fabrication, manipulation, and modification of three-dimensional objects that would allow scalable for large built-volumes, but without reliance on costly CNC machine based technologies.

BRIEF SUMMARY OF THE INVENTION

A non-limiting, exemplary aspect of an embodiment of the present invention provides digital fabrication apparatus, comprising:

a frame having a frame longitudinal axis and a frame transverse axis;

first frame members that are parallel the frame longitudinal axis, forming vertically oriented frame members that form the sides of the frame;

second frame members that are parallel the frame transverse axis, forming horizontally oriented frame members;

wherein: combination of vertically oriented frame members and horizontally oriented frame members sectionalize the frame, forming frame sections.

These and other features and aspects of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" may be used to mean "serving as an example, instance, or illustration," but the absence of the term "exemplary" does not denote a limiting embodiment. Any embodiment described as "exemplary" is not necessarily to be construed as preferred or advantageous over other embodiments. In the drawings, like reference character(s) present corresponding part(s) throughout.

DETAILED DESCRIPTION OF THE INVENTION

Figure 1A:
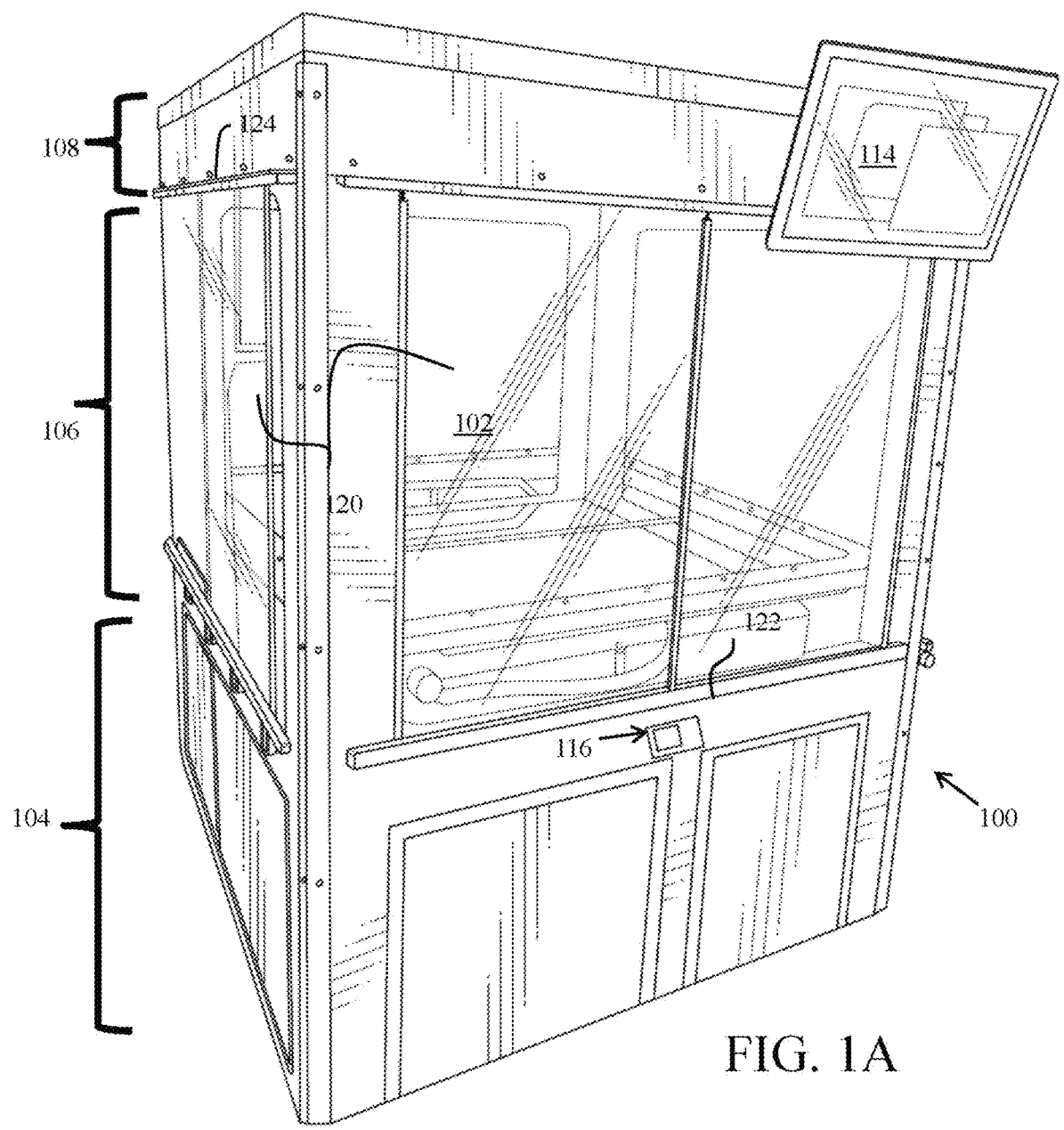
FIGS. 1A to 1C are non-limiting overview illustrations of a digital fabrication apparatus for fabrication of 3D workpiece in accordance with one or more embodiments of the present invention.

The detailed description set forth below in connection with the appended drawings is intended as a description of presently preferred embodiments of the invention and is not intended to represent the only forms in which the present invention may be constructed and or utilized.

It is to be appreciated that certain features of the invention, which are, for clarity, described in the context of separate embodiments, may also be provided in combination in a single embodiment. Conversely, various features of the invention that are, for brevity, described in the context of a single embodiment may also be provided separately or in any suitable sub-combination or as suitable in any other described embodiment of the invention. Stated otherwise, although the invention is described below in terms of various exemplary embodiments and implementations, it should be understood that the various features and aspects described in one or more of the individual embodiments are not limited in their applicability to the particular embodiment with which they are described, but instead can be applied, alone or in various combinations, to one or more of the other embodiments of the invention.

Throughout the disclosure, references to a three dimensional (3D) printer are meant as illustrative, convenience of example, and for discussion purposes only. That is, the applications of the present invention should not be limited to (3D) printers but may also be used (without much modifications, if any) for other purposes that may require a defined two- or three-dimensional path. Non-limiting, non-exhaustive listing of examples of other applications may include, for example, laser etching or marking or cutting, part measurement for reverse engineering purposes using various metrology tools, the 3D scanning of components using 3D scanners, or light to medium duty machining processes such as routing, drilling, or the application of sprayed materials such as paint, or the mounting of remotely controllable camera or video equipment to support for instance, process analysis or the development of training materials.

For the purposes of the present invention, the use of the terms fabricate (or its derivatives thereof such as fabrication) and create, manufacture, produce, construct, build, form, or fashion are equivalent and interchangeable.

The term coordinate may refer to each of a group of numbers used to indicate the position of a point in three-dimensional space.

As indicated above, CNC machine technology is costly. The present invention has recognized that 3D printers do not remove material from a workpiece for fabrication of a product. Further, 3D printers do not have a tool to physically contact a workpiece at a required minimum force to remove materials from the workpiece for fabrication of a product.

The tool for fabrication of a product using a 3D printer adds or builds-up material layers for fabrication of a product and hence, does not need or require application of or resistance to large forces needed for removing material from the workpiece as is required by CNC machine. Accordingly, the present invention has recognized that the general operational principle of a 3D printer in fabrication of a desired product is the opposite of that of a CNC machine. Therefore, application of CNC machine technology is not appropriately suited in 3D printing environment, which is the reason for costly "large" size printers based on CNC machine technologies.

A 3D printer fabricates products based on build-up of material layers whereas a CNC machine fabricates products based on removal of material from an existing workpiece, requiring large forces for the CNC tool. Accordingly, one or more embodiments of the present invention provide an apparatus and a method for fabrication of three-dimensional objects without using CNC machine technologies (if any) to reduce costs without sacrifice in correct positioning of a moveable fabrication tool such as a "print head" at a desired location within a three-dimensional space.

As detailed below, an important aspect in providing the capability to correctly position a moveable fabrication tool at a desired location within a very large three-dimensional (3D) space for a large build-volume (e.g., 80"×80"×80") that may also be scalable (without much modifications, if any) to even a larger 3D build-volume at very low cost is to provide an apparatus that has an extremely accurate build rigid frame at low cost.

As further detailed below, another important aspect in providing the capability to correctly position the moveable fabrication tool a large build-volume workpiece is to provide the flexibility in terms of tolerances needed to compensate for inherent operational variations of various components.

Figure 1B:
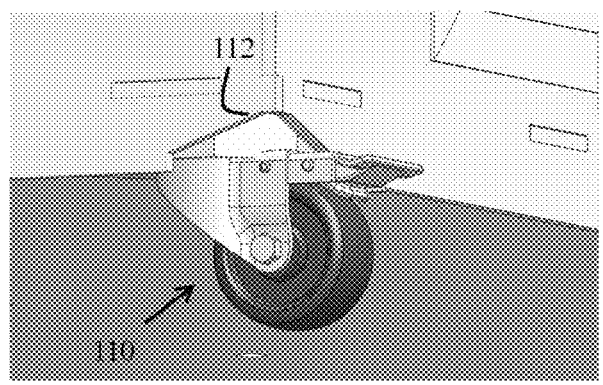
Figure 1C:
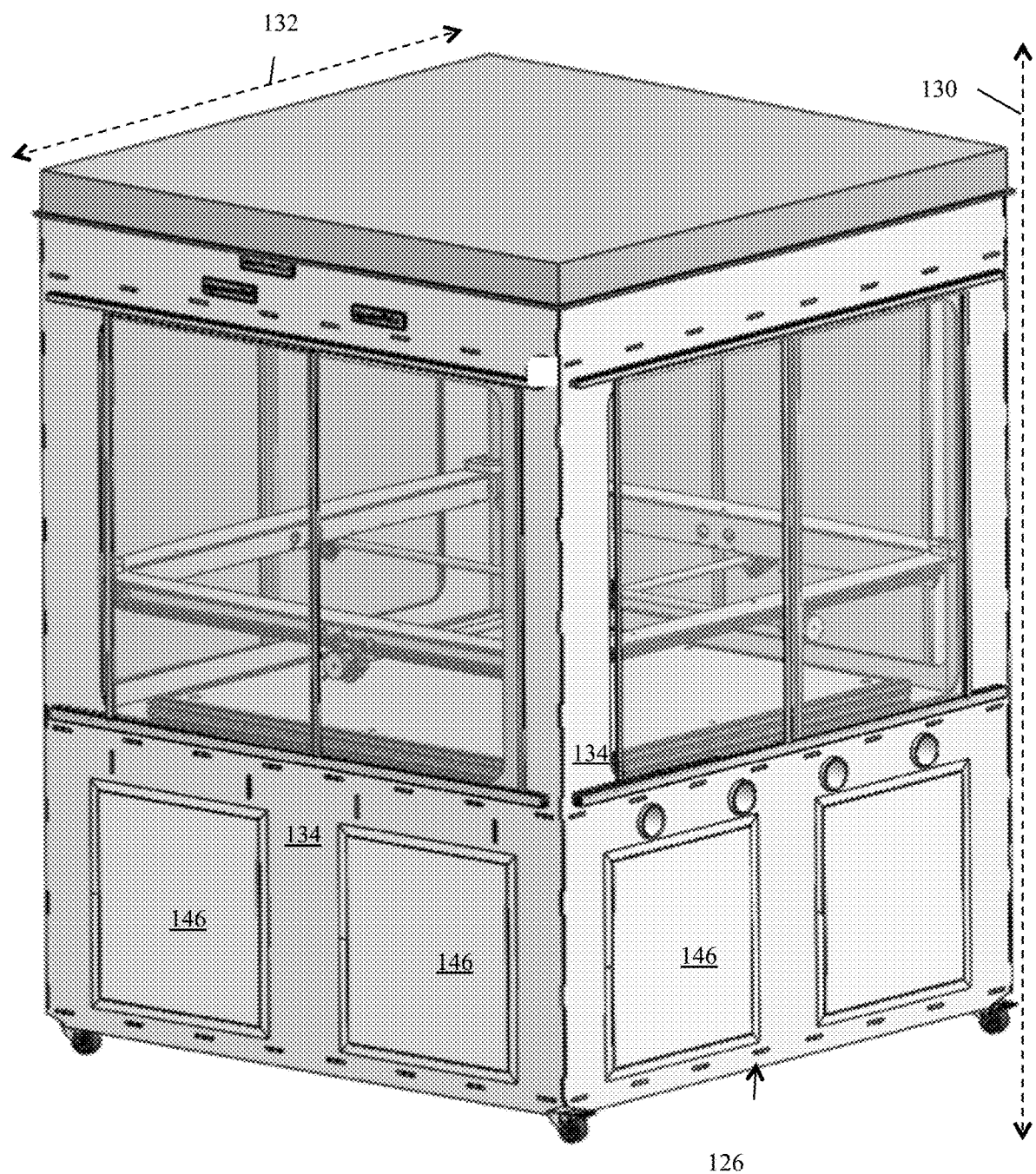

FIGS. 1A to 1C are non-limiting overview illustrations of a digital fabrication apparatus for fabrication of 3D workpiece in accordance with one or more embodiments of the present invention. As illustrated, digital fabrication apparatus 100 includes a large 3D space 102 for a large build-volume of about 80"×80"×80".

As further detailed below, digital fabrication apparatus 100 may be generally described as having a lower or first section 104 for storage of components, a generally middle or second section 106 that defines the work-space for fabricating a 3D workpiece, and a top or third section 108 that houses various other components, including some of the components that constitute the Z-direction motive force mechanisms.

Figure 4A:
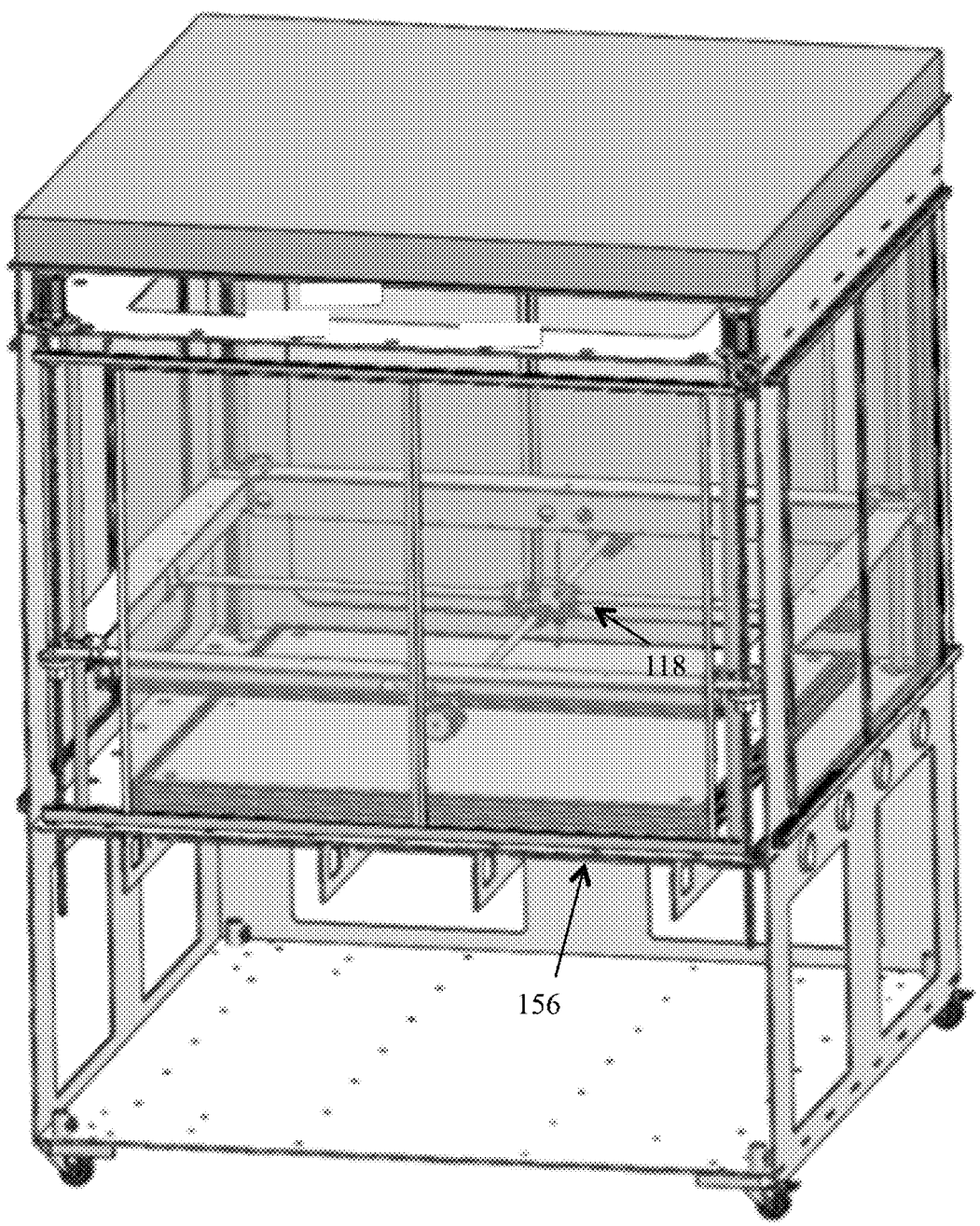
FIGS. 4A to 4H are non-limiting, exemplary illustrations of a floor plate assembly of the digital fabrication apparatus shown in FIGS. 1A to 3D in accordance with one or more embodiments of the present invention.
Figure 4B:
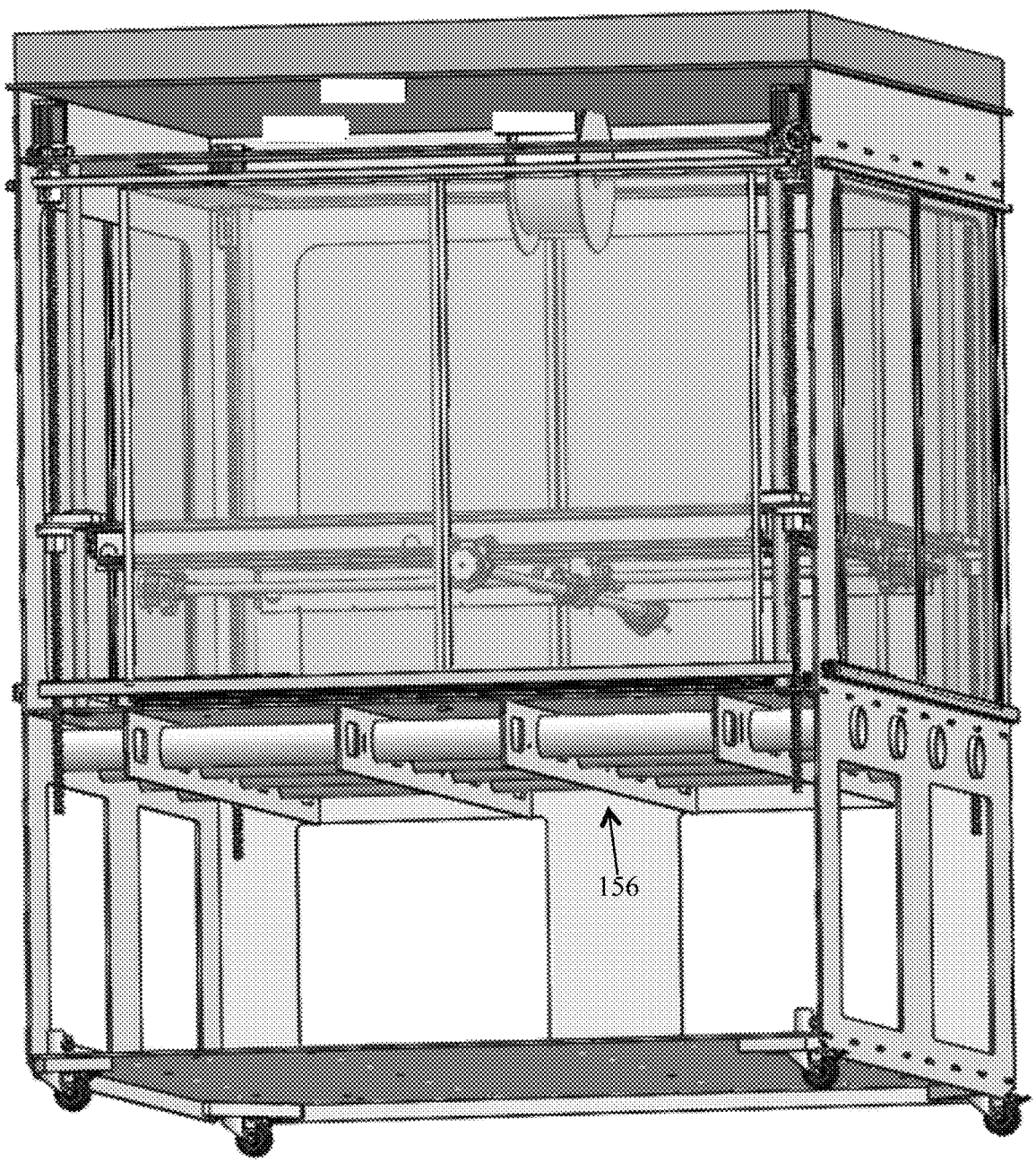
Figure 4C:
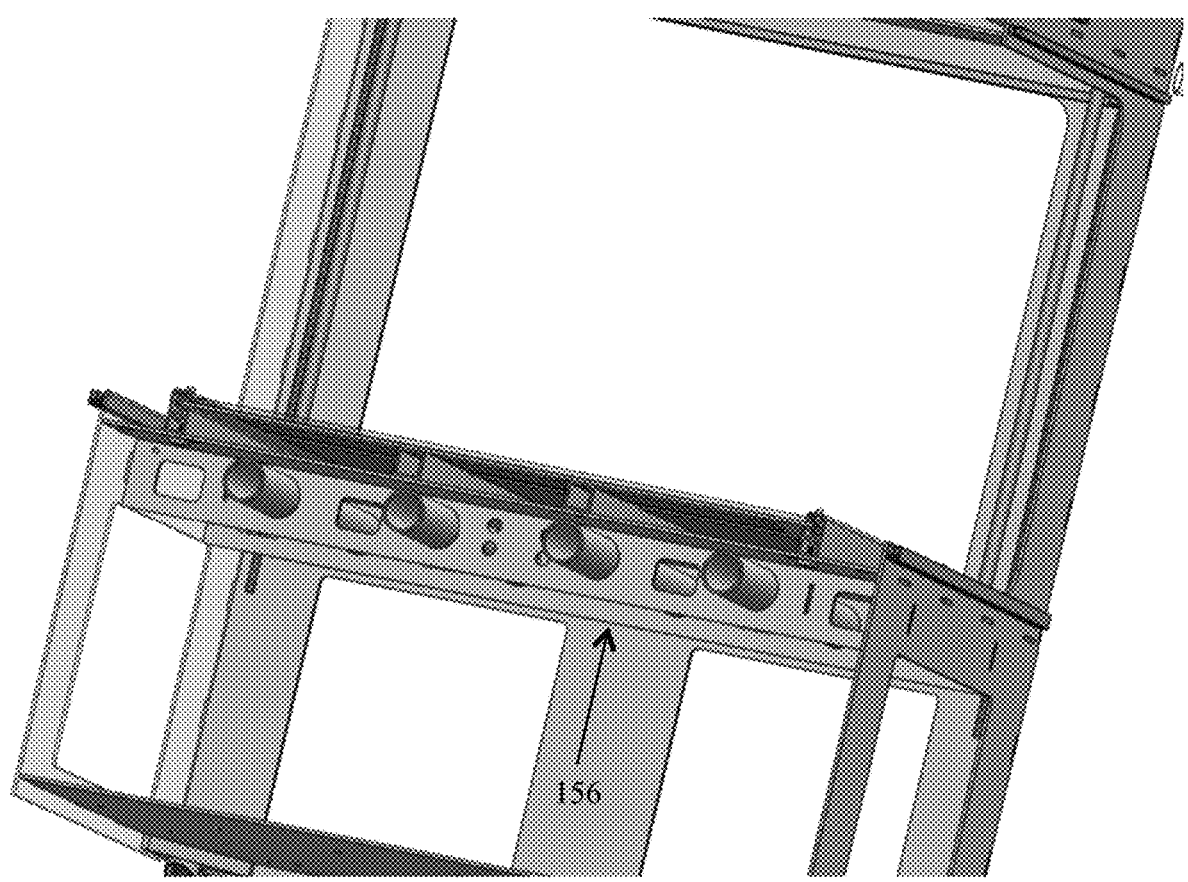
Figure 4D:
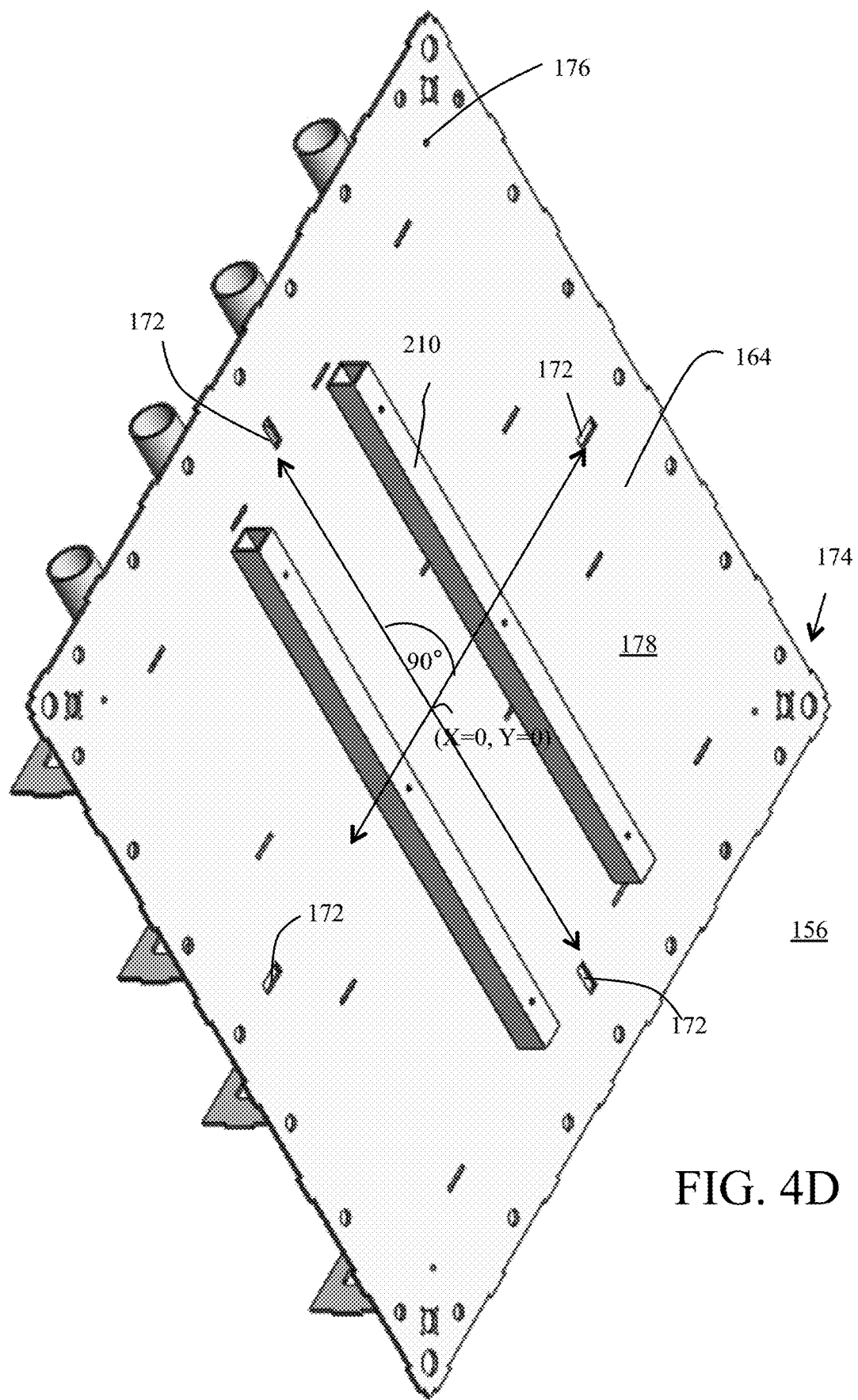
Figure 4E:
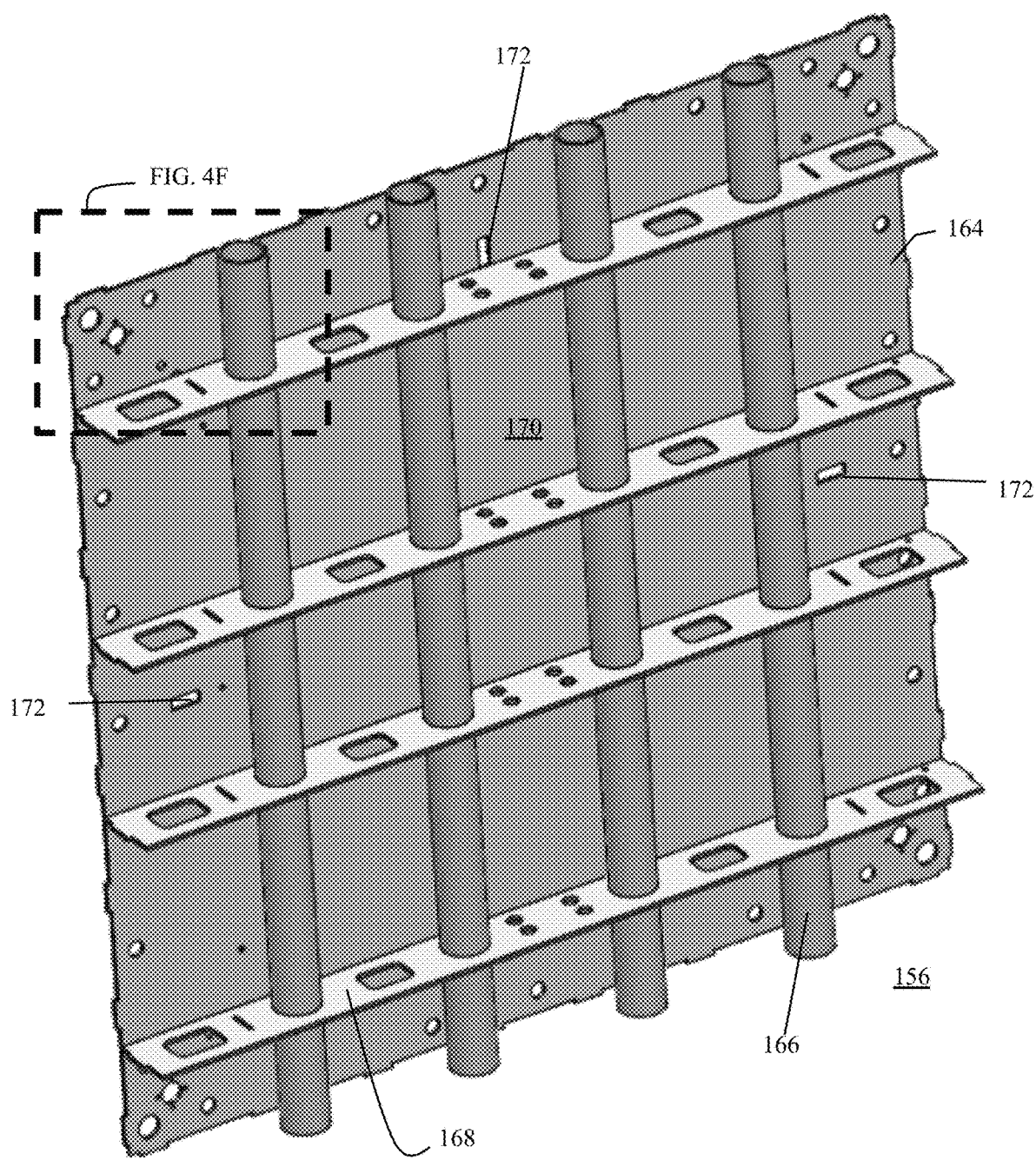
Figure 4F:
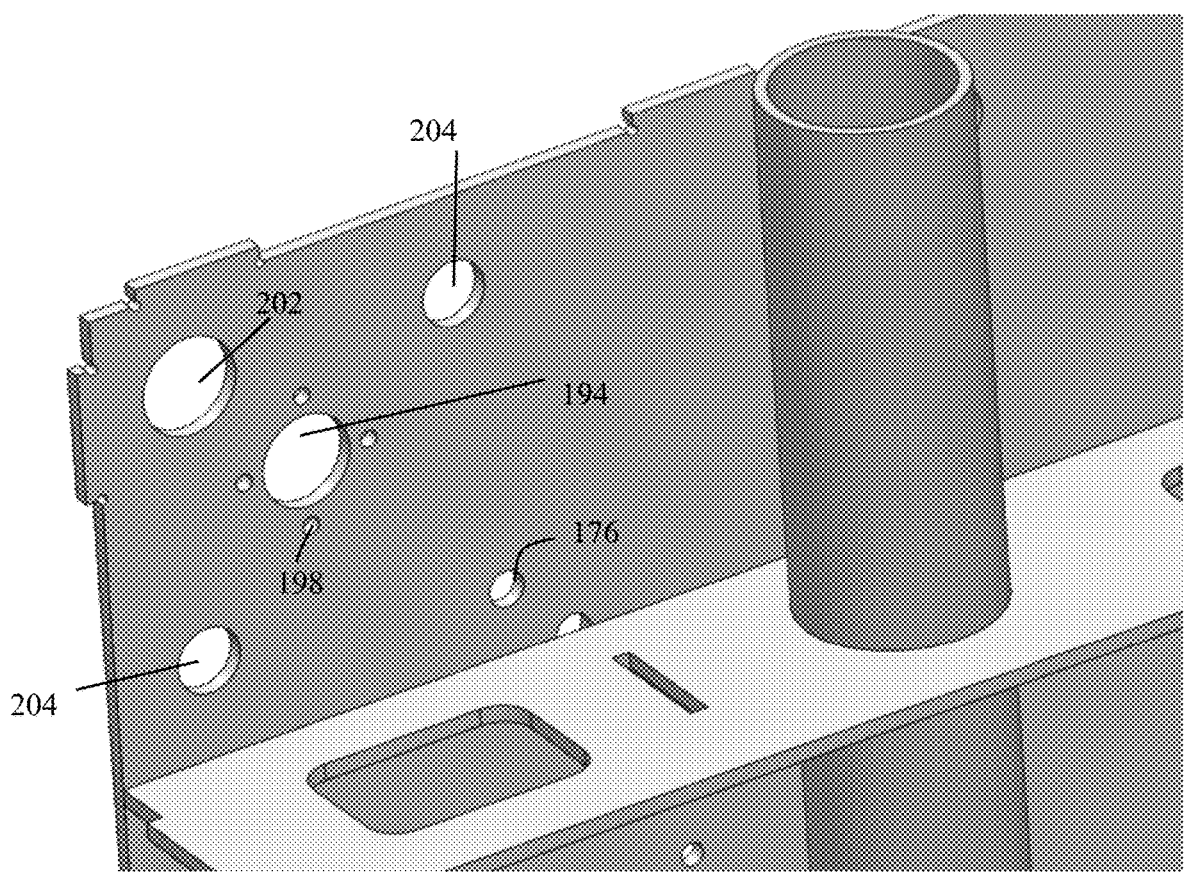
Figure 4G:
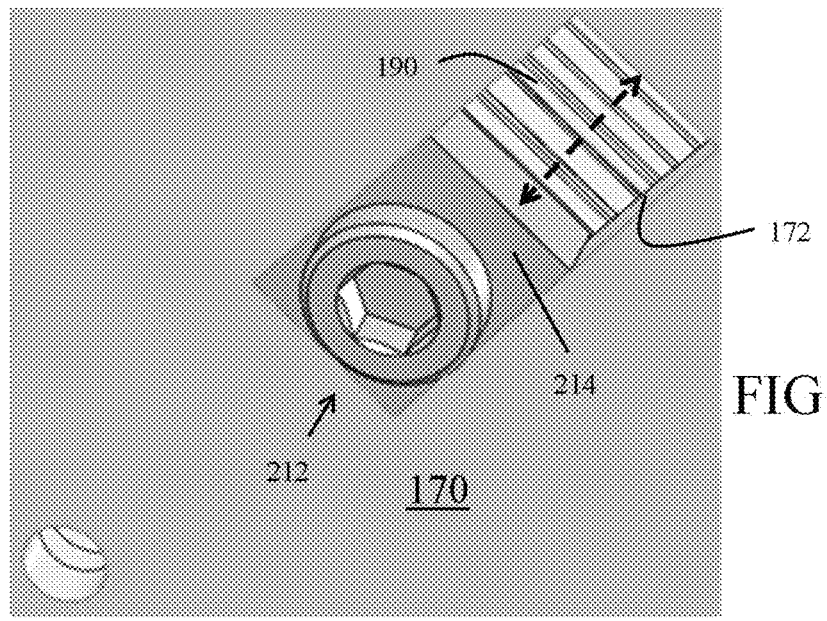
Figure 4H:
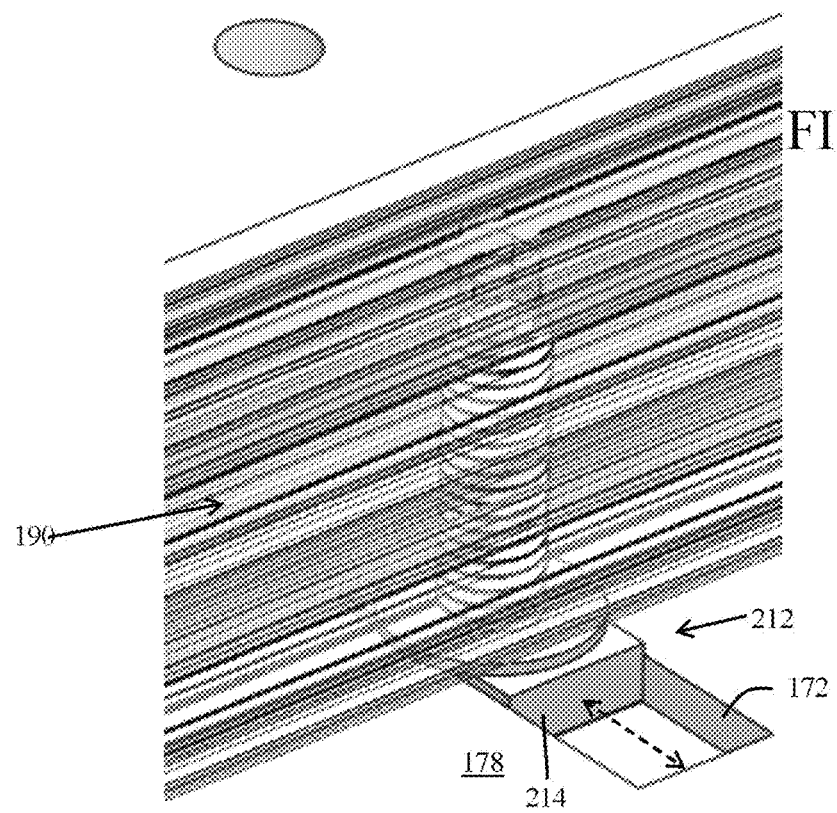

The entire digital fabrication apparatus 100 may be mounted on a set of wheels 110 (FIG. 1B), with corner ends 112 cut out to provide clearance for free movement of wheels 110 and to prevent sharp ends of digital fabrication apparatus 100 from being cut onto objects. Digital fabrication apparatus 100 further includes a conventional external monitor 114 for visual interface between users and conventional computer software that controls digital fabrication apparatus 100 and control panel with LCD display 116 for manual control of a moveable fabrication tool 118 (best shown in FIG. 4A).

As best illustrated in FIGS. 1A and 1C, second section 106 includes removable window panels 120 on all four sides that move (slide laterally by rollers) along a reciprocating path from a fully closed to a fully open position on window sill rails 122 and window header rails 124. Removable window panels 120 are preferably maximized in term of their size (over 3 or 4 feet in height and as wide as allowed by a frame 126 of digital fabrication apparatus 100) to enable full access to second section 106.

Maximum access to second section 106 allows for easy initialization and setup of digital fabrication apparatus 100 as well as easy removal of the fabricated piece (which has a large built-volume). An important aspect for providing removable window panels 120 and actually closing off the middle section 106 during operation of fabrication of an object is to provide a fully closed, controlled environment (in terms of temperature, humidity, etc.) within which a product is fabricated.

As best illustrated in FIGS. 1C (and 2A) and further detailed below, one or more embodiment of the present invention provide a digital fabrication apparatus 100 that is comprised of frame 126 having a frame longitudinal axis 130 and a frame transverse axis 132. Frame 126 is comprised of first frame members that are parallel frame longitudinal axis 130, forming vertically oriented frame members that form the sides 134 of frame 126. Frame further includes second frame members that are parallel frame transverse axis 132, forming horizontally oriented frame members 136. A combination of vertically oriented frame members 134 and horizontally oriented frame members 136 sectionalize frame 126, forming the above described sections.

As indicated above, extremely accurate build rigid frame is one important factor in providing the capability to correctly position moveable fabrication tool 118. FIGS. 2A and 2B are non-limiting exemplary illustrations of a non-limiting frame construct of the digital fabrication apparatus shown in FIGS. 1A to 1C in accordance with one or more embodiments of the present invention. As illustrated in FIGS. 2A and 2B, frame 126 of digital fabrication apparatus 100 is comprised of well-known tab-slot construction, which provides a very sturdy frame 126 for large moving components associated with moveable fabrication tool 118.

As illustrated, a vertically oriented frame member 134 is comprised of frame connection openings or slots 138 that receive frame connection flanges or tabs 140 of both horizontally oriented frame members 136 and adjacent vertically oriented frame members 134, where tabs 140 are mechanically connected (e.g., welded) within slots 138 of vertically oriented frame member 134. It should be emphasized that vertically oriented frame members 134 are connected to other vertically oriented frame members by the same tab/slot connectivity.

As best illustrated in FIG. 2B, frame connection flanges 140 extend from periphery sides of frame members (horizontal or vertical). Frame connection flanges 140 include lateral beveled (or tapered surfaces or) edges 142 that form chamfered sides that facilitate easy insertion of tabs into slots 138. Chamfered sides 142 lead to lateral reliefs 144 (rounded recesses) that receive vertical sides of slots 138 of the frame members.

FIGS. 3A to 3D are non-limiting, exemplary illustrations of a lower (or first) section of the digital fabrication apparatus shown in FIGS. 1A to 2B in accordance with one or more embodiments of the present invention. As illustrated, first or lower section 104 of digital fabrication apparatus 100 is enclosed by one or more removable access panel 146, forming a storage space 148 having sufficient height for housing operational and support equipment (detailed below).

First frame section 104 further includes a first horizontally oriented frame member 134 as a bottom frame plate 150 that is mechanically connected to the vertically oriented frame members 134 with tab/slot connectivity as described above. Bottom frame plate 150 includes a set of fastener openings 152 for securing one or more operational and support equipment to bottom frame plate 150 by fasteners, belts, etc.

Figure 3A:
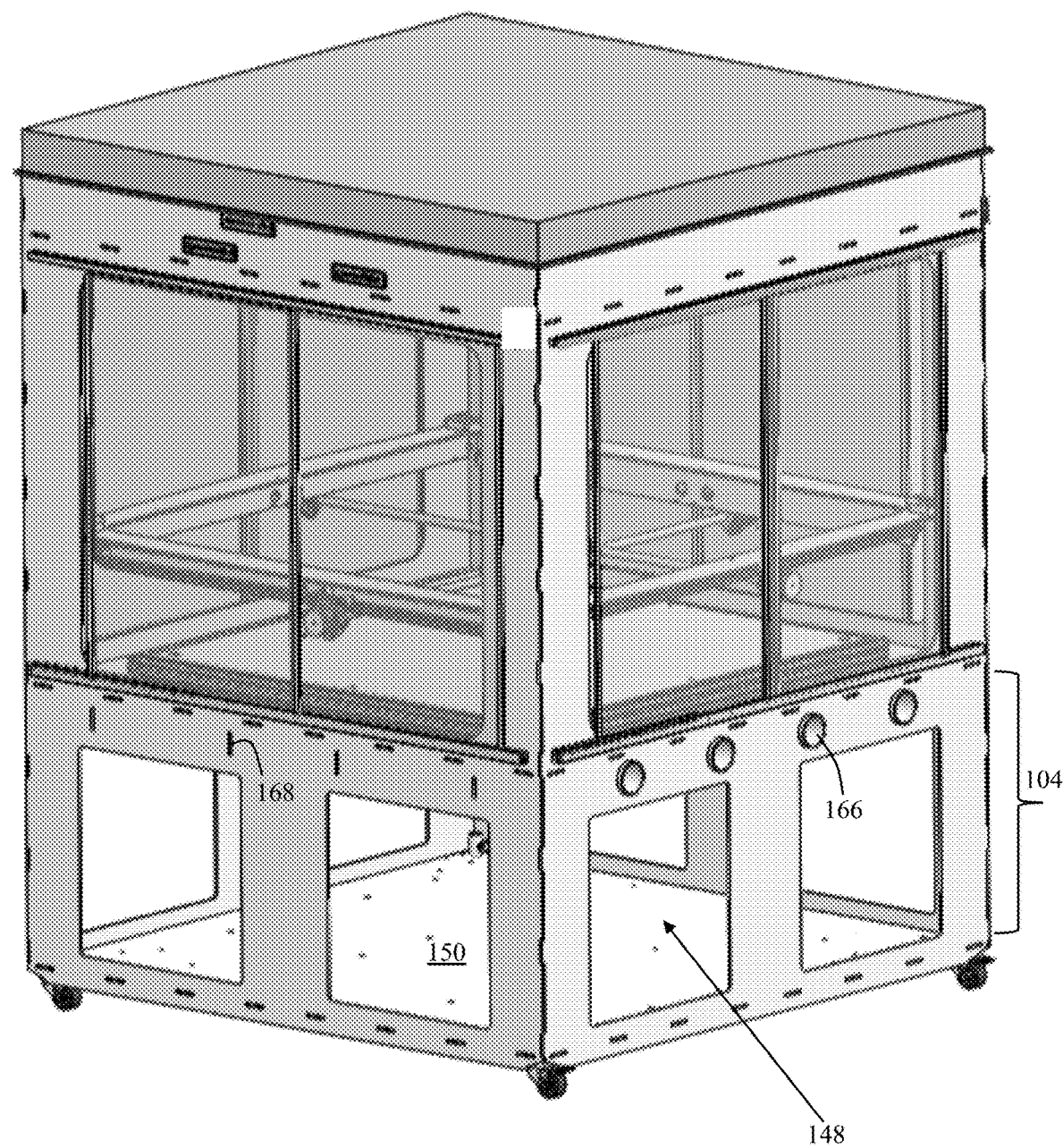
FIGS. 3A to 3D are non-limiting, exemplary illustrations of a lower (or first) section of the digital fabrication apparatus shown in FIGS. 1A to 2B in accordance with one or more embodiments of the present invention.
Figure 3B:
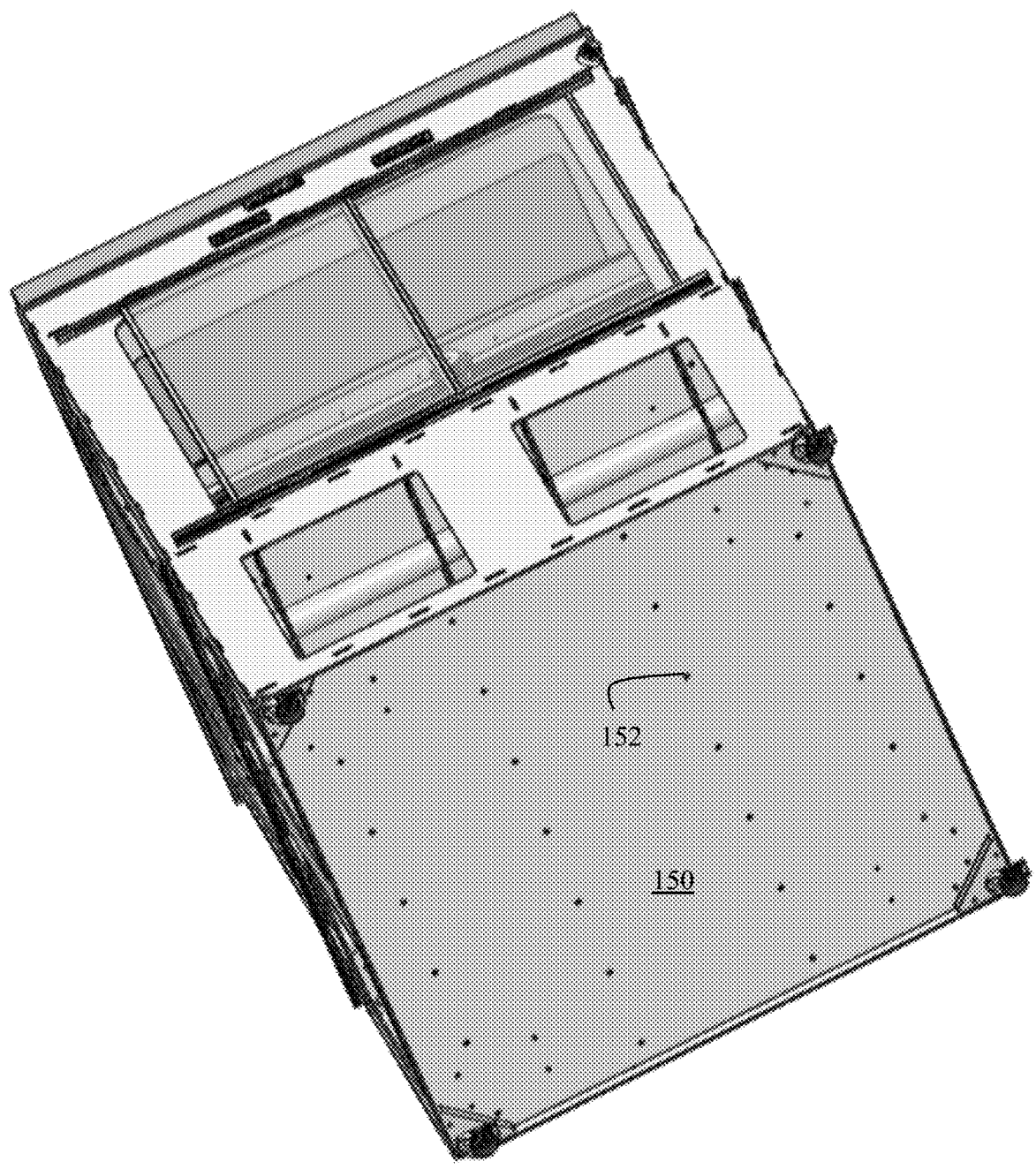
Figure 3C:
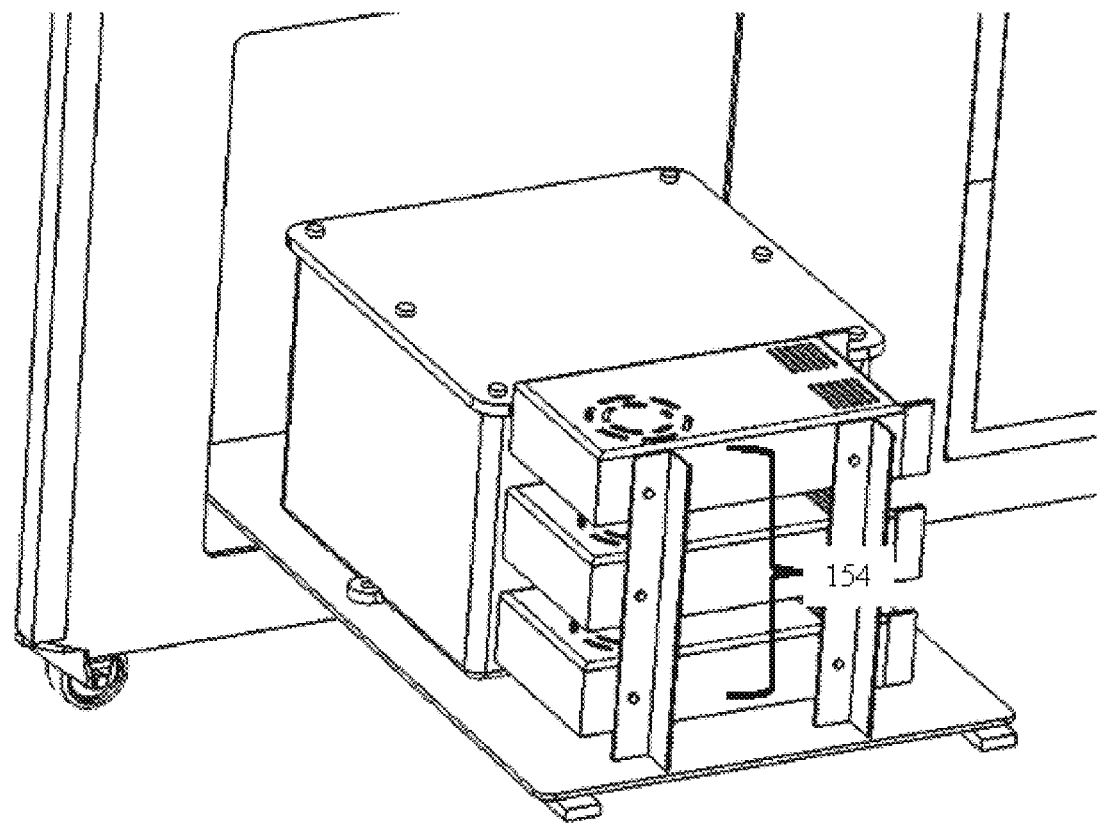
Figure 3D:
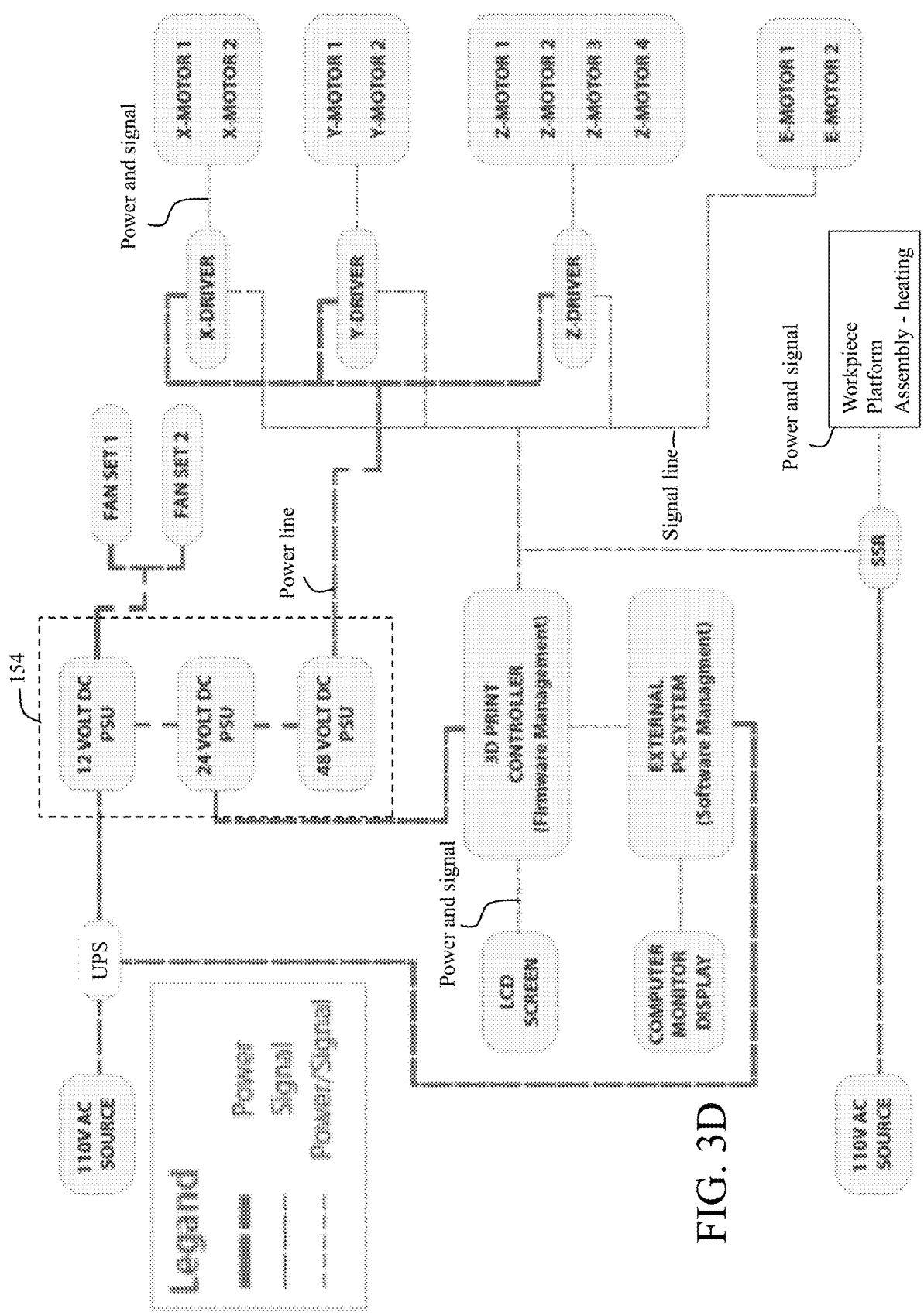

FIG. 3C is a non-limiting, exemplary illustration of a lower section with access panels removed and operational and support equipment pulled out and shown in accordance with one or more embodiments of the present invention. FIG. 3D is a non-limiting, exemplary schematic illustration of one or more operational and support equipment of the digital fabrication apparatus in accordance with one or more embodiments of the present invention.

As illustrated in FIGS. 3C and 3D, digital fabrication apparatus 100 includes electrical circuits (equipment, components, or systems) that are isolated into groups, with each electrically isolated group of circuits separately and individually powered by a correspondingly commensurate individual, separate, and isolated power supply 154 wherein N individual, separate, and isolated power supplies are used to power a corresponding number of N sets of isolated circuits. Isolating circuits into individually isolated group of equipment by using N sets of power supplies for N sets of circuits (equipment) provides convenience in terms of design, simplified maintainability, and redundancy. That is, each set of equipment with their own set of power requirement are grouped and powered by their respective power supply at their respective required power, making the power design simple. Further, maintainability is also simplified in that if a component is required to be maintained, all systems (which are isolated) need not be shut-down, only the specified power supply for the specified equipment is shut. Additionally, in terms of redundancy, if one circuit crashes in a group, the entire system is not crashed. Systems are isolated so that they may be replaced and maintained without affecting operations of other systems.

In this non-limiting, exemplary instance illustrated, a first power supply (about 48 volts) supplied power to a first set of circuits (e.g., the X-, the Y-, and the Z-direction motive force mechanisms). A second power supply (about 24 volts) supplies power to a second set of circuits (e.g., computers, controllers, etc.). A third power supply (about 12 volts) supplies power to a third set of circuits (e.g., the fans, etc.). As illustrated, first power supply and first set of circuits, second power supply and second set of circuits, and third power supply and third set of circuits are isolated from one another. It should be noted that optionally, and less preferred, a single power supply may be used with step-down transformers to supply power to various electrical equipment.

As further illustrated, the electrical circuits further include an Uninterruptable Power Supply (UPS) system. UPS systems provide uninterruptable, clean auxiliary power in the case where main power supplies are shut or cut-off, giving the floating tool sufficient time to complete at least a part of the project before the entire system is shut-off. This is essential because the printers are slow and may be at the end part of the project.

The circuit may further comprise drivers for stepper motors. The drivers are general-purpose drivers and hence, use jumpers to set them up in a desired configuration. Micro stepping is used to improve resolution of print (further granulated application of motive force to generate a more refined, more granulated motion).

As further illustrated digital fabrication apparatus 100 further includes to computer devices, a controller that includes firmware management and a Personal Computer (PC) system for computer monitor screen 114. The present invention further includes two X-drive motors, 2 Y-drive motors, and 4 Z-drive motors, including two additional motors for two filament drives.

In the non-limiting exemplary instance shown, digital fabrication apparatus 100 also includes heating system with its own plug-in power, with power passing through a Solid State Rely (SSR). Digital fabrication apparatus 100 further uses two fans for cooling the unit.

FIGS. 4A to 4H are non-limiting, exemplary illustrations of a floor plate assembly of the digital fabrication apparatus shown in FIGS. 1A to 3D in accordance with one or more embodiments of the present invention. As illustrated, second section 106 of digital fabrication apparatus 100 further includes a second horizontally oriented member 136 as a floor-plate assembly 156 that is mechanically connected to vertically oriented frame members 134.

Floor-plate assembly 156 ultimately defines the X-coordinate and the Y-coordinate of a work-surface 158 of a work-layer member 160 (FIG. 5F) a workpiece platform assembly 162 (FIG. 5A) and hence, the XY-plane of work-surface 158 with which a perpendicularly oriented Z-coordinate is associated. Accordingly, the (X, Y, Z) position coordinates of moveable fabrication tool 118 is determined in relation to X, Y, and Z coordinates defined by work-surface 158 of workpiece platform assembly 162, supported by floor plate 164 of floor plate assembly 156.

Floor-plate assembly 156 supports and stiffens workpiece platform assembly 162. As further detailed below, work-surface 158 of workpiece platform assembly 162 defines the X- and the Y-coordinates of an XY plane of work-surface 158, with coordinate values (X=0, Y=0) defining a center of work-surface 158. Accordingly, it is imperative that workpiece platform assembly 162 remain substantially flat during operation and use. As detailed below, floor-plate assembly 156 uses reinforcement members to assure that floor plate 164 (to which workpiece platform assembly 162 is secured) does not bend or wobble or move during operation but is stiff.

As illustrated, floor-plate assembly 156 is comprised of a first set of reinforcement members 166 (FIG. 4E) that are mechanically connected (e.g., welded) to a second set of reinforcement members 168, which are mechanically connected (e.g., welded) to a bottom side 170 of floor-plate 164, forming floor-plate assembly 156. In other words, first and second reinforcement members 166 and 168 provide a strong, truss-like structure, which ultimately define a constant XY-plane in relation to moveable fabrication tool 118.

First set of reinforcement members 166 extend longitudinally in a first direction, whereas second set of reinforcement members 168 extend longitudinally in a second direction. First direction is at an angle in relation to the second direction—preferably, the first direction is perpendicular the second direction.

First set of reinforcement members 166 are comprised of cylindrical tubes that provide resistance against both torsion and angular forces. First set of reinforcement members 166 may be thought of as "torque tubes" that provide resistance against application of torque and angular forces (e.g., forces perpendicular to the longitudinal axis of the first set of reinforcement members 166) to thereby maintain the floor plate flat and hence, ultimately, the XY-plane defined by work-surface 158. The first set of reinforcement members 166 absorbs applied torque or angular forces so that floor plate 164 continues to remain flat and not bend. In other words, they provide torsion and angular stiffness for floor plate 164.

Second set of reinforcement members 168 are comprised of generally polygonal cross-sectional profile that extends longitudinally, providing resistance against angular forces. In other words, they are extremely stiff vertically. Second set of reinforcement members 168 further include openings for passage of wiring, tubes, etc. Accordingly, first and second reinforcement members 166 and 168 function to absorb torque or other angular forces.

As best illustrated in FIGS. 3A and 4A to 4C, first and second distal ends of the first set of reinforcement members 166 extend out of a first set of vertically oriented frame members (oppositely positioned) and are mechanically connected (e.g., welded) to the first set of vertically oriented frame members. First and second distal ends of the second set of reinforcement members 168 extend out of a second set of vertically oriented frame members and are mechanically connected (e.g., welded) to the second set of vertically oriented frame members (oppositely positioned).

As best illustrated in FIGS. 4D to 4H floor plate 164 is comprised of first openings that define thermal expansion slots 172. As detailed below, workpiece platform assembly 162 must be heated for adhesion of filament onto work-surface 158 during fabrication of a workpiece.

Thermal expansion slots 172 are oriented and positioned to allow for in-plane thermal expansion of the workpiece platform assembly 162. This way, a center (X=0, Y=0) of the XY-plane of work-surface 158 of workpiece platform assembly 162 is maintained at a constant position during in-plane (or lateral) thermal expansion of the workpiece platform assembly 162. The location of the center position of the workpiece platform assembly 162 must be constant while allowing expansions along any in-plane (lateral) direction needed to counter repositioning or shifting of its center due to thermal expansion. Accordingly and as further detailed below, a minimum of four thermal expansion slots 172 are needed to provide multi-directional lateral or in-plane expansion to maintain the center of the workpiece at a constant position. This avoids shifting of the center of the workpiece platform assembly 162 to one side or the other due to thermal expansion.

Thermal expansion slots 172 comprise of a first pair of axially aligned thermal expansion slots that are oriented perpendicular a second pair of axially aligned thermal expansion slots. It should be noted that so long as the first pair of axially aligned thermal expansion slots are oriented perpendicular the second pair of axially aligned thermal expansion slots, the slot-pairs may be position at any location on the floor plate such as for example, near corners (e.g., diagonally opposite corners) or along sides (as illustrated). In other words, the axes of the slot-pairs must cross at 90° degrees at center (X=0, Y=0) of workpiece platform assembly 162 (which is the same center as the floor plate 164 shown in FIG. 4D).

As indicated above, a first pair of axially aligned thermal expansion slots are positioned across floor plate 164, oriented parallel a defined X-coordinate of floor plate 164 (and ultimately X-coordinate of work-surface 158) that may be used to determine an X-coordinate position of a moveable fabrication tool. A second pair of axially aligned thermal expansion slots are positioned across the floor plate, oriented parallel a defined Y-coordinate of the floor plate 164 (and ultimately Y-coordinate of work-surface 158) that may be used to determine an Y-coordinate position of moveable fabrication tool.

First pair of thermal expansion slots allow thermal expansion of the workpiece platform 162 along an X-direction parallel X-coordinate, while the second pair of thermal expansion slots allow thermal expansion of the workpiece platform assembly along a Y-direction parallel Y-coordinate.

First pair of thermal expansion slots are comprised of first and second thermal expansion slots positioned at respective first and second opposite peripheries of the floor plate 164, and have respective first and second central longitudinal axis that are aligned. Second pair of thermal expansion slots are comprised of third and fourth thermal expansion slots positioned at respective third and fourth opposite periphery of the floor plate 164, and have respective third and fourth central longitudinal axis that are aligned. First and second opposite periphery define first and second sides of the floor plate 164, third and fourth opposite periphery define third and fourth sides of the floor plate. Alternatively, first and second opposite periphery define first and second diagonal corners of floor plate 164, and the third and fourth opposite periphery define third and fourth diagonal corners of floor plate 164.

As illustrated, floor-plate 164 is generally polygonal (preferably, a square) and includes a corner section 174 having a second opening 176 for securing workpiece platform assembly 162 onto a top surface 178 of floor plate 164 of floor plate assembly 156 to prevent vertical movement of workpiece platform assembly 162 while enabling in-plane (or lateral) thermal expansion of workpiece platform assembly 162. That is, fasteners securing workpiece platform assembly 162 onto top surface 178 of floor plate 164 of floor plate assembly 156 through second openings 176 prevent movement of workpiece platform assembly 162 parallel along frame longitudinal axis 130 while enabling in-plane thermal expansion of workpiece platform assembly 162.

The fasteners are enabled to move lateral (i.e., sway or tilt). The movement is small and hence, the angular displacement is small (e.g., smaller than micro-millimeters), but sufficient to accommodate thermal expansion of the workpiece platform assembly 162 so to maintain center of work-surface 158 at (X=0, Y=0) location of floor plate 164. Non-limiting example of a fastener that may be used to tie workpiece platform assembly 162 to floor plate 164 of floor plate assembly 156 is a shoulder bolt 182.

As is well known, shoulder bolts 182 have a cylindrical shoulder 184 under the bolt head 186 that may serve as fulcrums and pivot (i.e., tilt). In other words, well known shoulder bolts 182 in combination with retaining washers may be used with cylindrical shoulder 184 bolt head 186 secured within second opening 176 of floor plate 164 from under side 170 and moving (tilting due to expansion of workpiece platform assembly 162) therein while the threading 188 of shoulder bolt 182 is screwed into workpiece frame 190 (FIG. 5C) of workpiece platform assembly 162 to prevent vertical movement of workpiece platform assembly 162. This way, workpiece platform assembly 162 cannot be lifted, but may expand sideways.

Figure 5A:
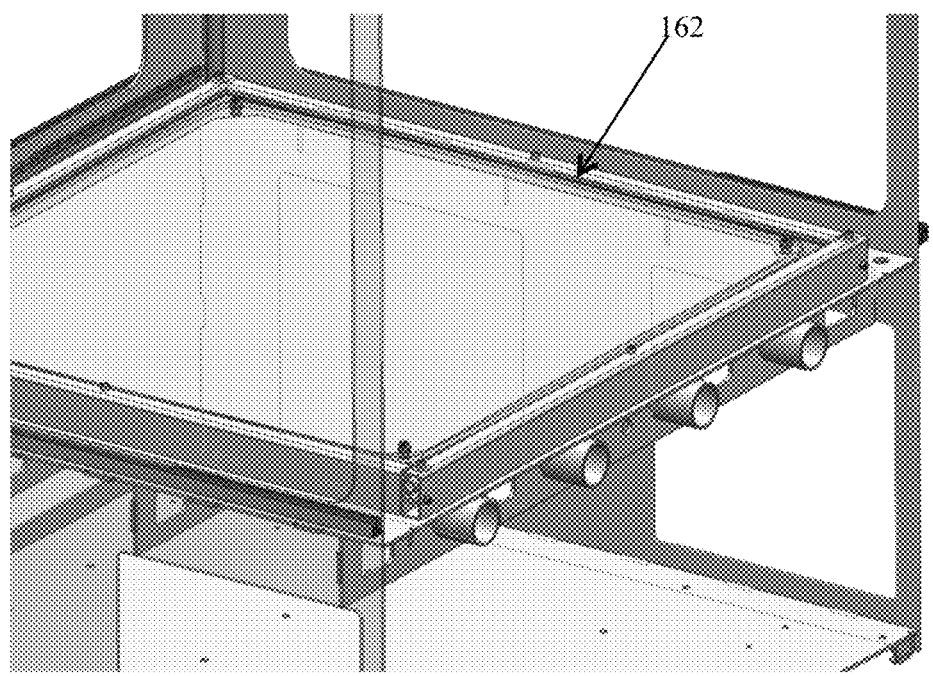
FIGS. 5A to 5P are non-limiting, exemplary illustrations of a workpiece platform assembly of the digital fabrication apparatus shown in FIGS. 1A to 4H in accordance with one or more embodiments of the present invention.
Figure 5B:
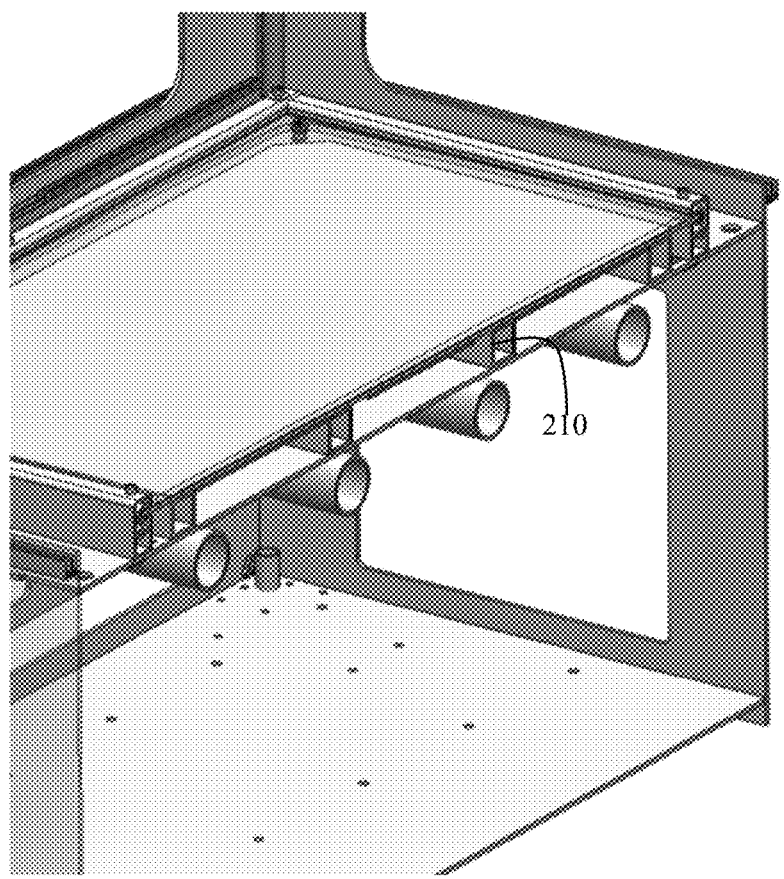
Figure 5C:
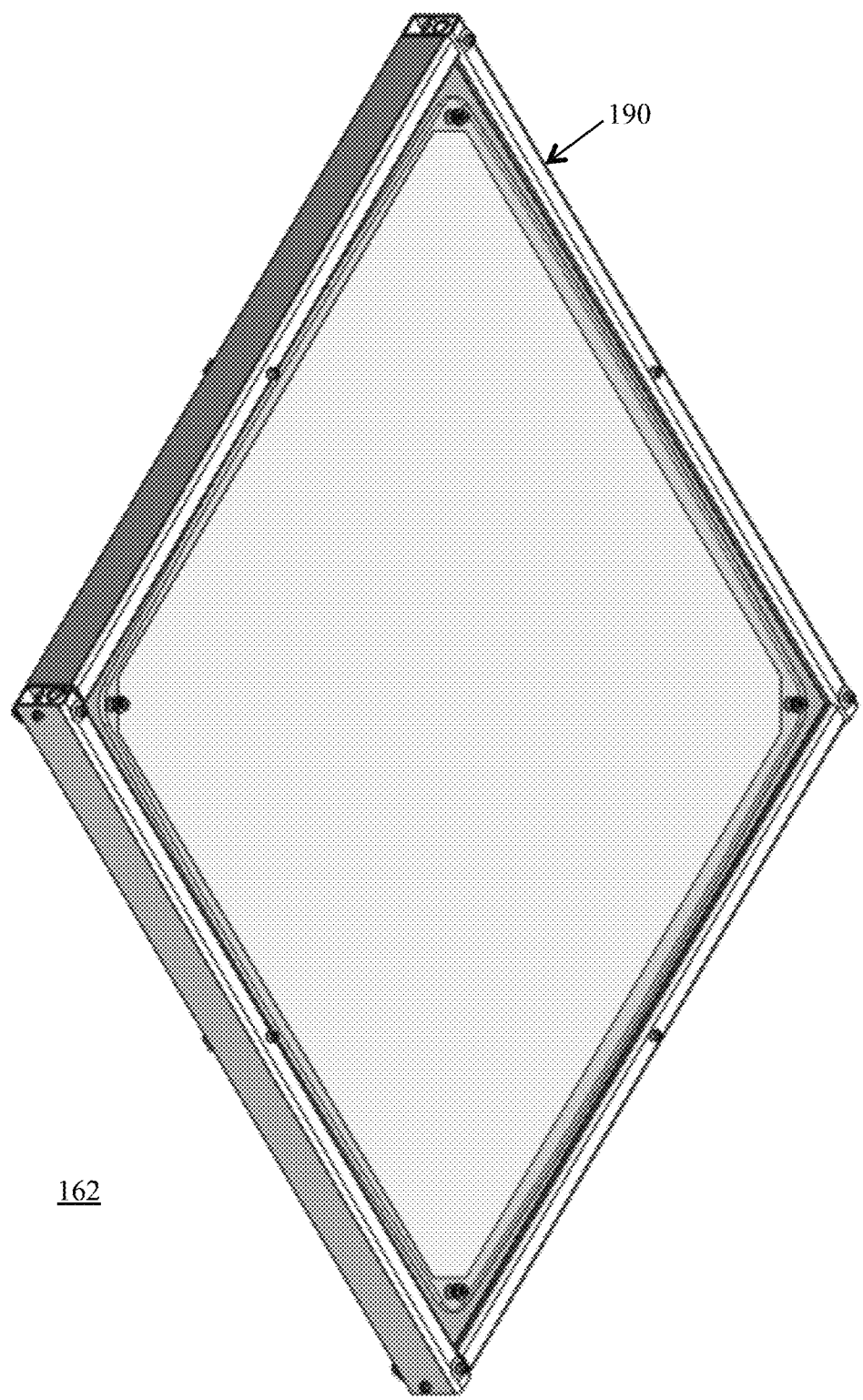
Figure 5D:
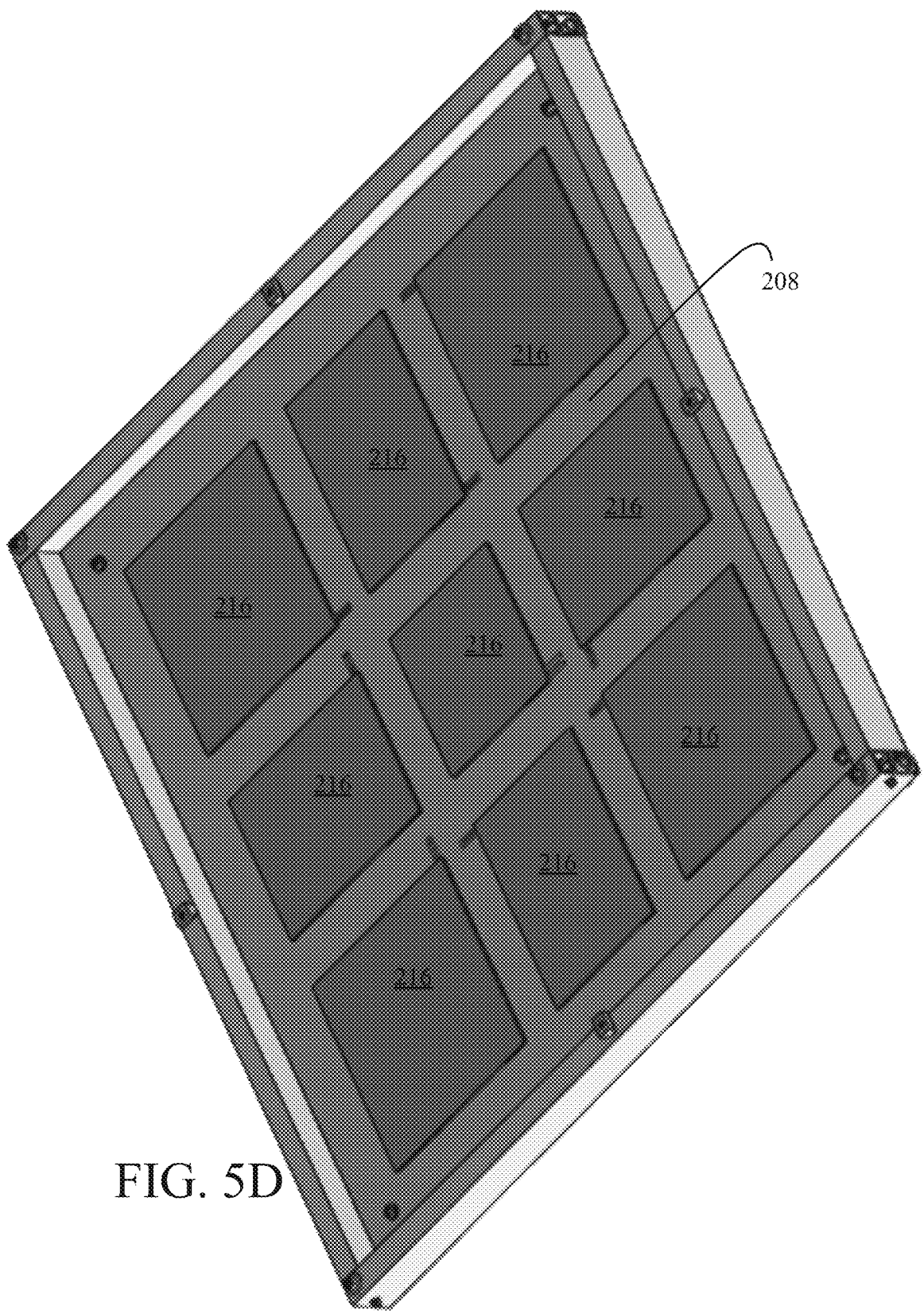
Figure 5E:
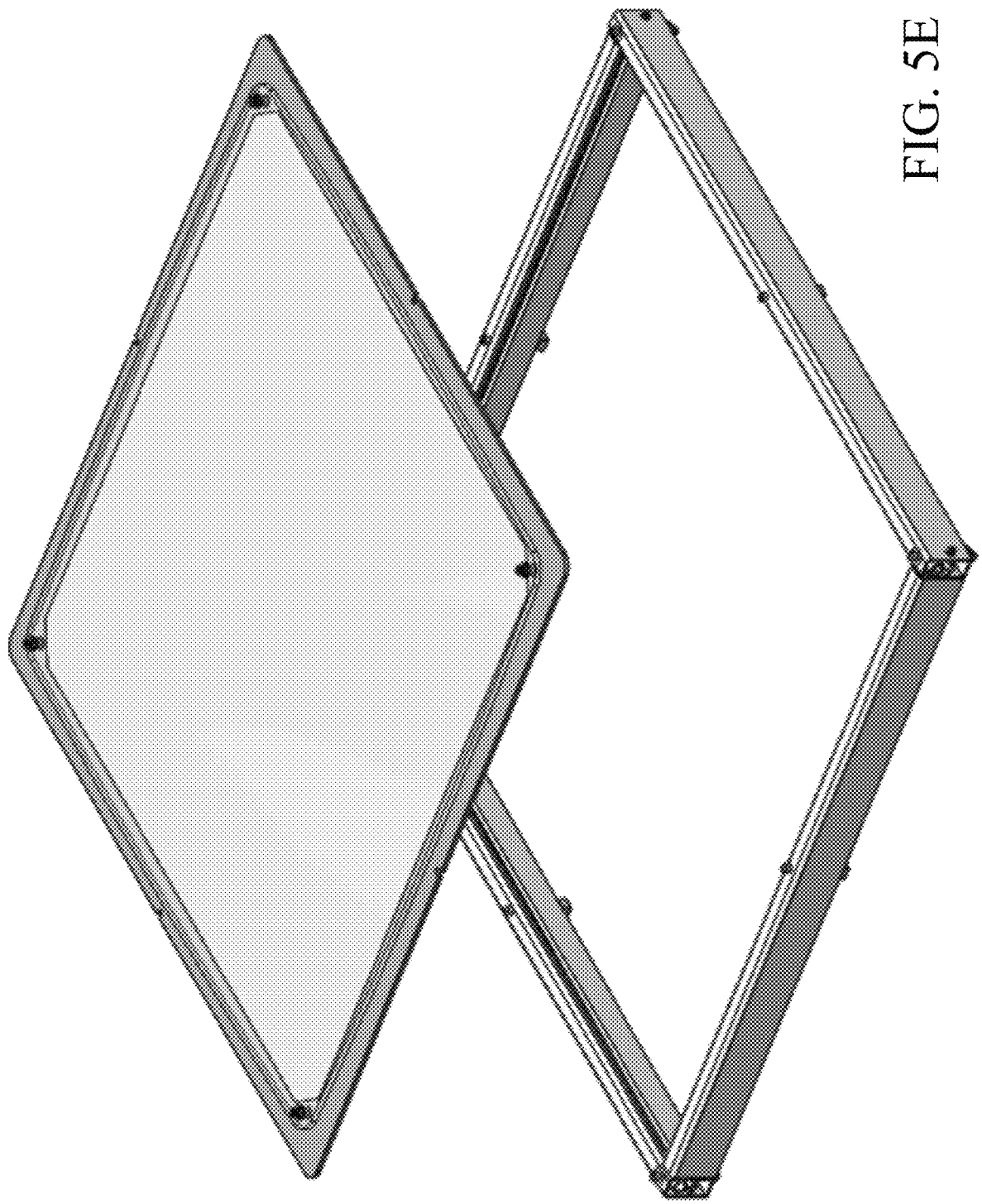
Figure 5F:
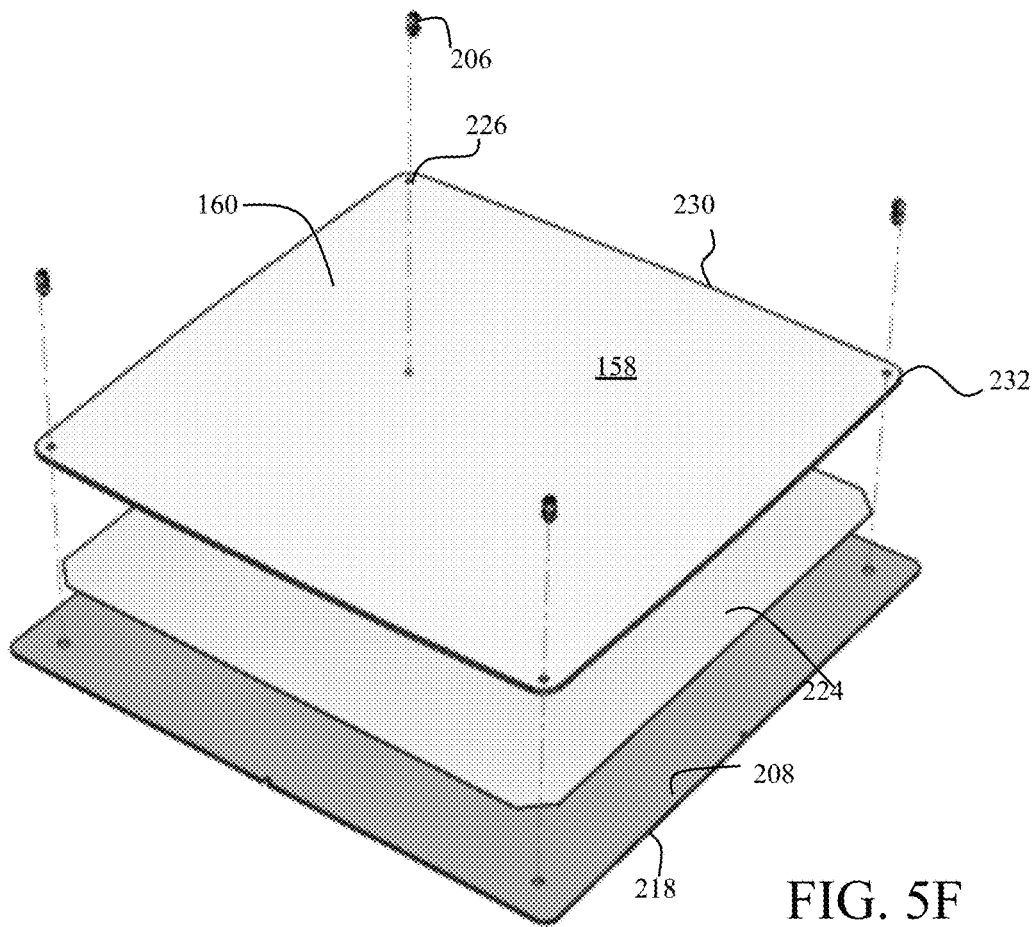
Figure 5G:
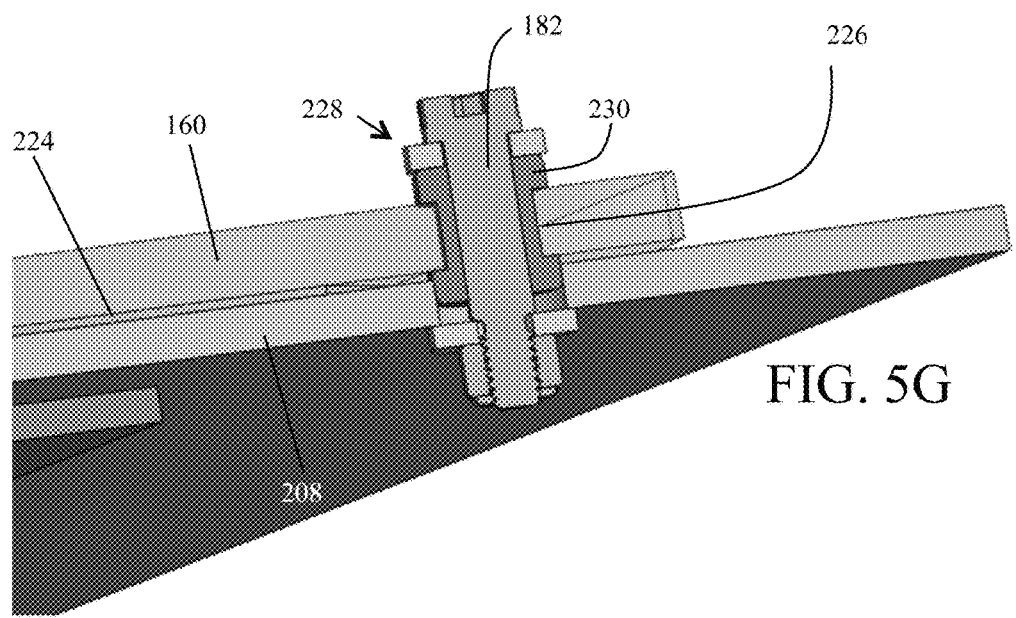
Figure 5H:
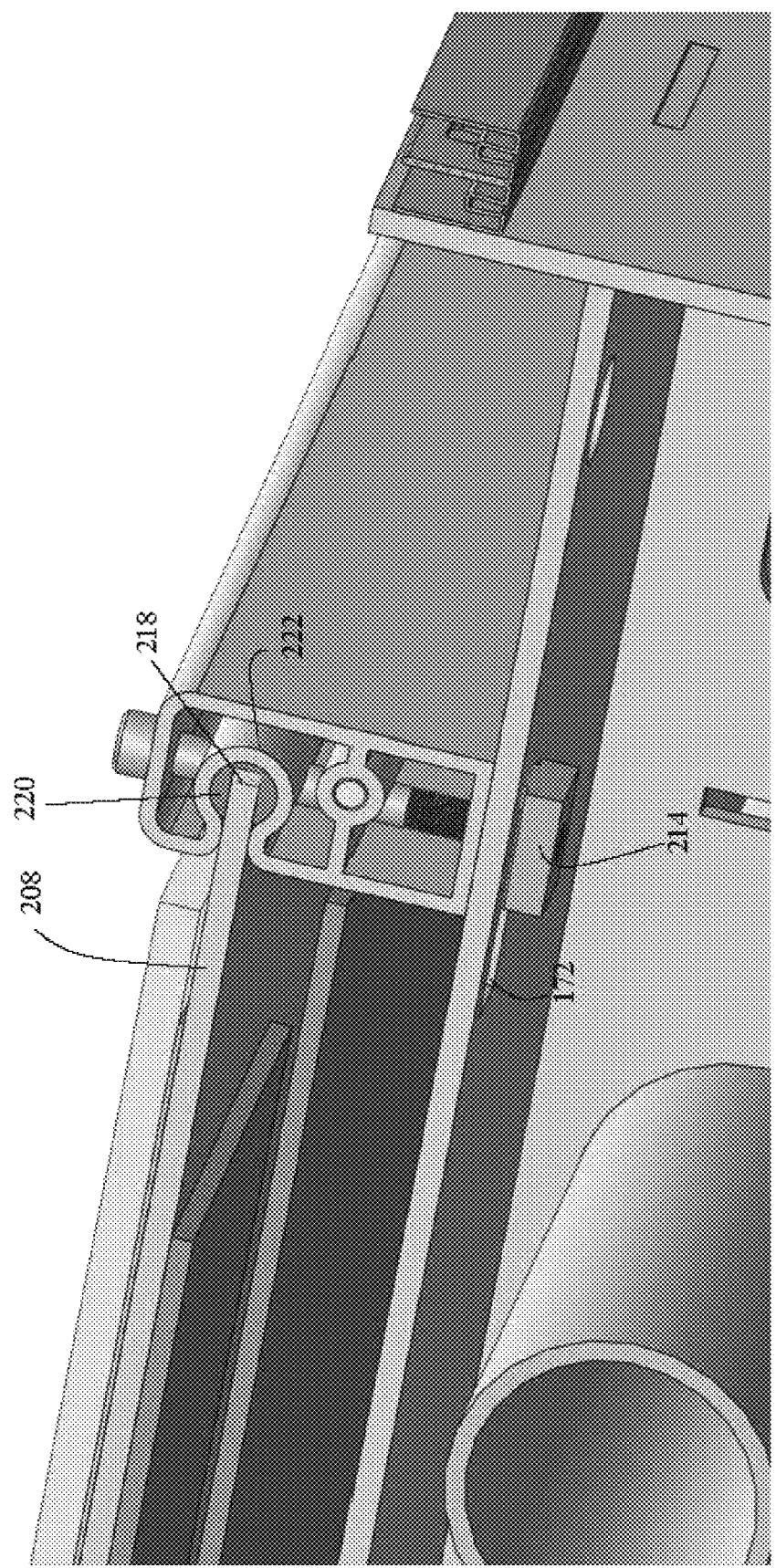
Figure 5I:
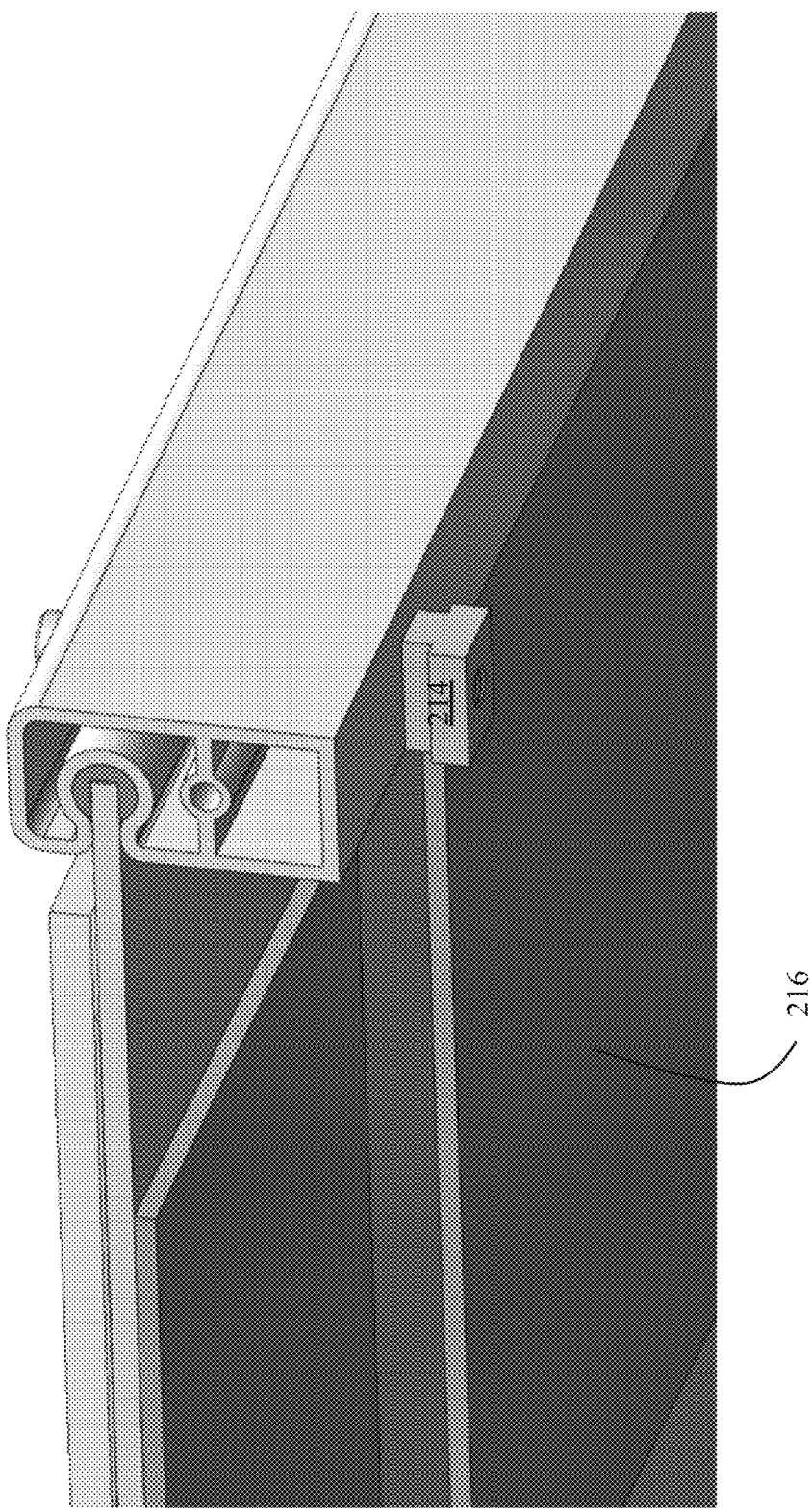
Figure 5J:
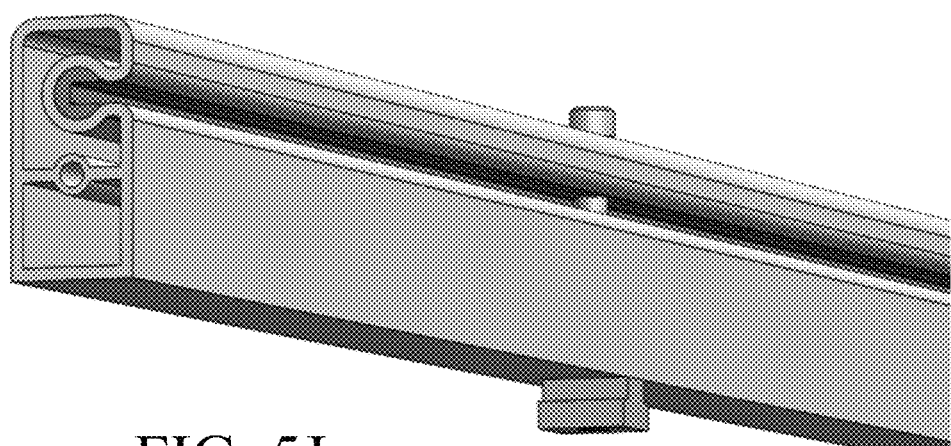
Figure 5K:
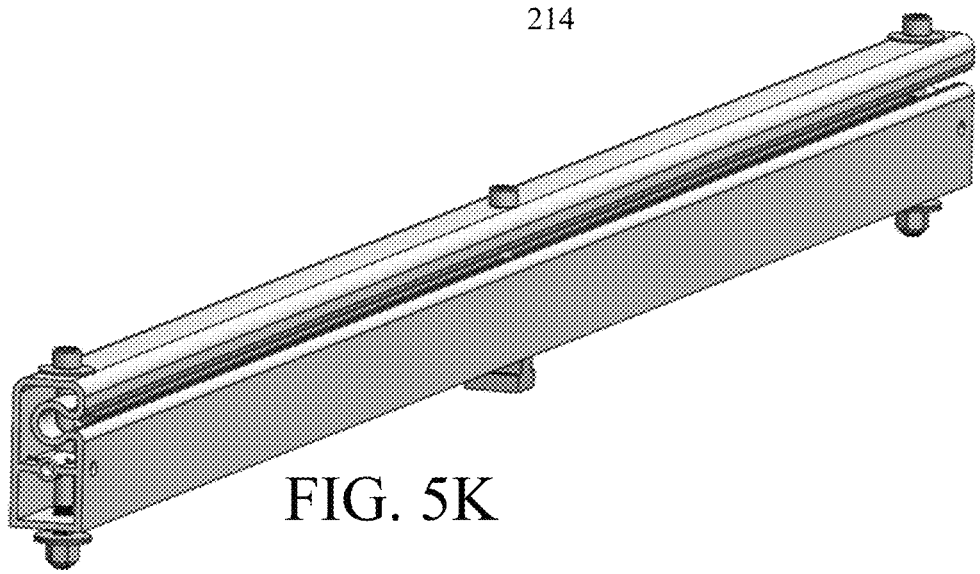
Figure 5L:
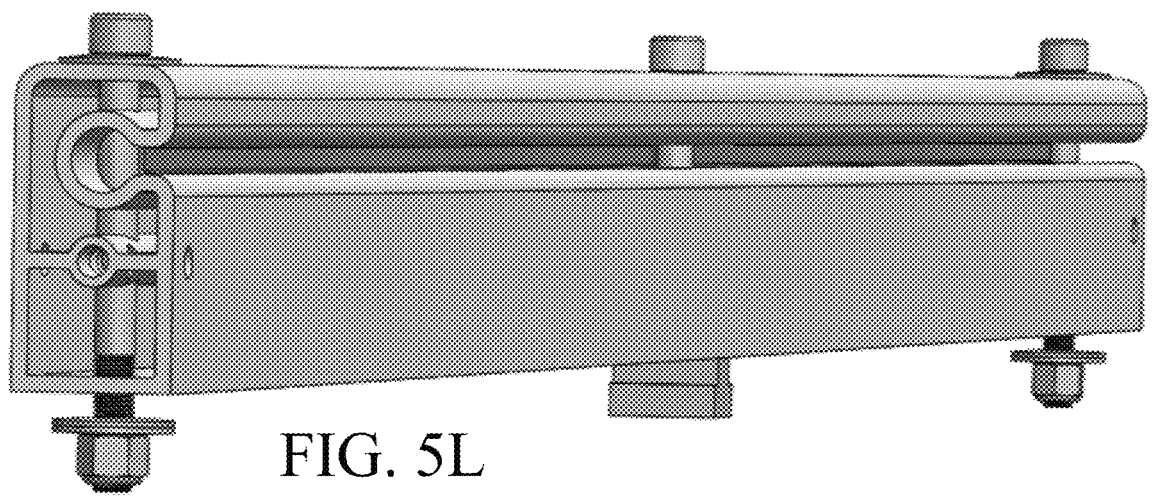
Figure 5M:
Figure 5N:
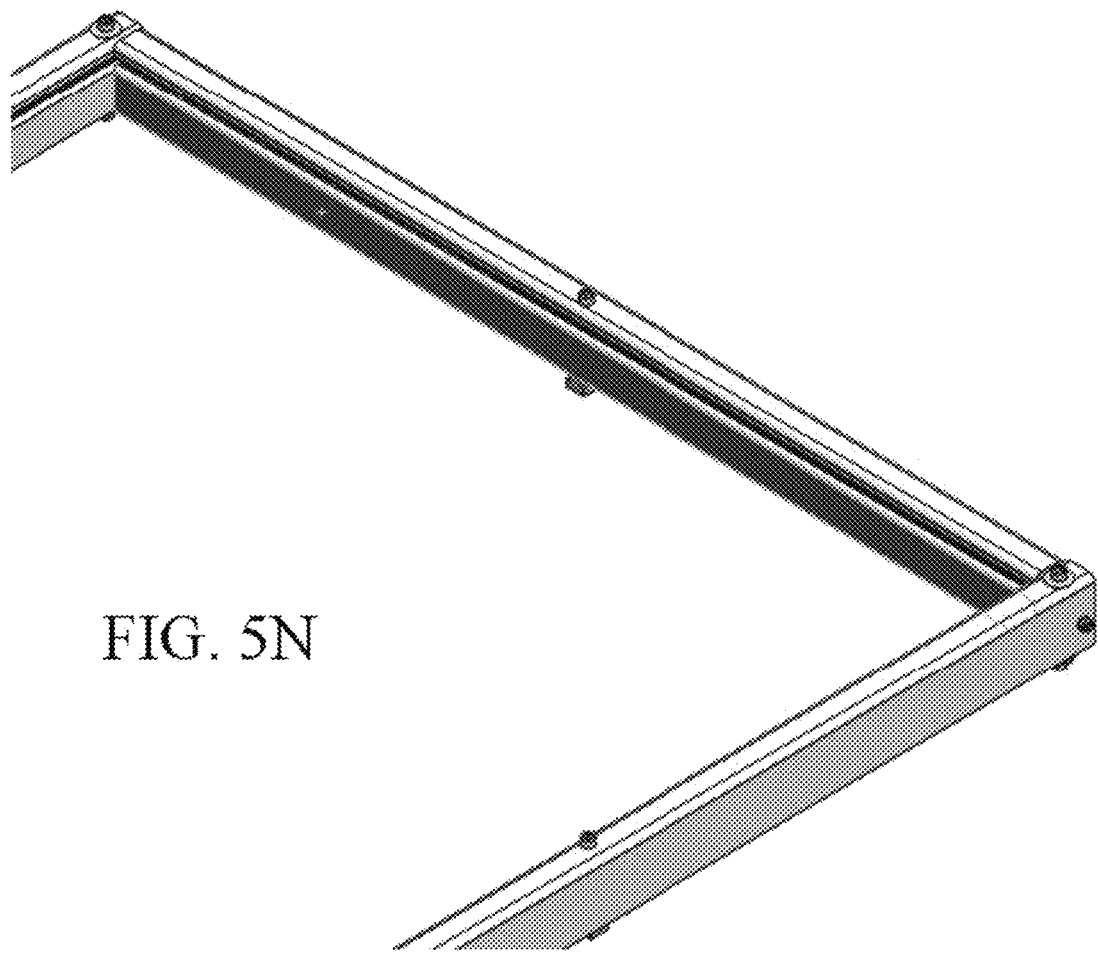
Figure 5O:
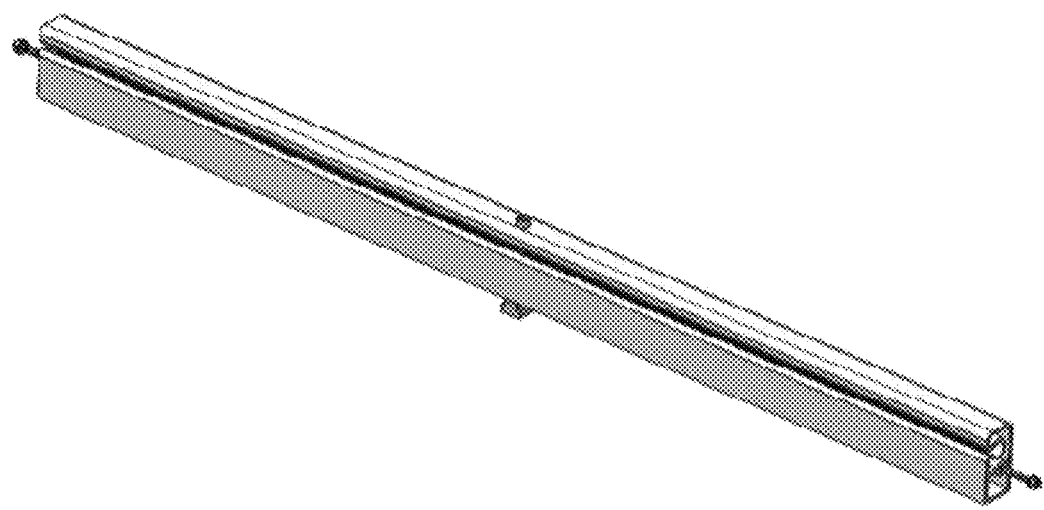

FIG. 5H shows the CENTER through bolt in the middle of each of the 4 legs of the frame; this bolt passes through the frame to engage with square block 214 which in effect becomes the threaded nut which tightens against the frame, and which in turn engages with the expansion slot in the floor-plate; by doing so the two pairs of blocks allow expansion of the 'printbed' but constrain the center of the printbed not to move relative to the floorplate. FIG. 5H also shows how the diffuser plate 208 is supported within a narrow opening in the frame which effectively locates the plate along all 4 edges of the periphery; the edge element 220 acts as a thermal element to separate the edge of the diffuser plate 208 and the frame body 222.

Additionally, stacked wave disc springs 192 may be also be used to distribute thermal expansion forces evenly on shoulder bolt components. Tightening shoulder bolt 182 compresses stacked wave disc spring 192 against bottom surface 170 of floor plate 164 so that a certain load (a preload) is exerted on shoulder bolt 192. This enables fixing workpiece platform assembly 162 vertically (by preloading it), but allows for lateral (in plane) thermal expansion due to stacked wave disc springs 192.

As further illustrated, floor-plate 164 also includes third openings 194 for securing a vertical guide rod 196 for the Z-direction motion of moveable fabrication tool 118 to thereby prevent "wobbling," with third openings 194 having fastener openings 198 to secure vertical guide rods 196 via a linking adapter 200. At minimum two vertical guide rods 196 may be used and positioned diagonally or, alternatively, as shown, four vertical guide rods 196 used at each corner of digital fabrication apparatus 100.

As further illustrated, floor-plate 164 also includes fourth openings 202 that are clearance holes for enabling passage of a threaded rode associated with Z-direction motive force mechanism, and a plurality of fifth openings 204 (or general purpose openings) for passage of wiring.

Figure 5P:
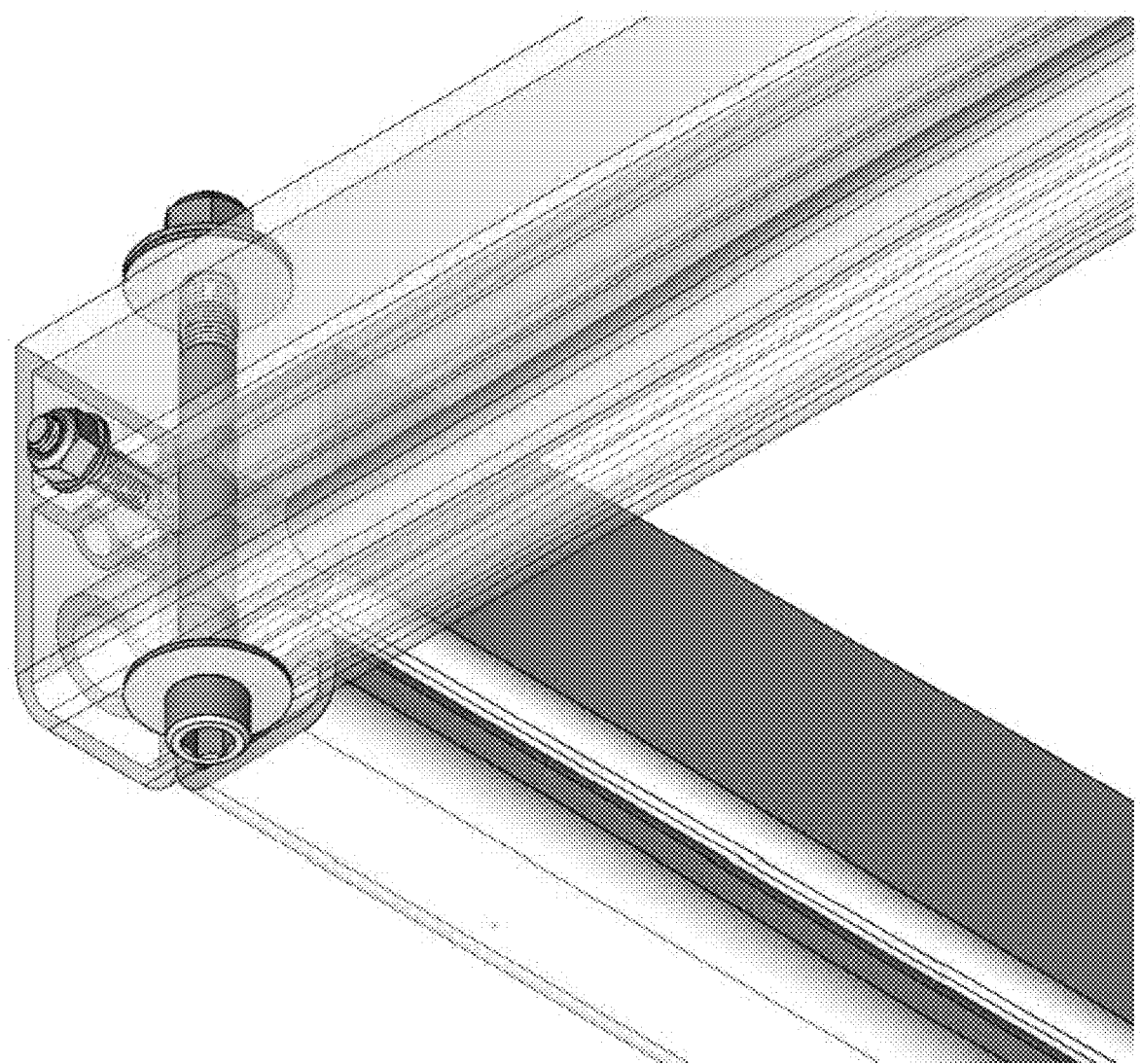

FIGS. 5A to 5P are non-limiting, exemplary illustrations of a workpiece platform assembly of the digital fabrication apparatus shown in FIGS. 1A to 4H in accordance with one or more embodiments of the present invention. A workpiece (or an object) is fabricated on work-surface 158 of a work-layer member 160 of workpiece platform assembly 162, with work-surface 158 required to be heated for proper adhesion of filament. As further detailed below, there are chain of constraints between the work-layer member 160 and floor plate 164 to ensure the constant center point position (X=0, Y=0) of work-layer member 160 (which is the same as or coincides with the center of floor plate 164). Fasteners 206 that hold the work-layer member 160 in position connect with diffuser plate 208, with diffuser plate 208 connected laterally with platform frame 190 and the floor plate 164 (via third set of reinforcement members 210).

As detailed below, the entire workpiece platform assembly 162 connections (from floor plate 164 to work-layer member 160) are to accommodate and account for potential heat expansion of various layers of workpiece platform assembly 162 due to application of heat so that the position of the center of the workpiece platform assembly 162 is constant in relation to floor plate 164 and that various layer thermal expansions are tolerated while maintaining the structural integrity of all layers. In other words, lateral thermal expansions are accounted for any member of workpiece platform assembly 162 that requires to be vertically secured so to maintain the center of the workpiece platform assembly 162 at a center (X=0, Y=0) coordinate values of floor pate 164.

Workpiece platform assembly 162 is secured onto floor-plate 164 (via the workpiece platform assembly frame 190) to constrain workpiece platform assembly 162 from movement parallel along the frame longitudinal axis 130 (vertical movement) while allowing in-plane (or lateral) thermal expansion of the workpiece platform assembly 162. In other words, workpiece platform assembly 162 is secured onto floor-plate 164 to enable in-plane thermal expansion of workpiece platform assembly 162 while preventing movement of the workpiece platform assembly 162 parallel along frame longitudinal axis 130.

Workpiece platform assembly 162 is secured onto floor-plate by thermal expansion couplers 212 (FIGS. 4G, 4H, and 5H to 5P), within thermal expansion slots 172 of floor-plate 164 to reduce (or diffuse) adverse thermal expansion effects on workpiece platform assembly 162 that may result in thermal stresses (generally laterally) on workpiece platform assembly 162.

Thermal expansion couplers 212 may comprise of a bolt/washer combinations secured within an thermal expansion member 214 (best illustrated in FIGS. 4G, 4H, and 5H to 5P) that rests and moves within a larger thermal expansion slots 172 to enable the thermal expansion member 214 to move "slide" within thermal expansion slots 172 as the workpiece platform assembly 162 experiences thermal expansion due to application of heat. It should be noted that bolt/washer combination also secure workpiece platform assembly 162 onto a top surface of floor plate 164 of floor plate assembly 156 to prevent vertical movement of the workpiece platform assembly 162.

Alternatively, well known shoulder bolts 182 in combination with retaining washers may be also be used with the cylindrical shoulder under the bolt-head secured within the expansion slot and moving (sliding due to expansion of workpiece platform assembly) therein while the threading of the shoulder bolt is screwed into the workpiece platform assembly to prevent vertical movement of the platform. This way, the platform cannot be lifted, but may expand sideways.

Stacked wave disc springs may be also be used to distribute thermal expansion forces evenly on shoulder bolts components. Tightening the shoulder bolt compresses the stacked wave disc spring against the bottom surface of the floor plate so that a certain load is exerted on the shoulder bolt. This enables fixing the workpiece platform assembly vertically, but allows for lateral (in plane) thermal expansion.

In general, workpiece platform assembly 162 is uniformly heated to a desired temperature generally commensurate with heating requirements for adhesion of filaments onto working-surface 158 of workpiece platform assembly 162. A combination of discrete heat sources 216 and a plurality of heat diffuser layers provide uniform heating of working-surface 158 of workpiece platform assembly 162 at the desired temperature.

Workpiece platform assembly 162 is comprised of discrete heat sources 216 comprised of heating elements (also known as heating pads or heat sheets). Heating elements include an adhesive backing that fix the heating elements onto a bottom side of diffuser plate 208. It should be noted that floor plate 164 may further include a thermal insulator, which is connected to the top surface 170 of floor plate 164 to isolate heat emanating from heating elements 216.

The number of discrete heat sources 216 used for uniform heating of working-surface 158 of workpiece platform assembly 162 at the desired temperature is dictated by power rating and dimensions of discrete heat sources 216, and surface area of a diffuser plate 208 available with which to associate discrete heat sources 216. Accordingly, the number of discrete heat sources 216 used and the power rating selected to accomplish the desired, uniform heating is a matter of geometry.

The uniform heat requirements are to have the maximum coverage while meeting the minimum heating requirements per unit area for work-surface 158. Discrete heat sources 216 (e.g., heating elements or pads) are manufactured at specific dimensions and power ratings. Therefore, the number, dimensions, and power rating of each discrete heat source 216 used depends on the dimensions of diffuser plate 208 and the required uniform heating of working-surface 158 of workpiece platform assembly 162 (e.g., average Temp° per Unit Area).

Therefore, given the desired temperature requirements of filaments used, the next step is to determine the dimensions of working-surface 158 and the desired temperature requirement per unit area that are generally commensurate with the desired temperature for the filaments. Thereafter, determine the dimensions of the diffuser plate 208, which will determine the number of discrete heat sources 216, power ratings, etc. based on the available types that are needed. Accordingly, the illustrated number and power ratings for the discrete heat sources 216 should not be limiting and may very well be varied. It should be noted that the lesser the number of discrete heat sources 216 used, the simpler the control system for delivering the appropriate heat. Therefore, it is preferred to use the least number of discrete heat sources 216 while maintaining the required uniform heating.

As further illustrated, workpiece platform assembly 162 is comprised of a platform frame 190 (similar to a picture frame) that confines multiple layers of the workpiece platform assembly. Platform frame 190 has multiple frame openings for securing workpiece platform assembly 162 onto floor plate 164, with platform frame 190 in direct, mechanical contact with floor plate 164. Periphery edges 218 of diffuser plate 208 of workpiece platform assembly 162 are inserted and secured within longitudinally extending channels 222 of platform frame 190, and covered by an elastic thermal insulator 220 (similar to a shower glass being secured within an extruded aluminum shower glass frame by rubber).

Diffuser plate 208 is comprised of material that rapidly conducts to laterally diffuse heat (non-limiting example of which may include aluminum) from discrete heat sources 216 and has a sufficient thickness for conduction of heat and to provide stiffness while enabling generally uniform distribution of heat emanated from discrete heat sources. This eliminates potential "hot spots" on diffuser plate 208.

In addition to a diffuser plate 208 that facilitates uniform lateral (in-plane) distribution of heat, workpiece platform assembly 162 further includes a thermally conductive pad 224 associated with a top surface of diffuser plate 208, which further facilitates uniform lateral (in-plane) distribution of heat. Further included is work-layer member 160 (e.g., a glass), which further facilitates in uniform distribution of heat. Work-layer member 160 includes working-surface 158, with work-layer member 160 positioned onto a top surface of the thermally conductive pad 224. Accordingly, as heat is conducted towards working surface 158 of work-layer member 160, it continuously and uniformly diffuses to provide a uniformly heated surface.

Diffuser plate 208 further includes third set of reinforcement members 210 that are connected to a bottom surface of the diffuser plate 208, adjacent discrete heat sources 208, with third set of reinforcement members 210 connected between bottom surface of diffuser plate 208 and top surface 178 of floor plate 164. Diffuser plate 208 is large 24" by 24" and more and hence, reinforcement members 210 stiffen diffuser plate 164 so that it does not change its flatness (especially due to potential "hot spots").

Work-layer member 160 is comprised of high temperature material, non-limiting example of which may include borosilicate glass. Work-layer member 160 includes thermal expansion openings 226 for securing work-layer member 160 onto diffuser plate 208 using thermal expansion couplers 228. Thermal expansion openings 226 include a grommet 230, enabling for thermal expansion of the work-layer member 160 while being constrained from vertical movement. Grommets 230 provide elastomeric separating of opening 226 of work-layer member 160 and the shoulder bolts 182. This way, the mounting bolt 182 will not crack the work-layer member 160 during thermal expansion of member 160.

Work-layer member 160 is further comprised of sufficient thickness (at least 9 mm or higher thickness) and includes curved periphery edges 230 and curved vertices 232. Ideal shape for a uniform thermal expansion is a rounded circular disc where the center is equally distanced from the circumference or periphery edges (with no vertices) and hence, the closer work-layer member is configured to a shape of a rounded circular disc the better. A work-layer member with a polygonal periphery on the other hand, would have a center that is not equally distanced to periphery edge and vertices of those edges. That is, the distance from the center to a periphery edge will be different from the distance from the center to a vertex associated with the periphery. Therefore, due to the asymmetric distance, there might be a shift in the center of the work-layer member due to asymmetric thermal expansion. For example, a vertex of a polygonal configured work-layer member may have a lower thermal expansion rate due to its longer distance from the center compared to a side (or periphery edge) that has a shorter distance from the center and hence, have a higher thermal expansion rate. Accordingly, work-layer member is shaped with curved periphery edges and curved vertices, mimicking (as close as possible) a disc structure. In general, workpiece frame 190 may be made larger to provide clearance for curved edges 230 of work-layer member 160.

Figure 6A:
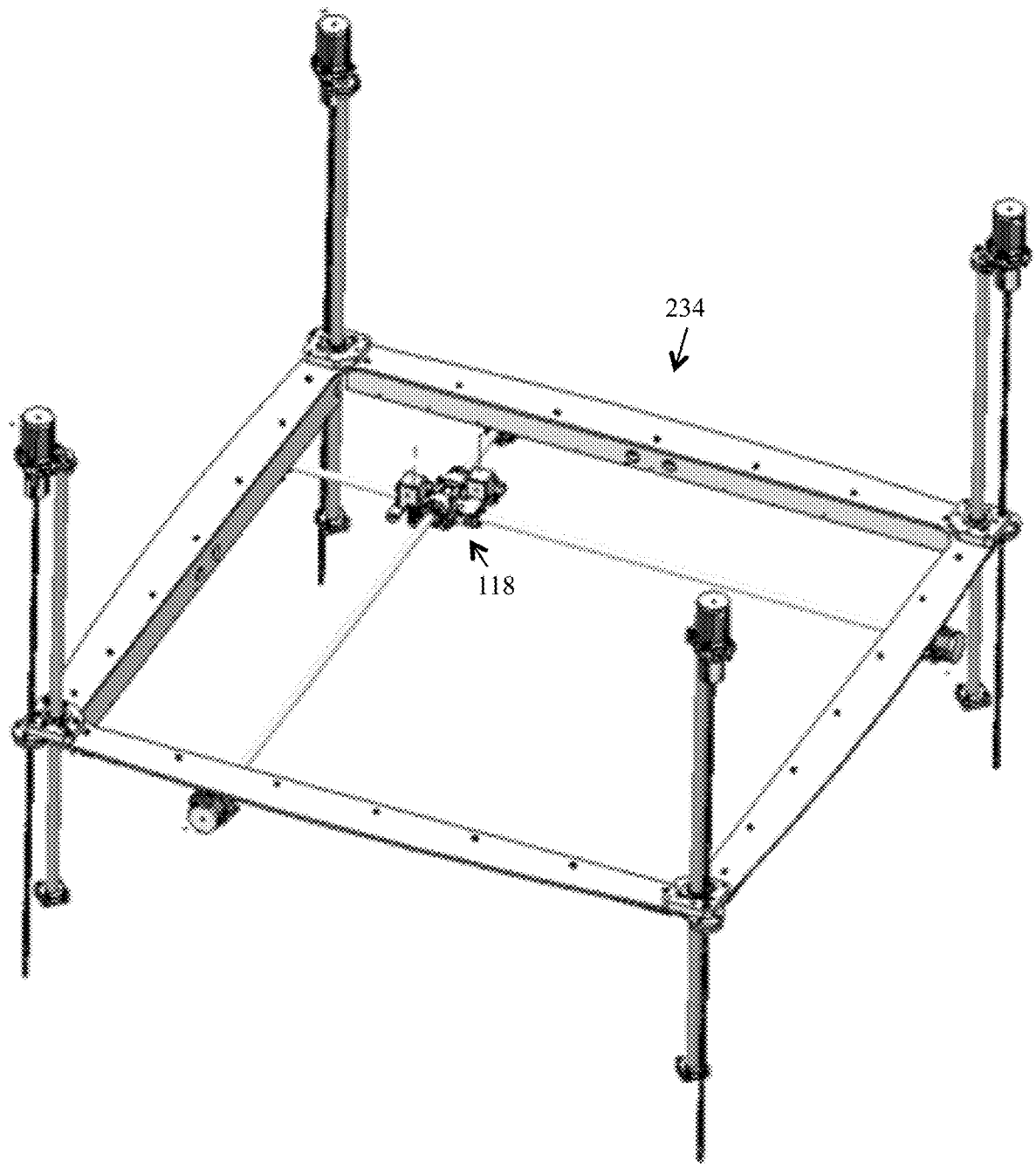
FIGS. 6A to 6O-4 are non-limiting, exemplary illustrations of positioning system of the digital fabrication apparatus shown in FIGS. 1A to 5P in accordance with one or more embodiments of the present invention.
Figure 6B:
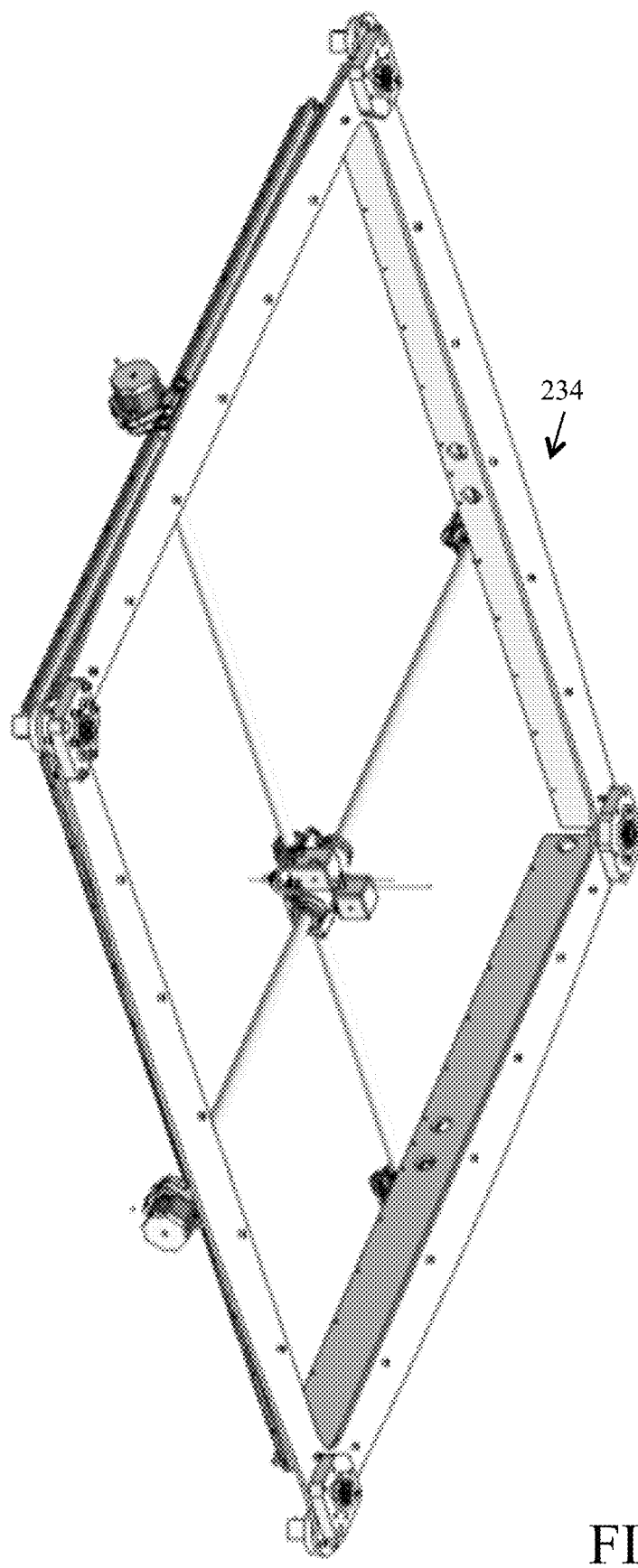
Figure 6C:
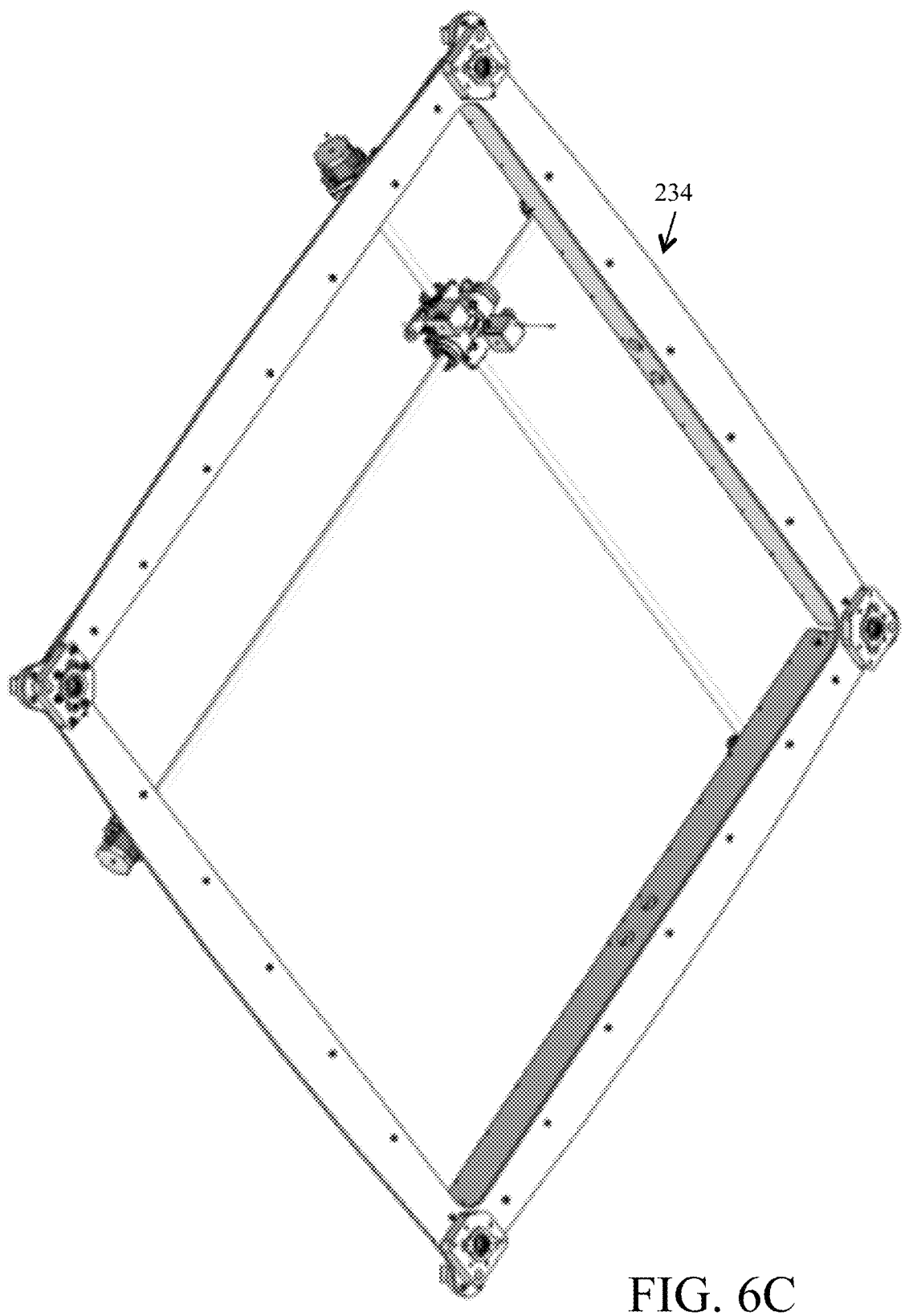
Figure 6D:
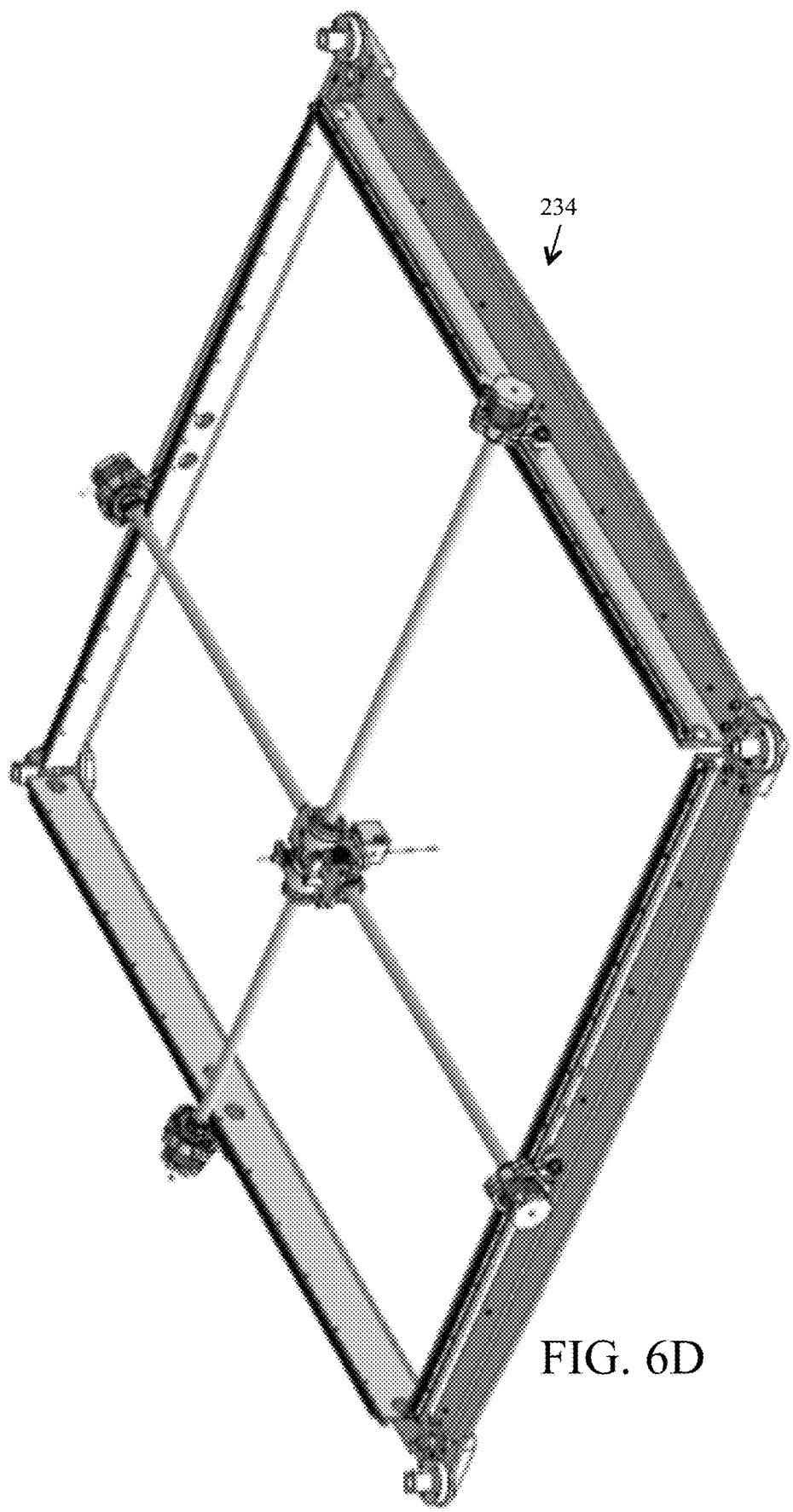
Figure 6E:
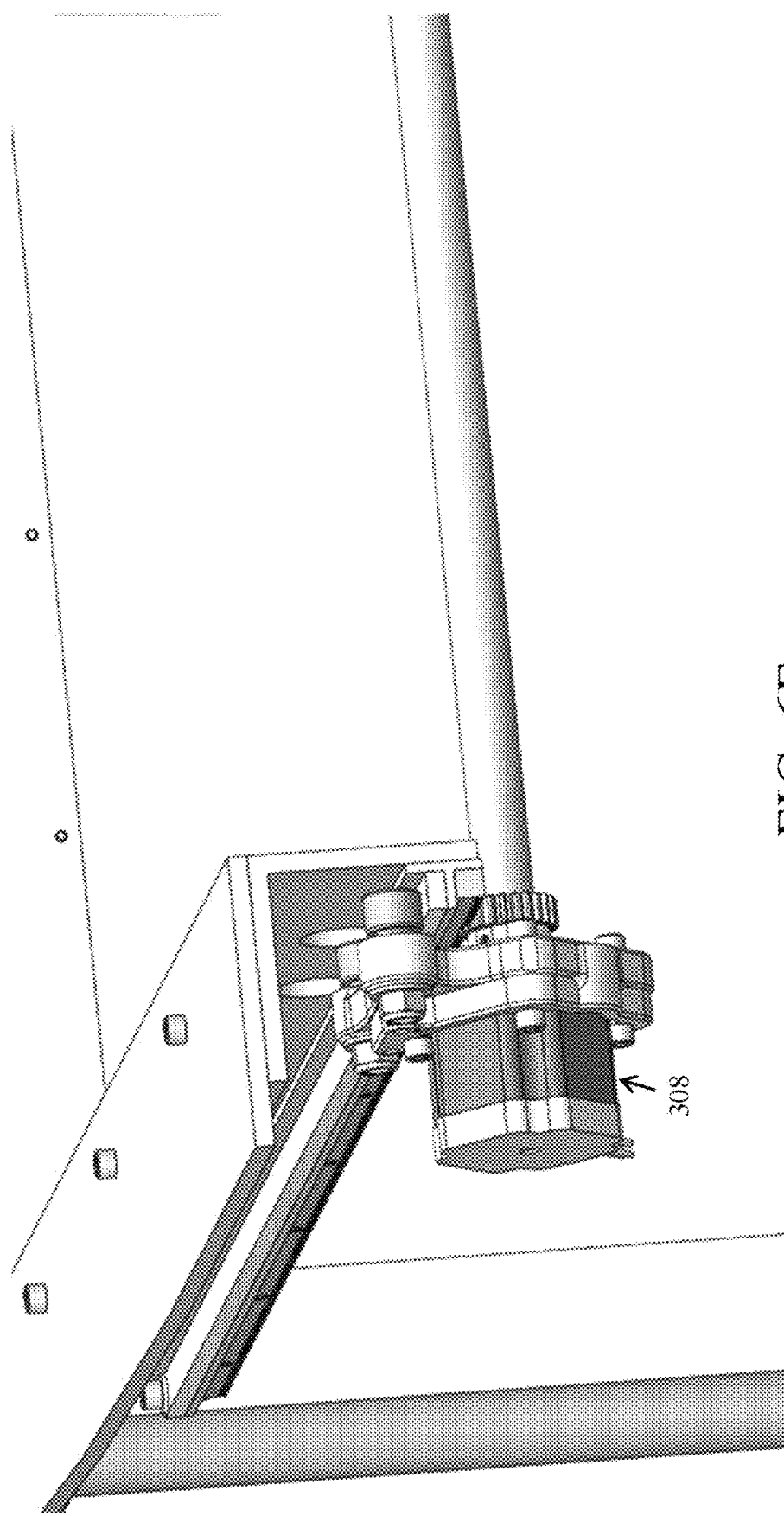
Figure 6F:
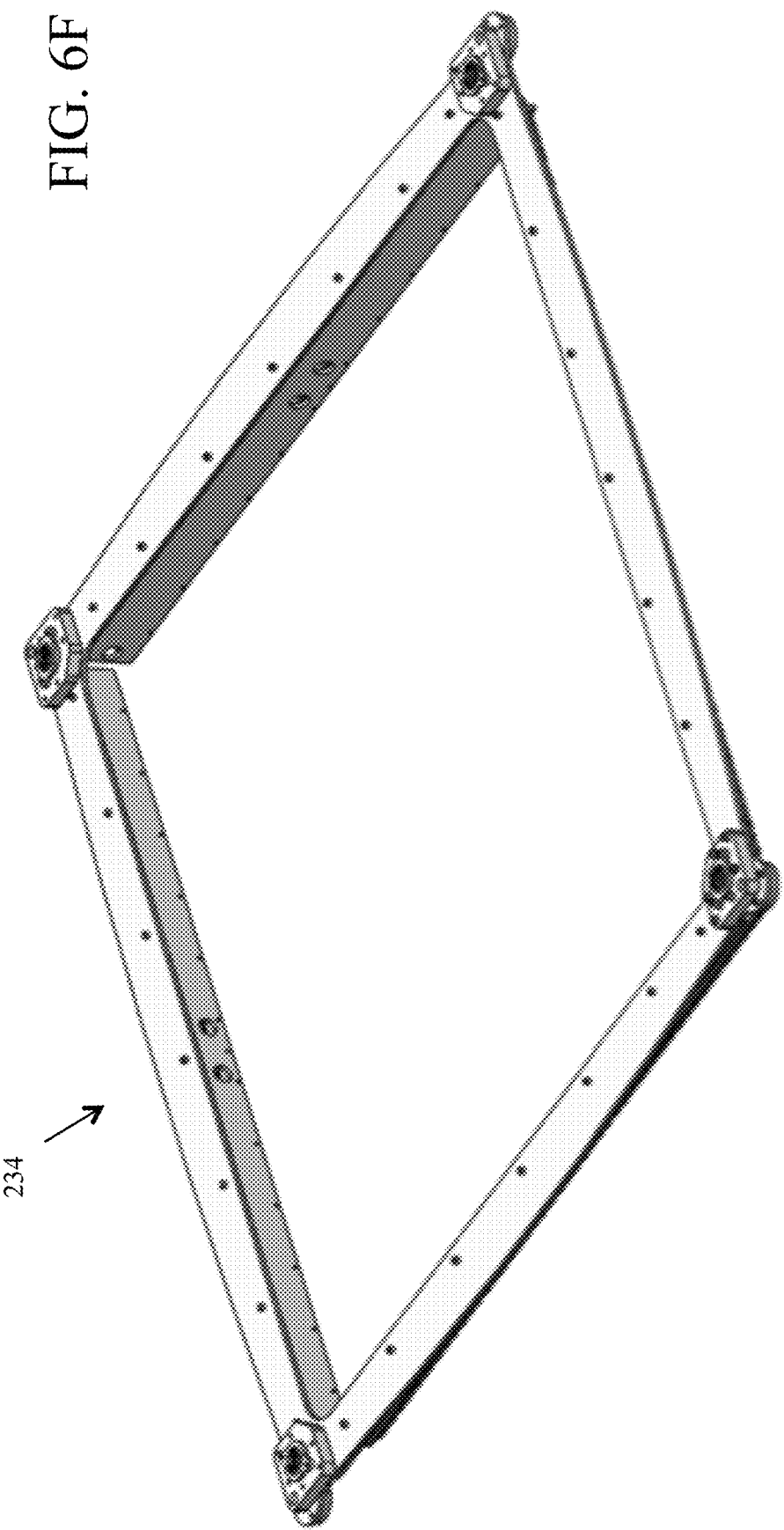
Figure 6G:
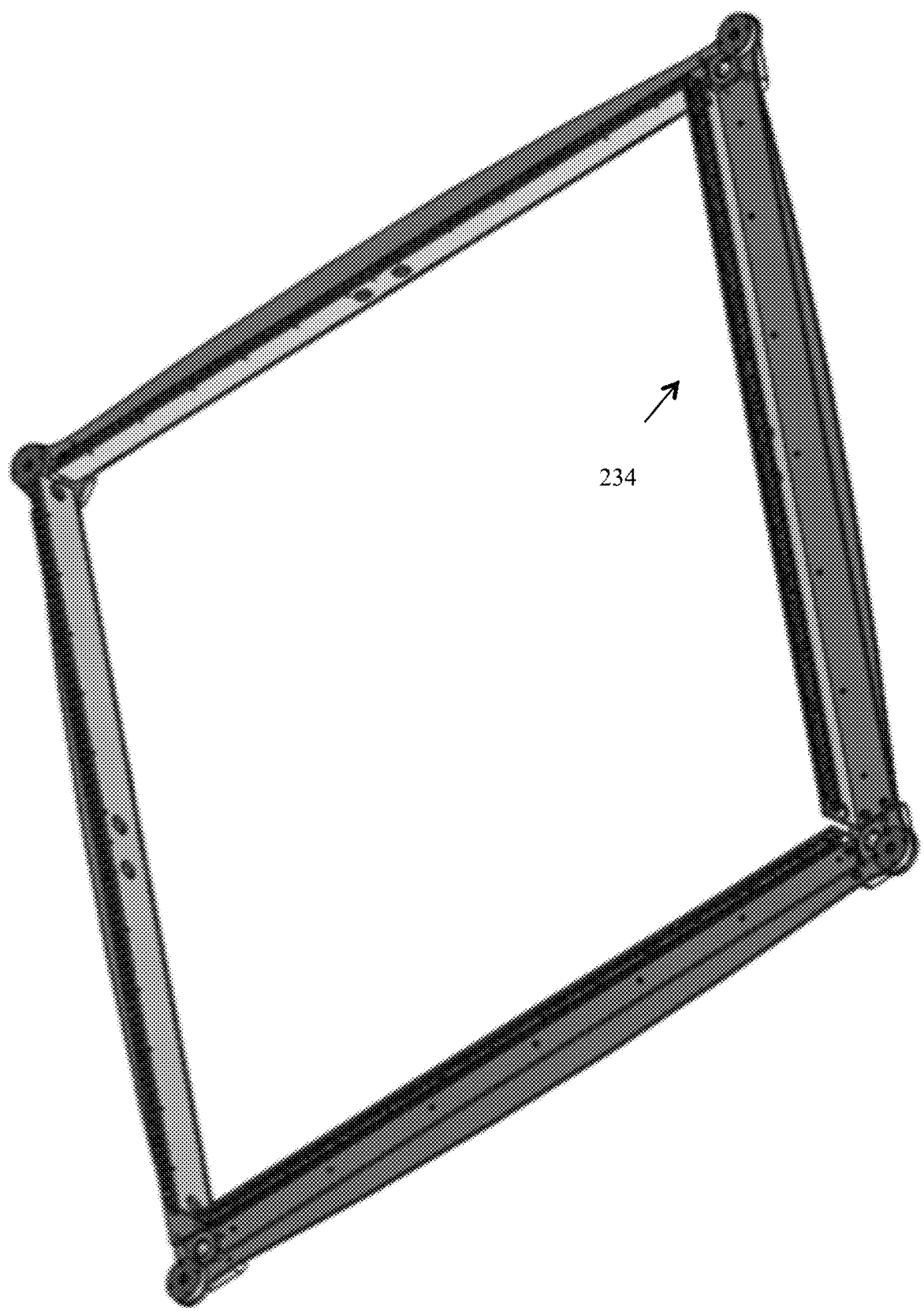
Figure 6H:
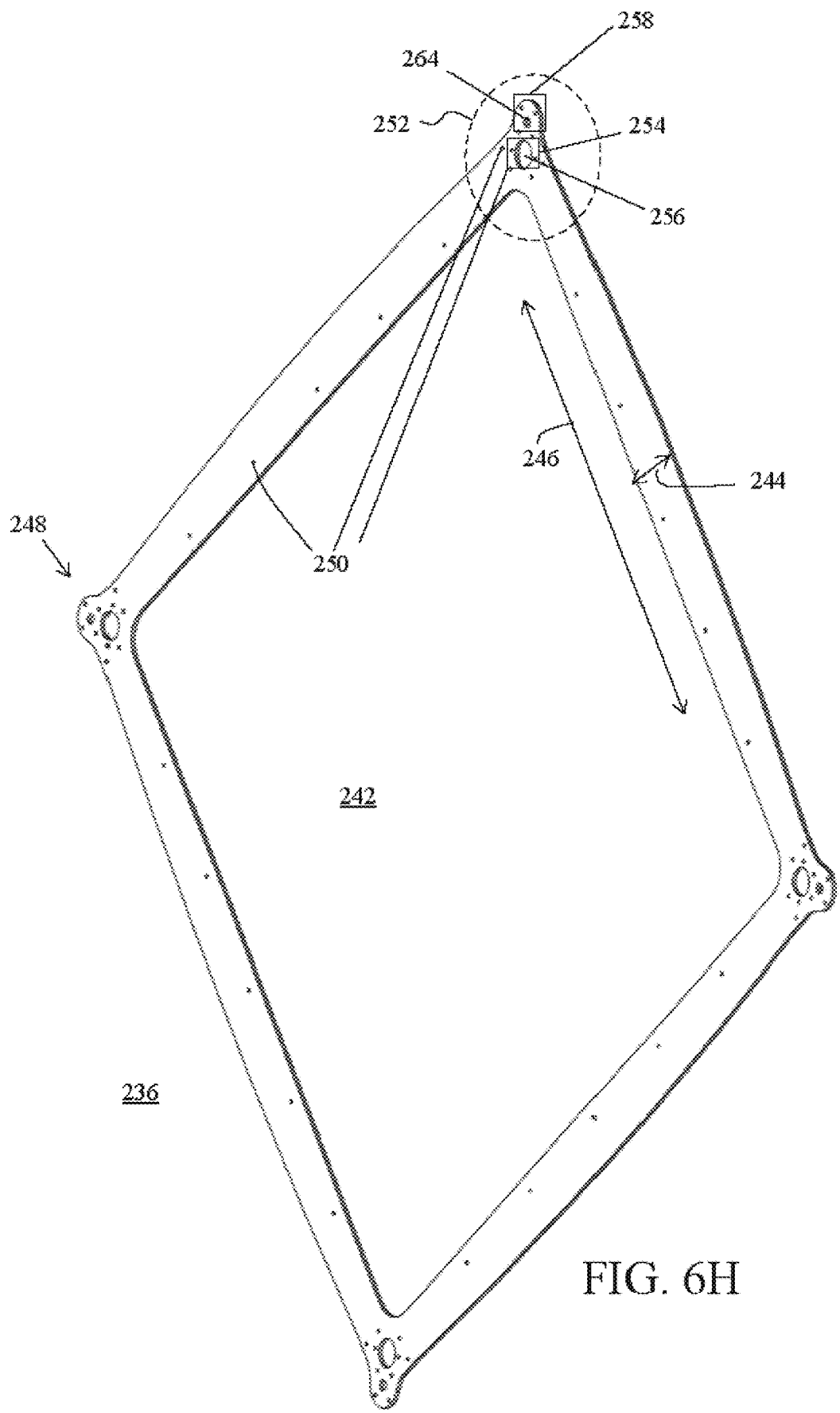
Figure 6I:
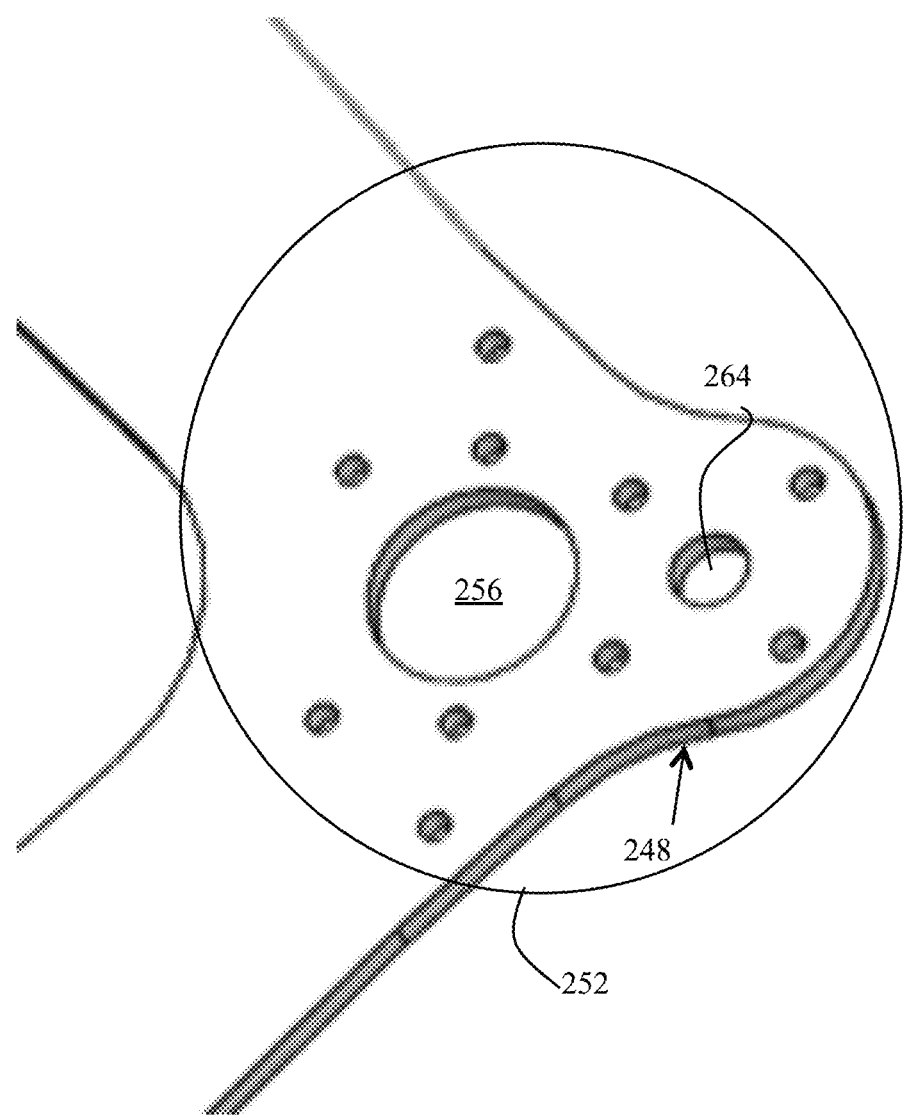
Figure 6J:
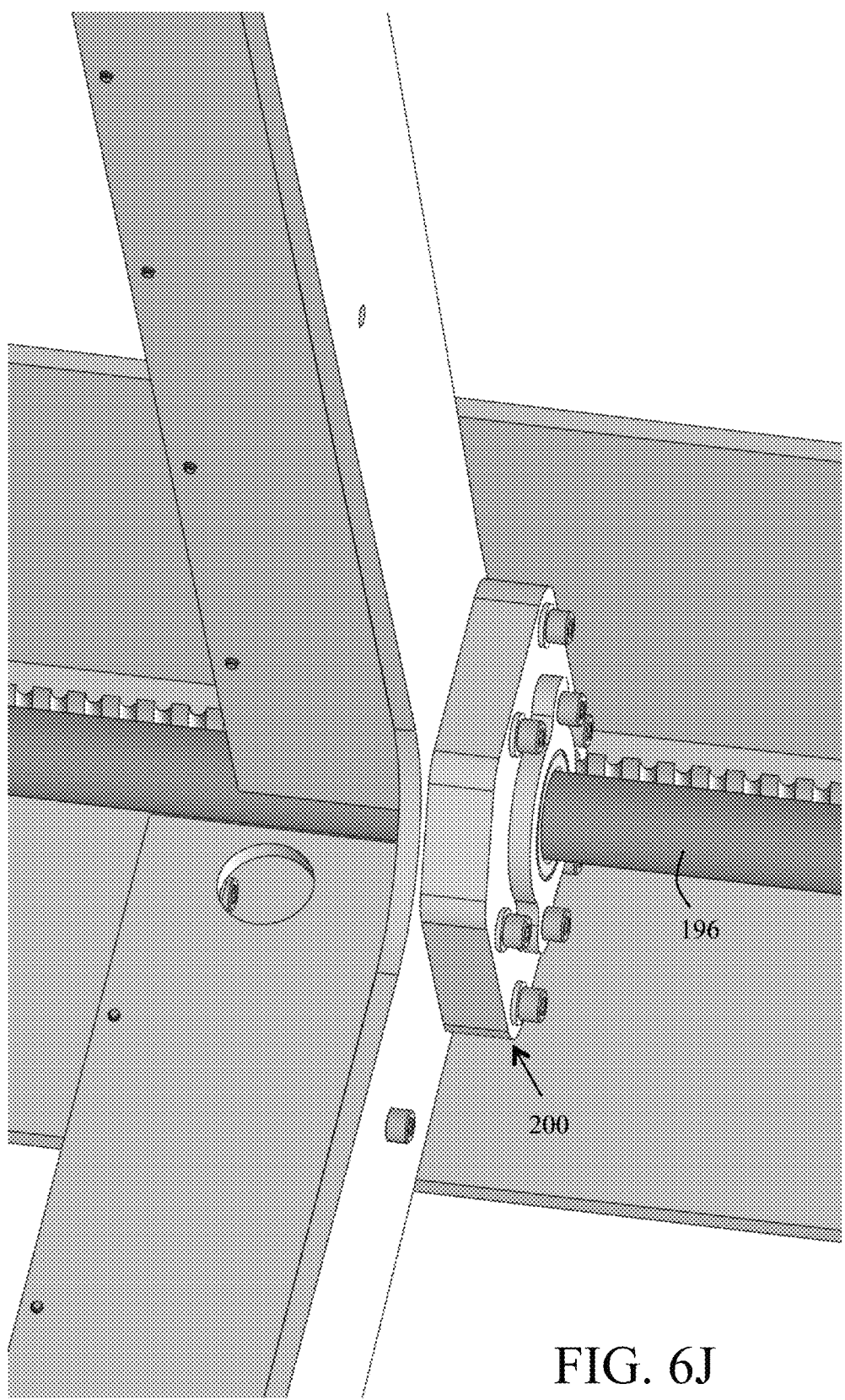
Figures 1, 6K:
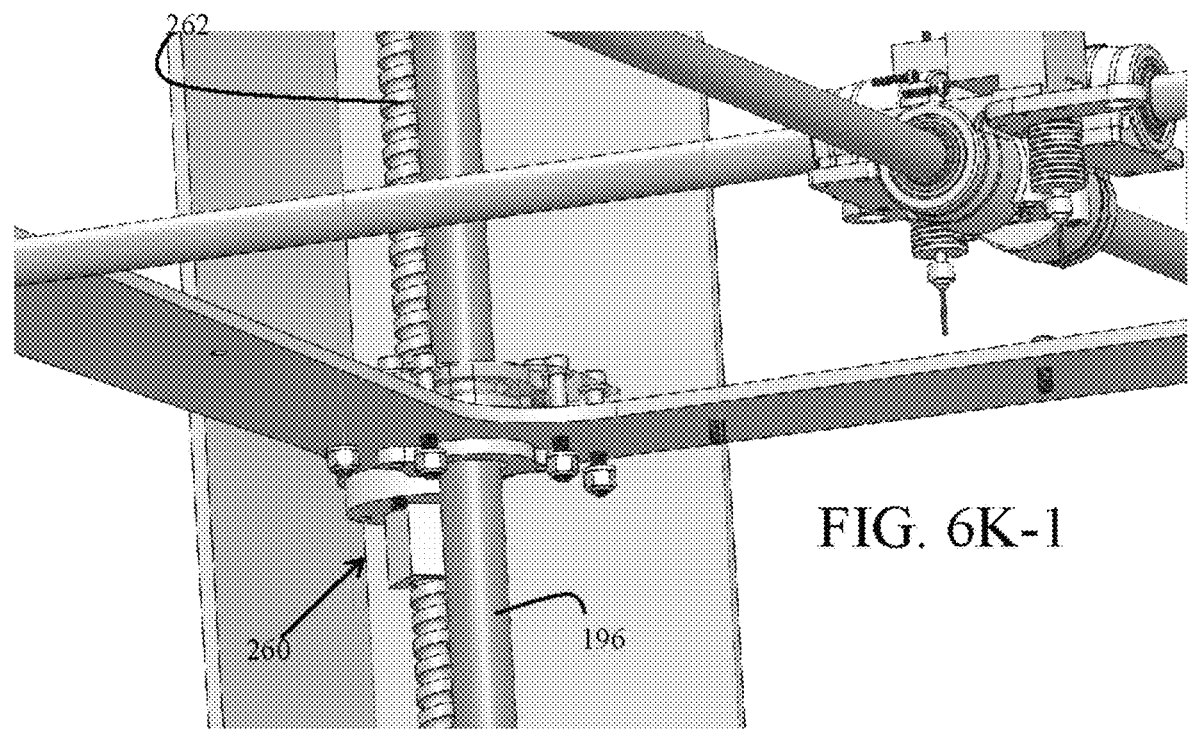
Figures 2, 6K:
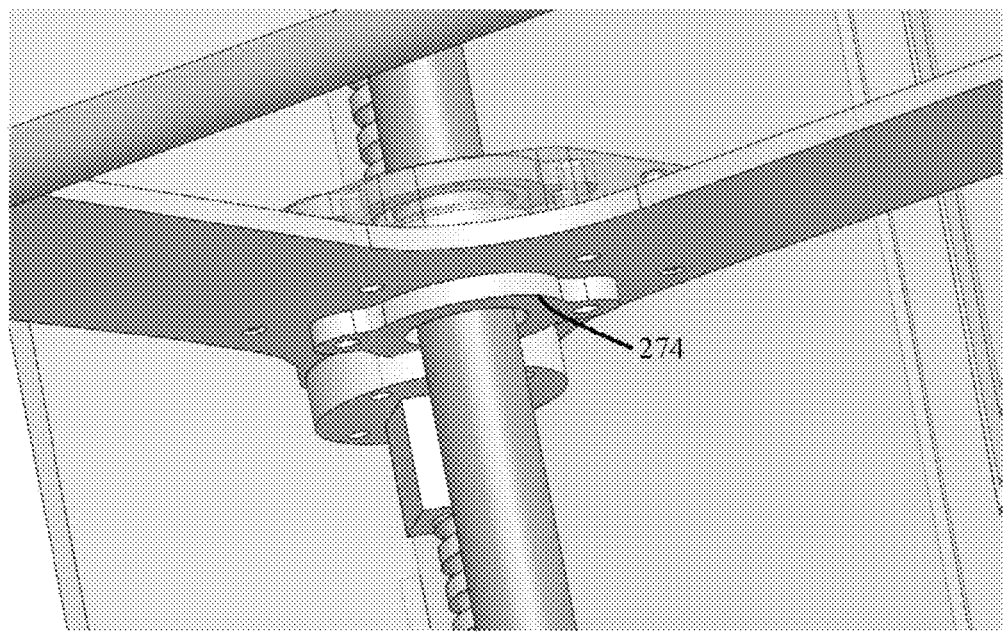
FIGS. 2A and 2B are non-limiting exemplary illustrations of a non-limiting frame construct of the digital fabrication apparatus shown in FIGS. 1A to 1C in accordance with one or more embodiments of the present invention.
Figures 3, 6K:
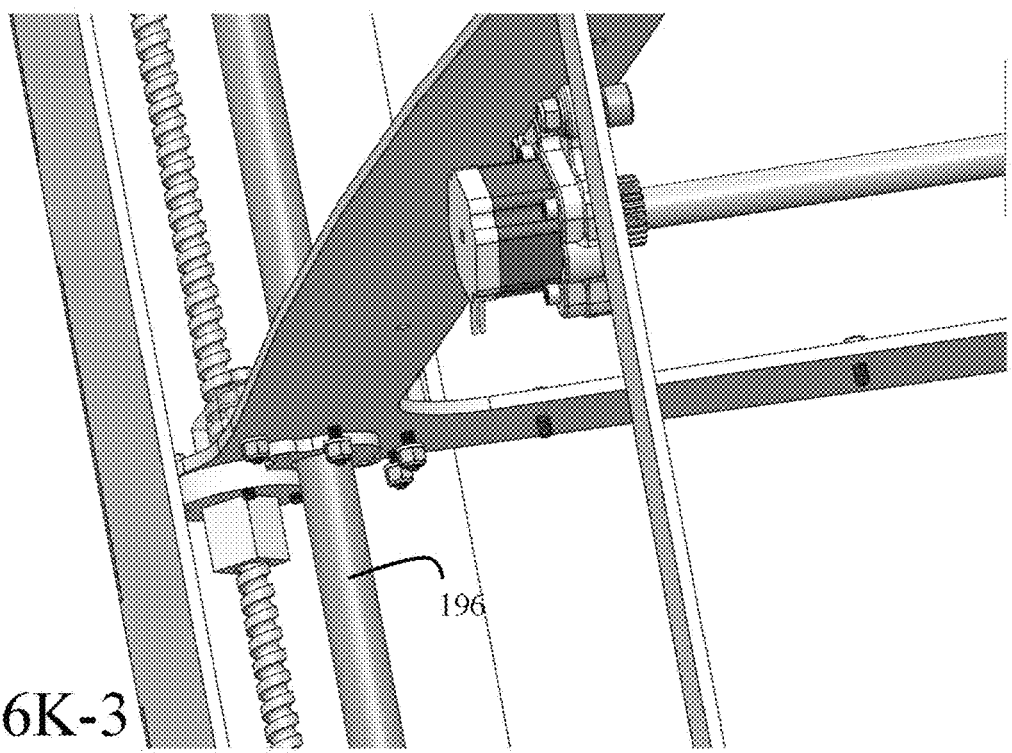
Figures 4, 6K:
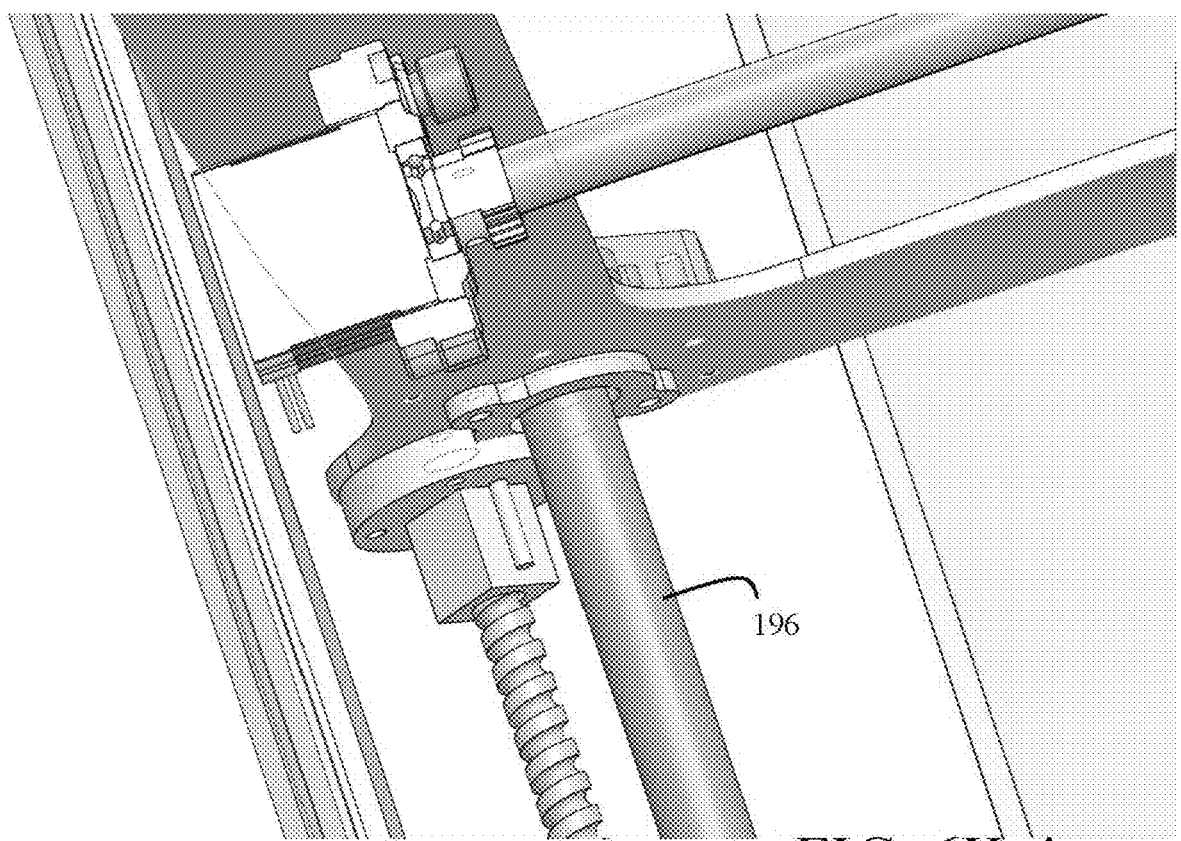
Figures 5, 6K:
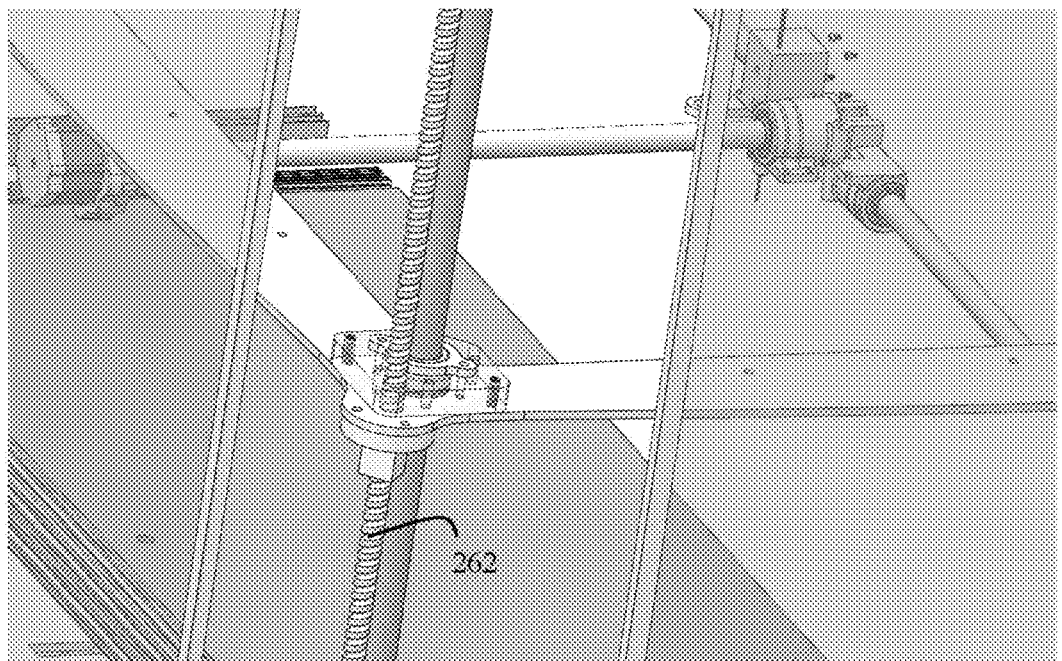
Figures 6, 6K:
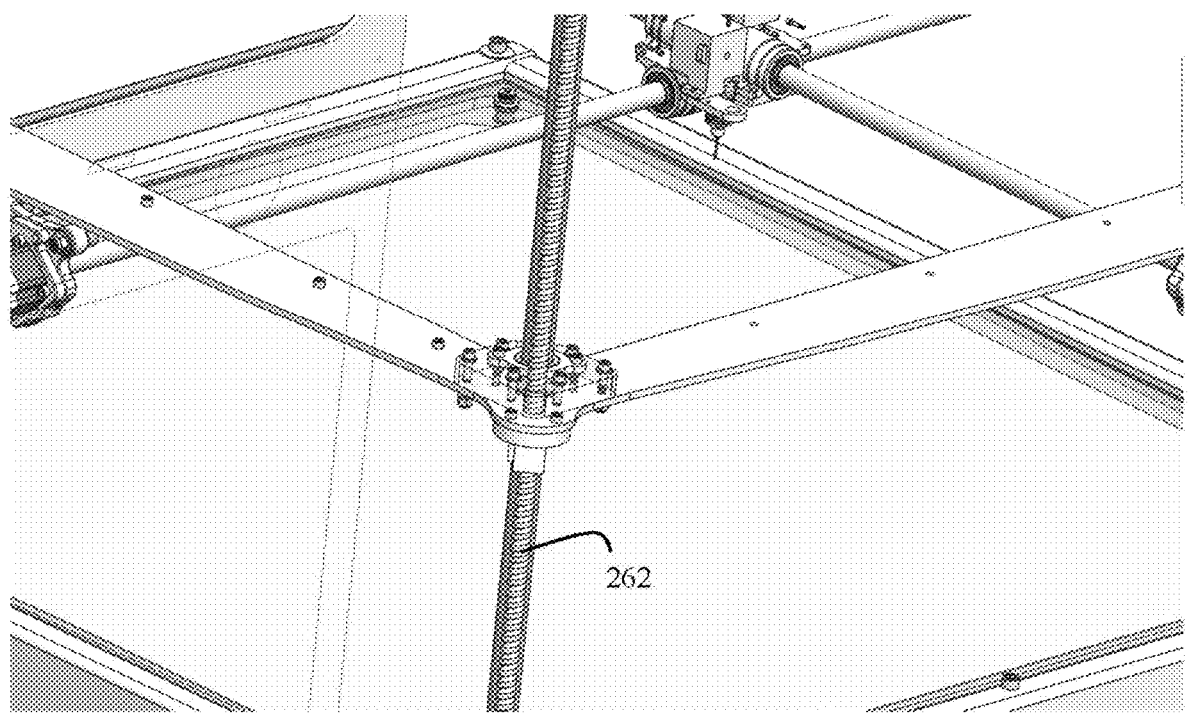
Figures 6, 6K, 7:
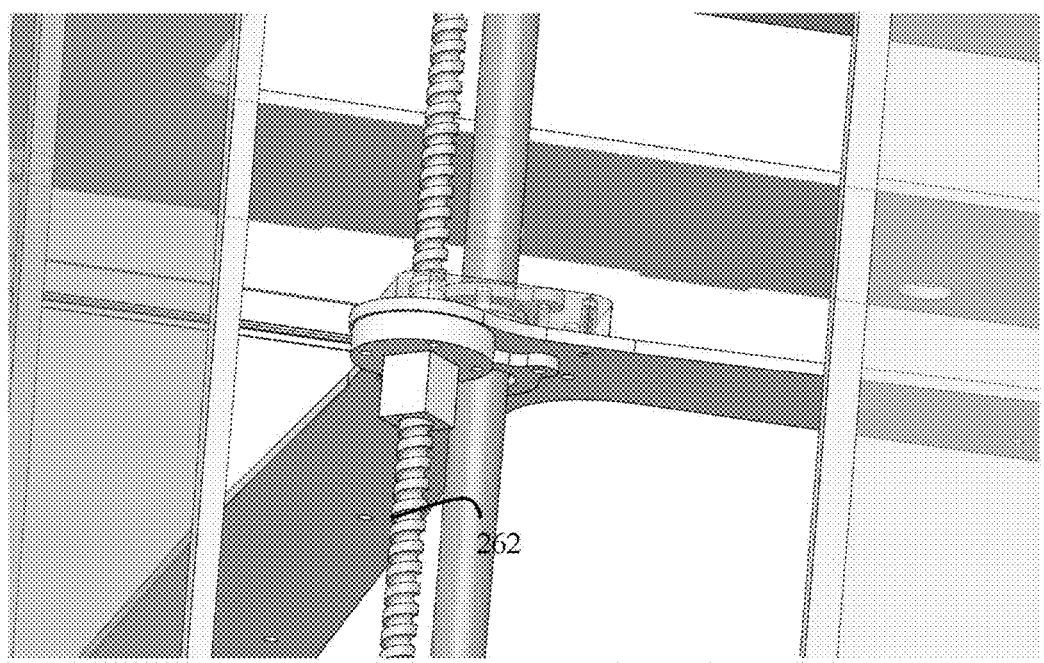
FIGS. 7A to 7L are non-limiting, exemplary illustrations of X-direction motive force mechanisms and Y-direction motive force mechanisms of the digital fabrication apparatus shown in FIGS. 1A to 6O-4 in accordance with one or more embodiments of the present invention.
Figures 6, 6K, 7, 8:
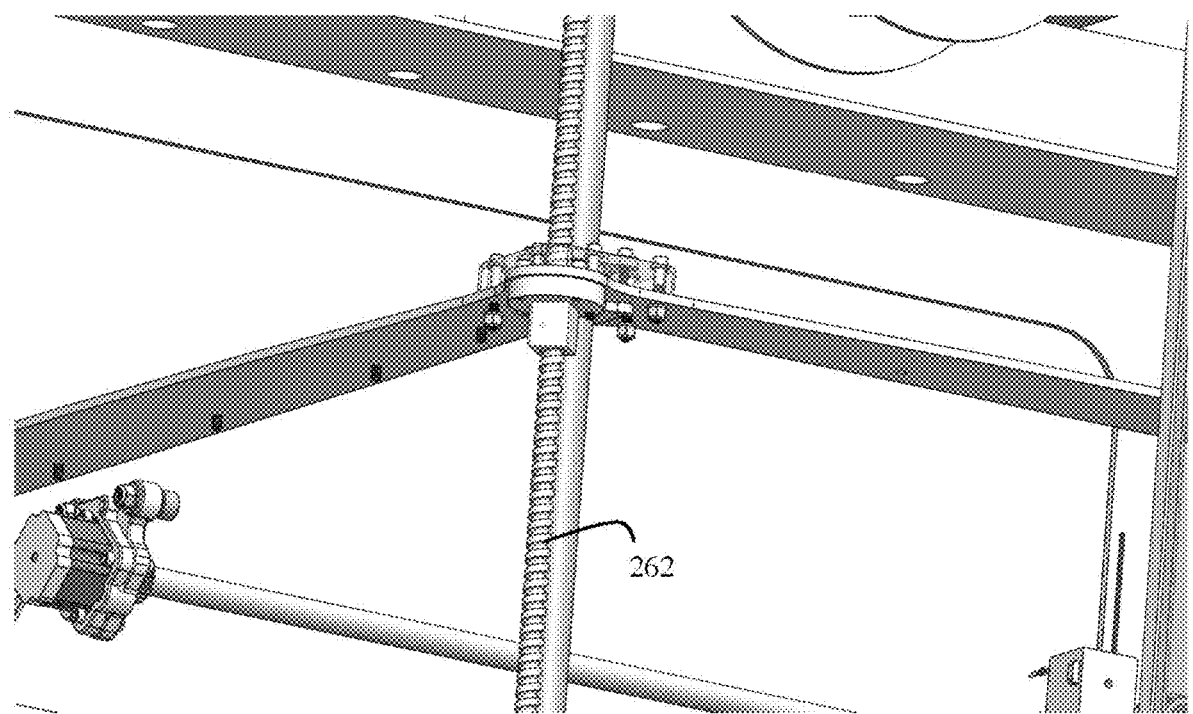
FIGS. 8A to 8I are non-limiting, exemplary illustrations of a moveable fabrication tool of the digital fabrication apparatus shown in FIGS. 1A to 7L in accordance with one or more embodiments of the present invention.
Figures 6, 6K, 7, 8, 9:
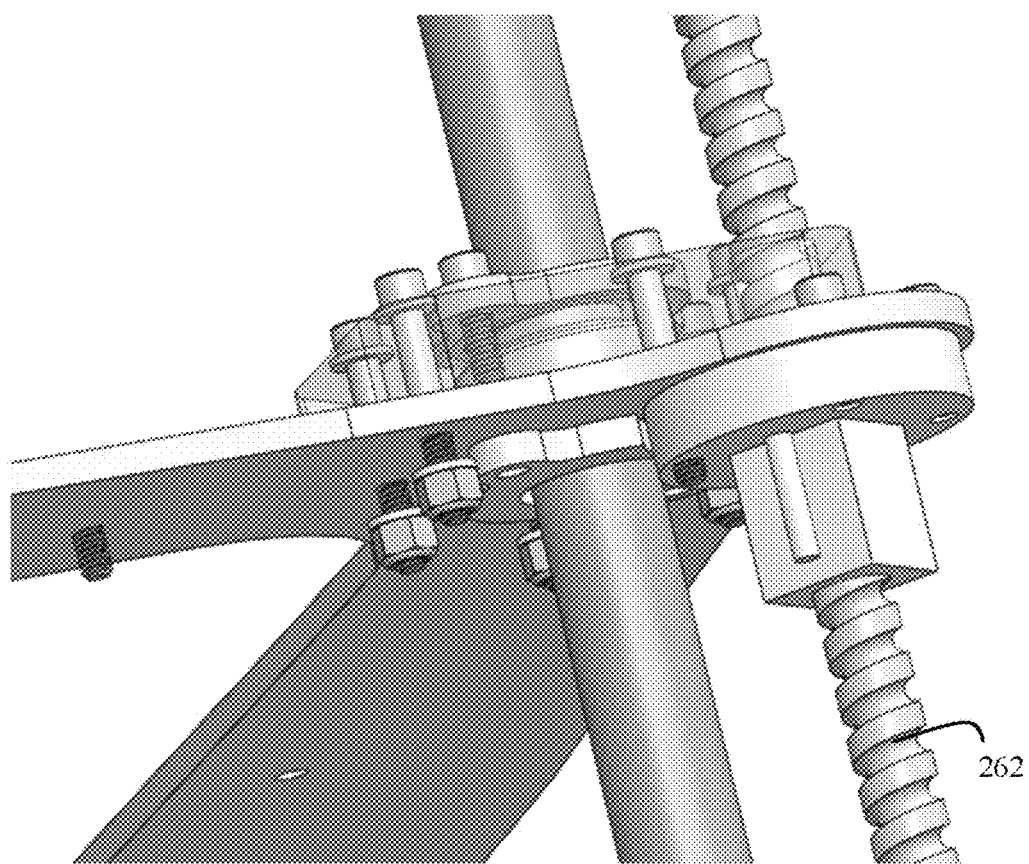
FIGS. 9A to 9N are non-limiting, exemplary illustrations of a top plate and Z-direction motive force mechanisms of the digital fabrication apparatus shown in FIGS. 1A to 8I in accordance with one or more embodiments of the present invention.
Figures 6, 6K, 7, 8, 9, 10:
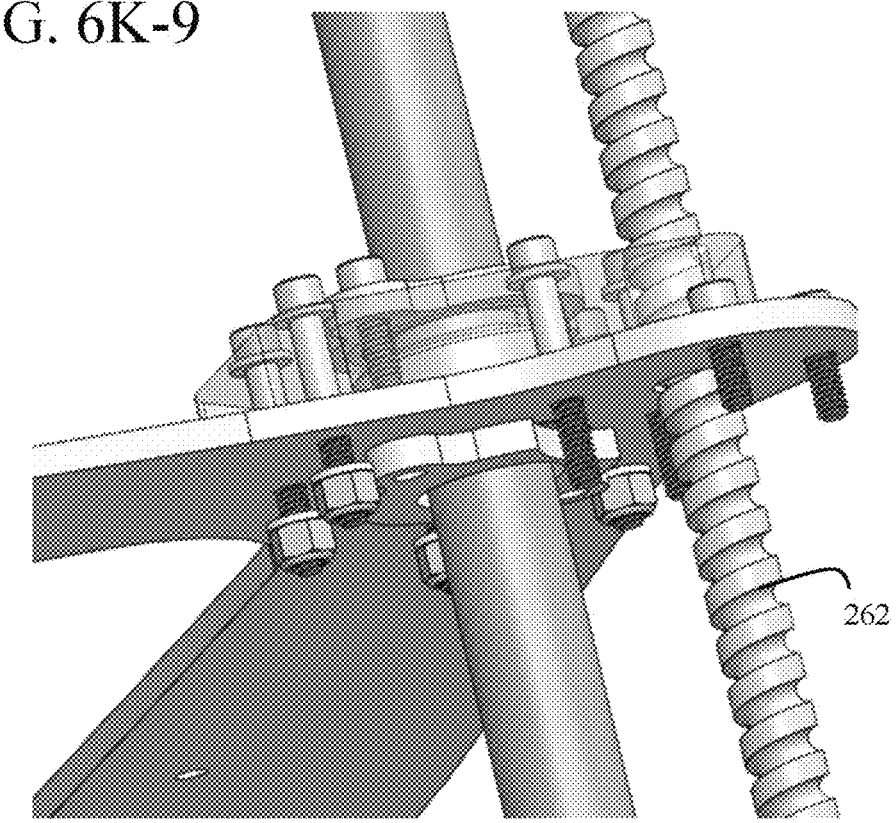
Figures 6, 6K, 7, 8, 9, 10, 11:
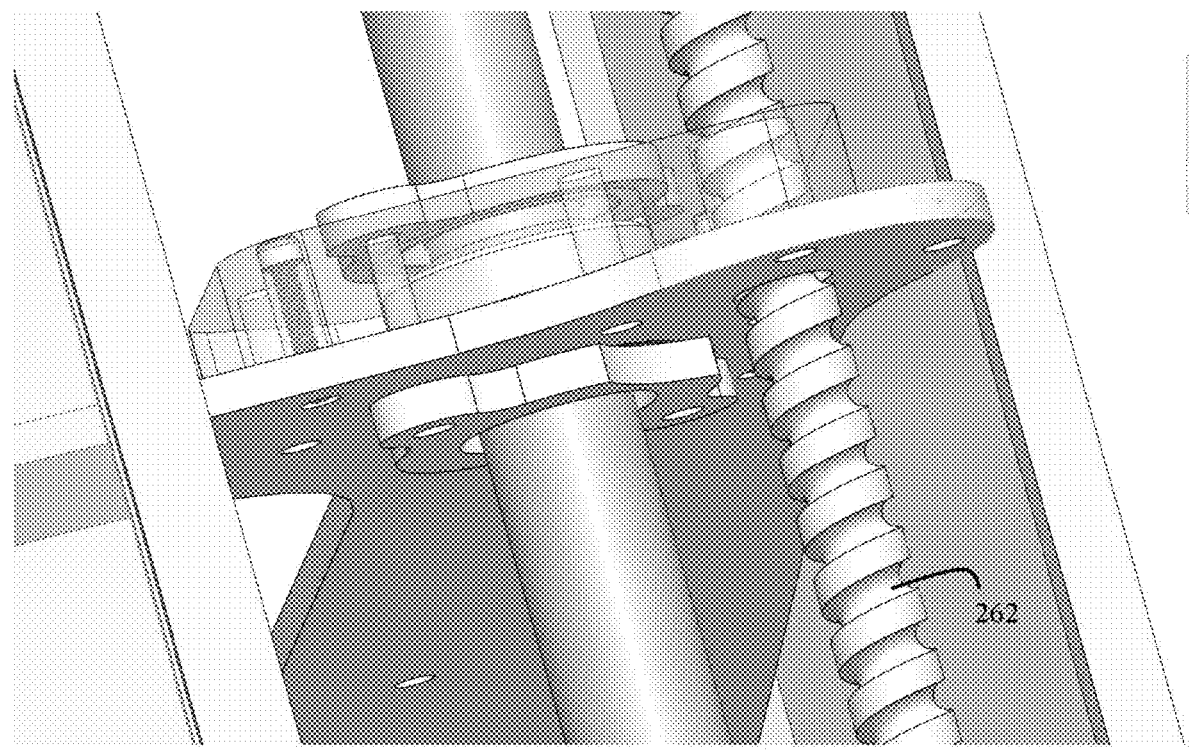
Figures 6, 6K, 7, 8, 9, 10, 11, 12:
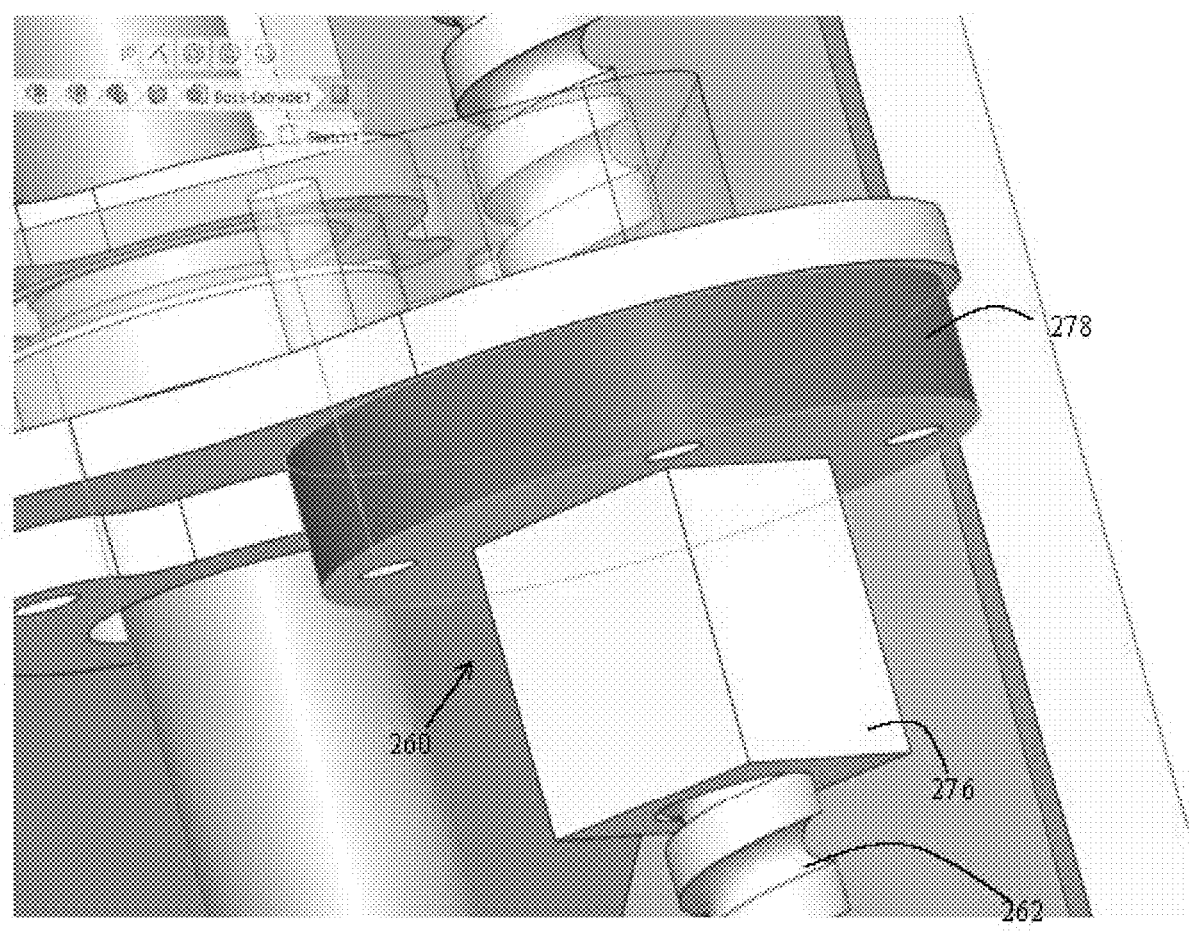
Figures 1, 6L:
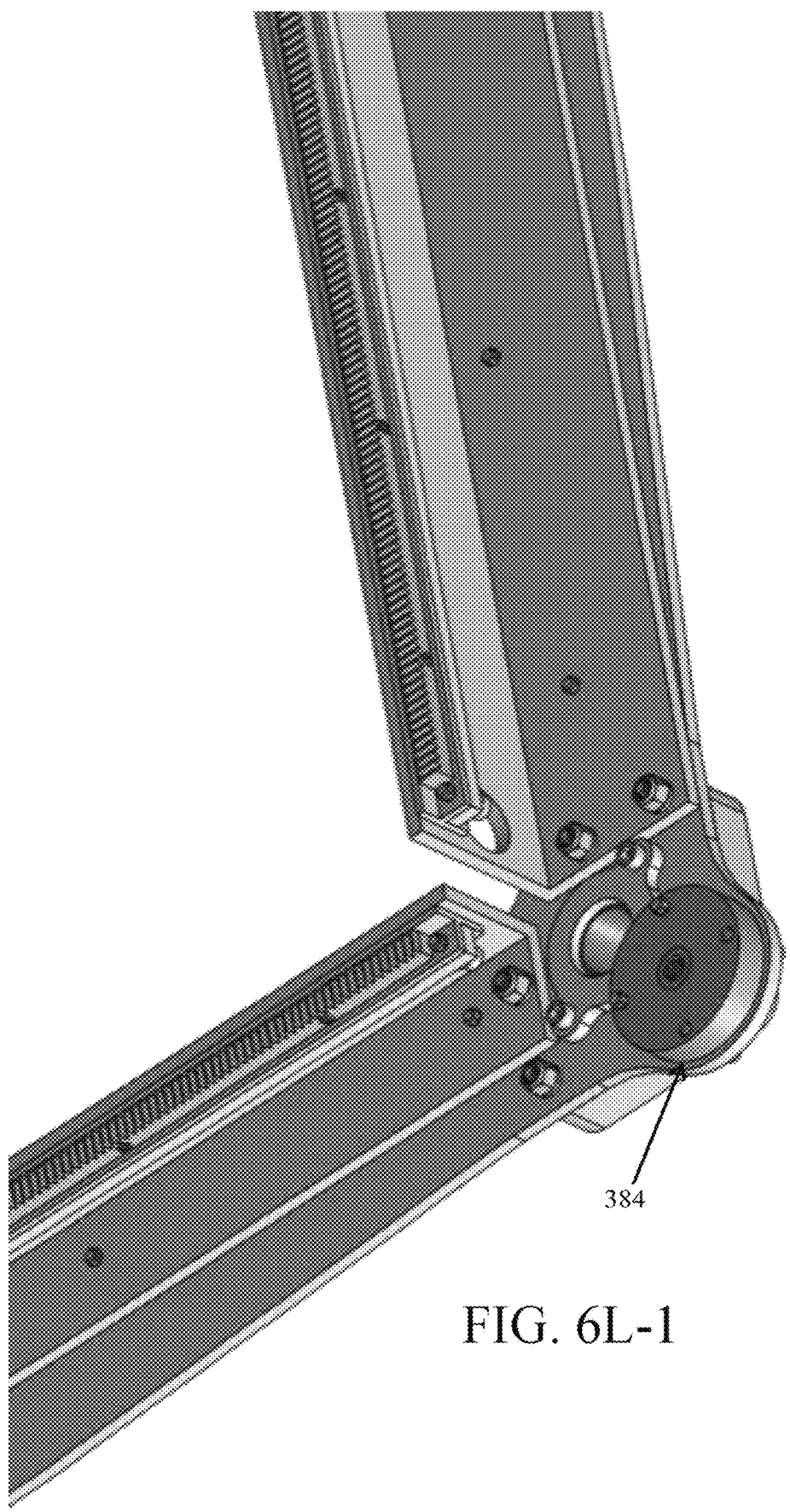
Figures 2, 6L:
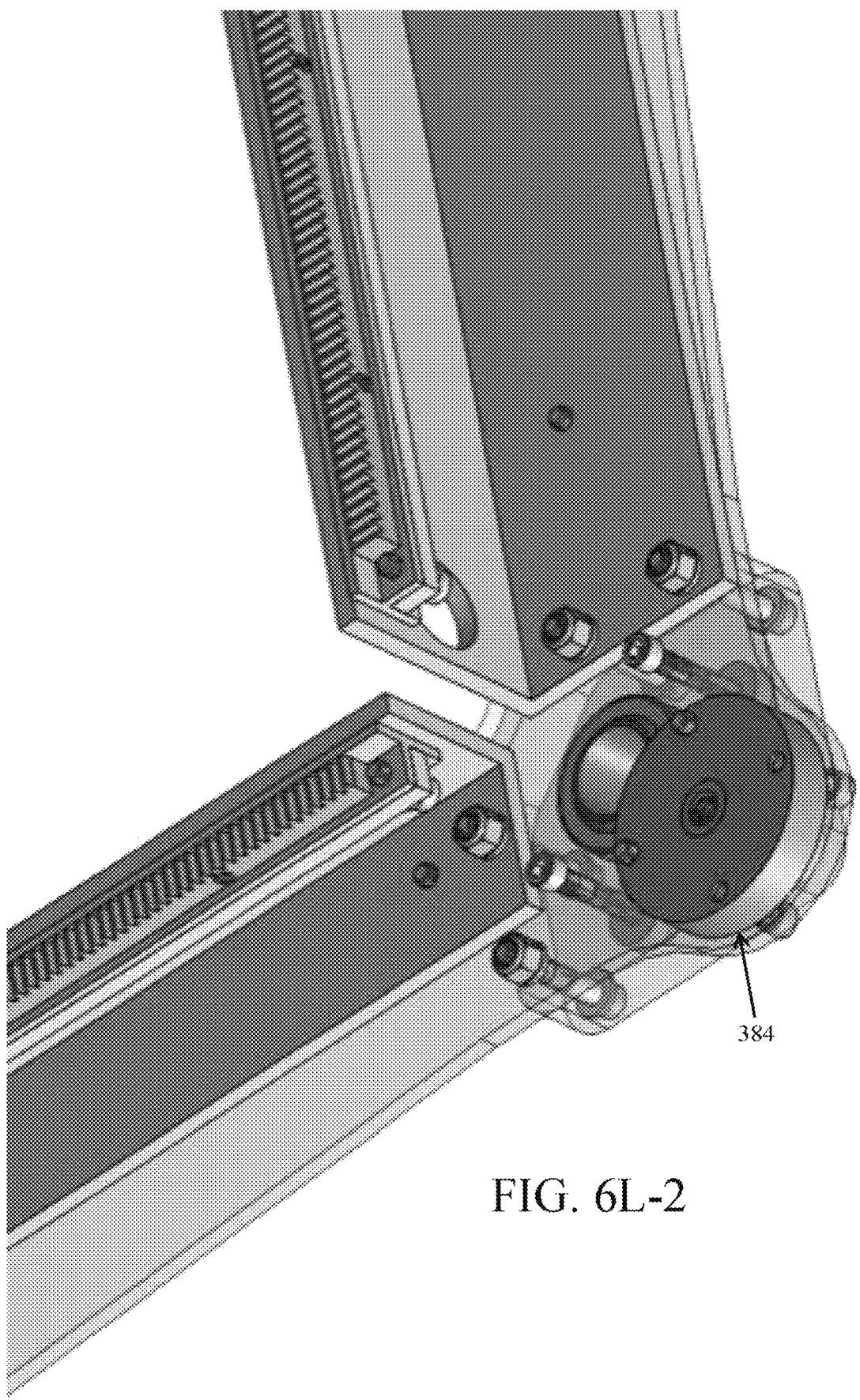
Figures 3, 6L:
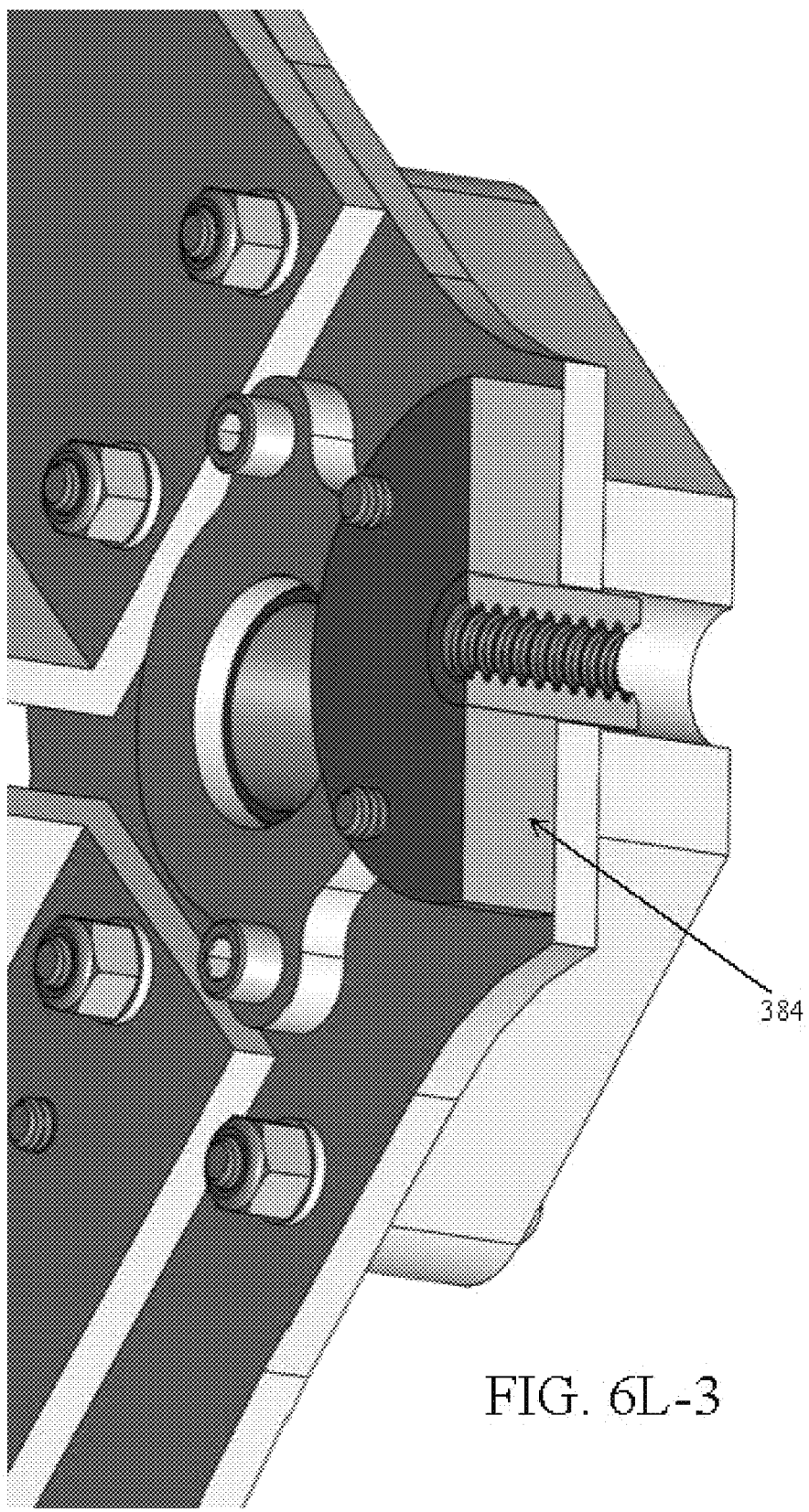
Figures 1, 6M:
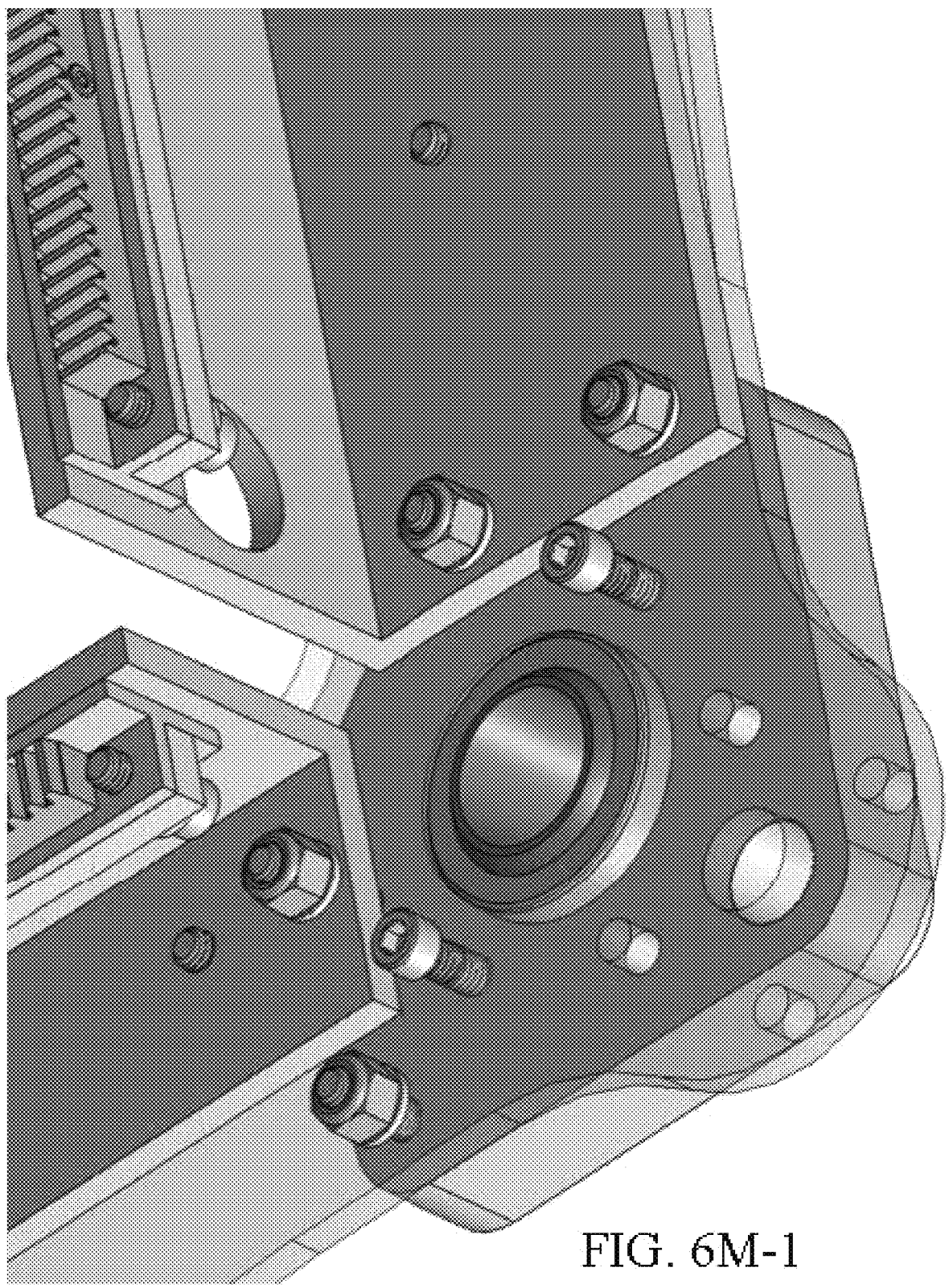
Figures 2, 6M:
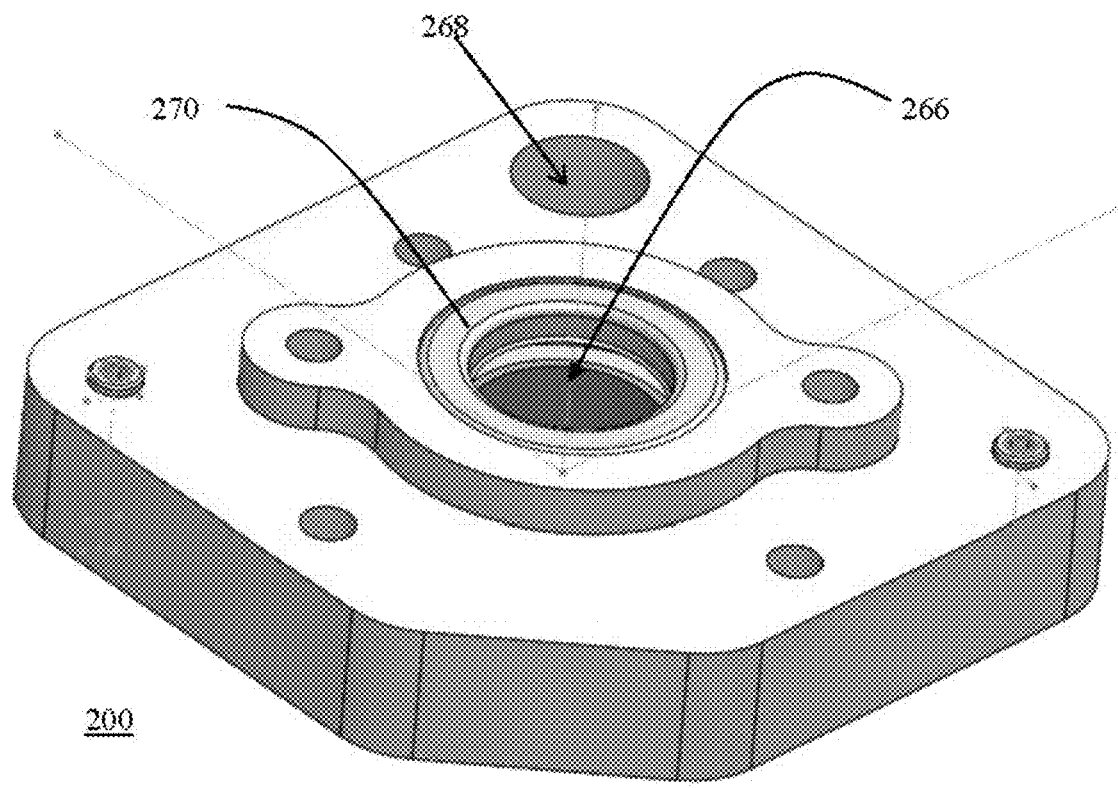
Figures 3, 6M:
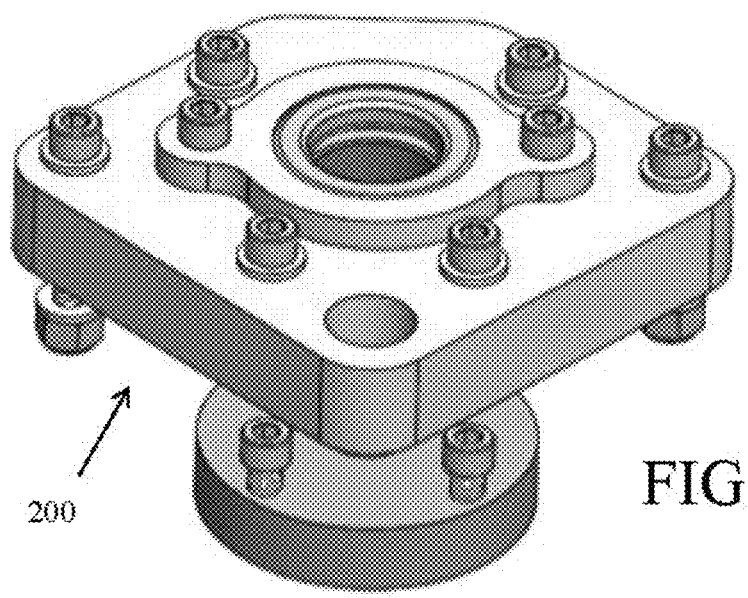
Figures 4, 6M:
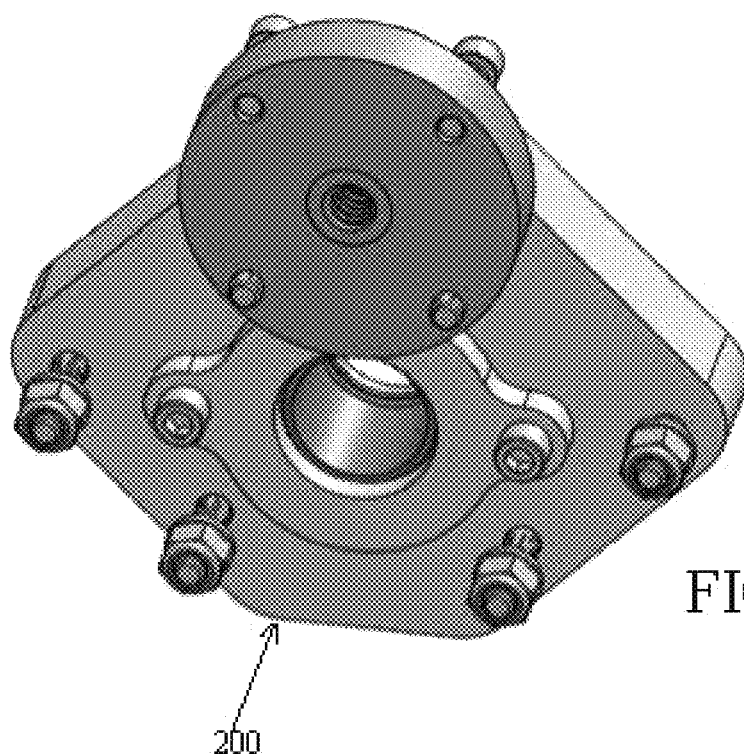
Figures 5, 6M:
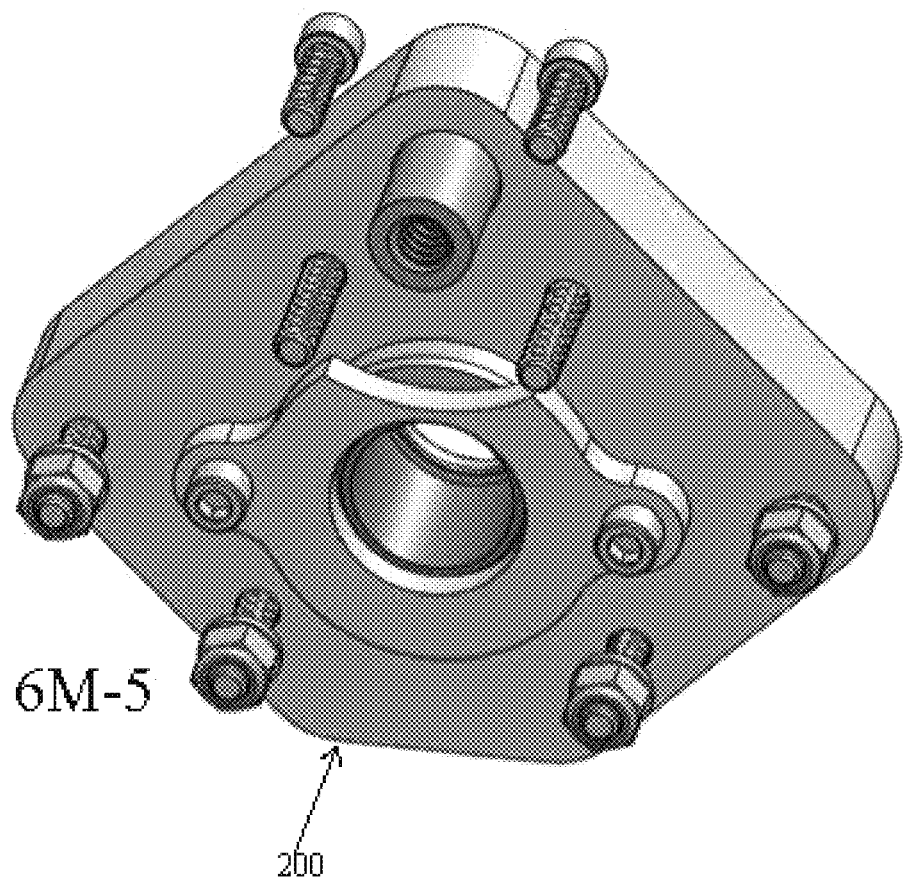
Figures 6, 6M:
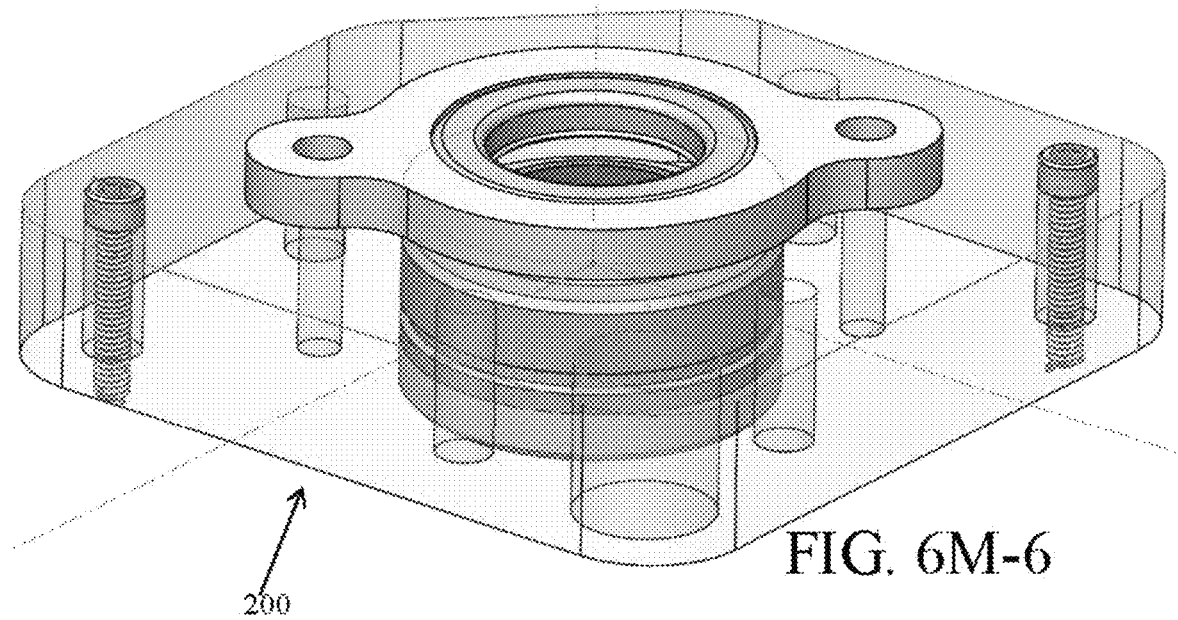
Figures 6, 6M, 7:
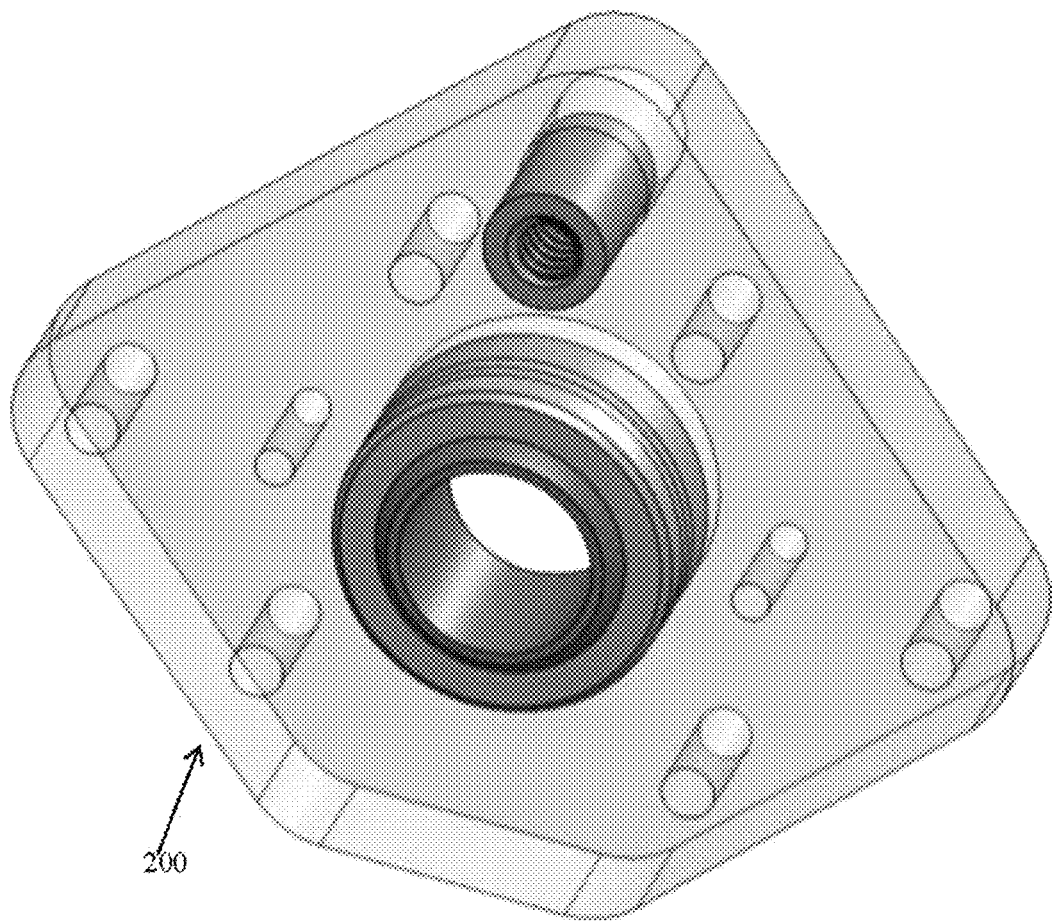
Figures 6, 6M, 7, 8:
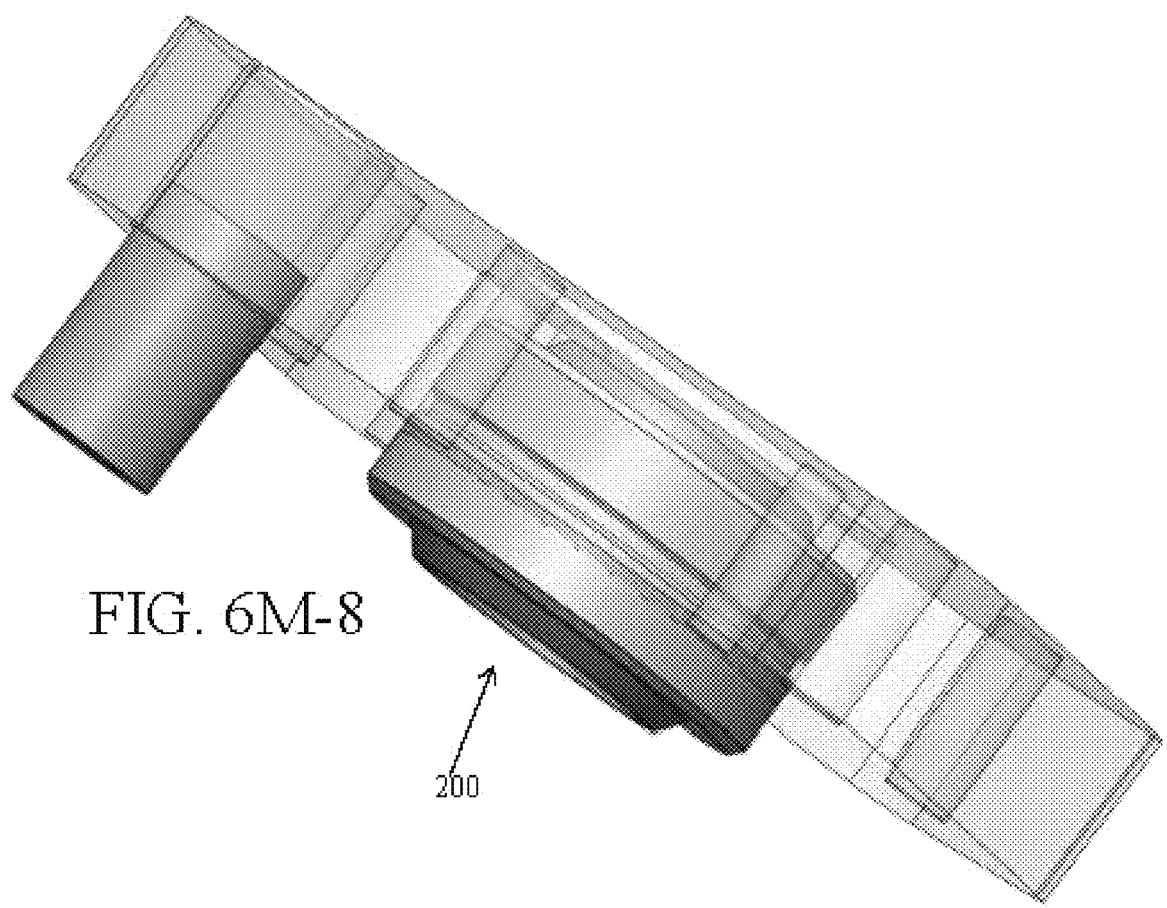
Figures 6, 6M, 7, 8, 9:
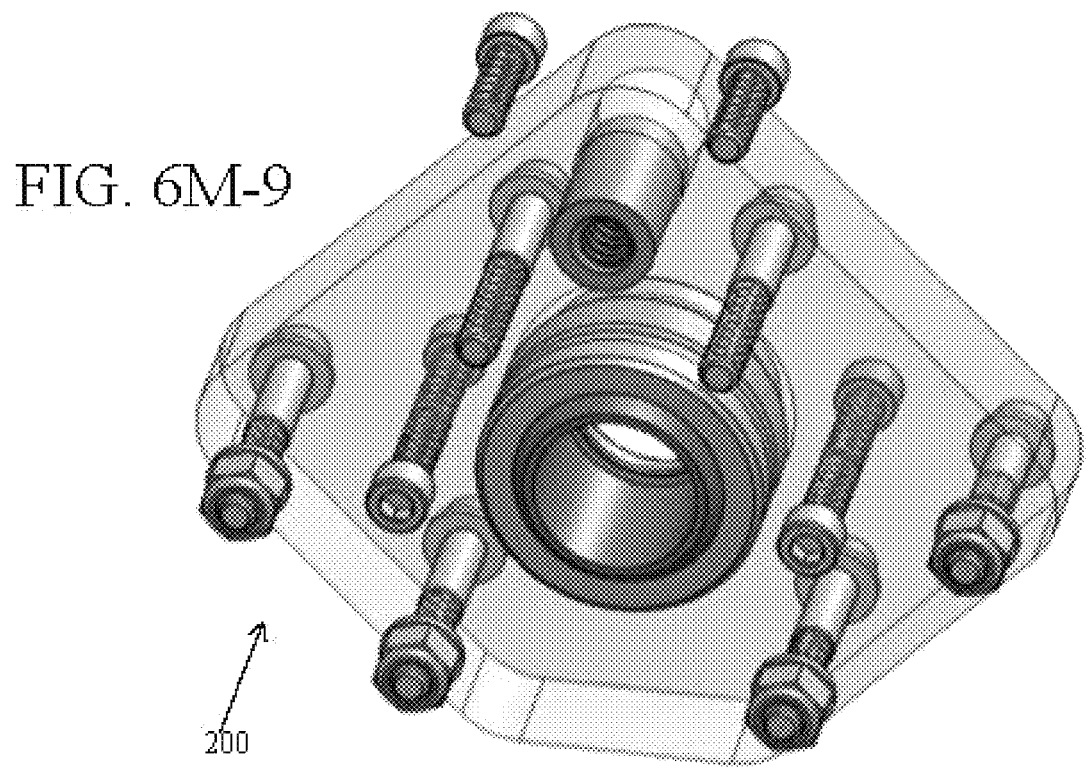
Figures 6, 6M, 7, 8, 9, 10:
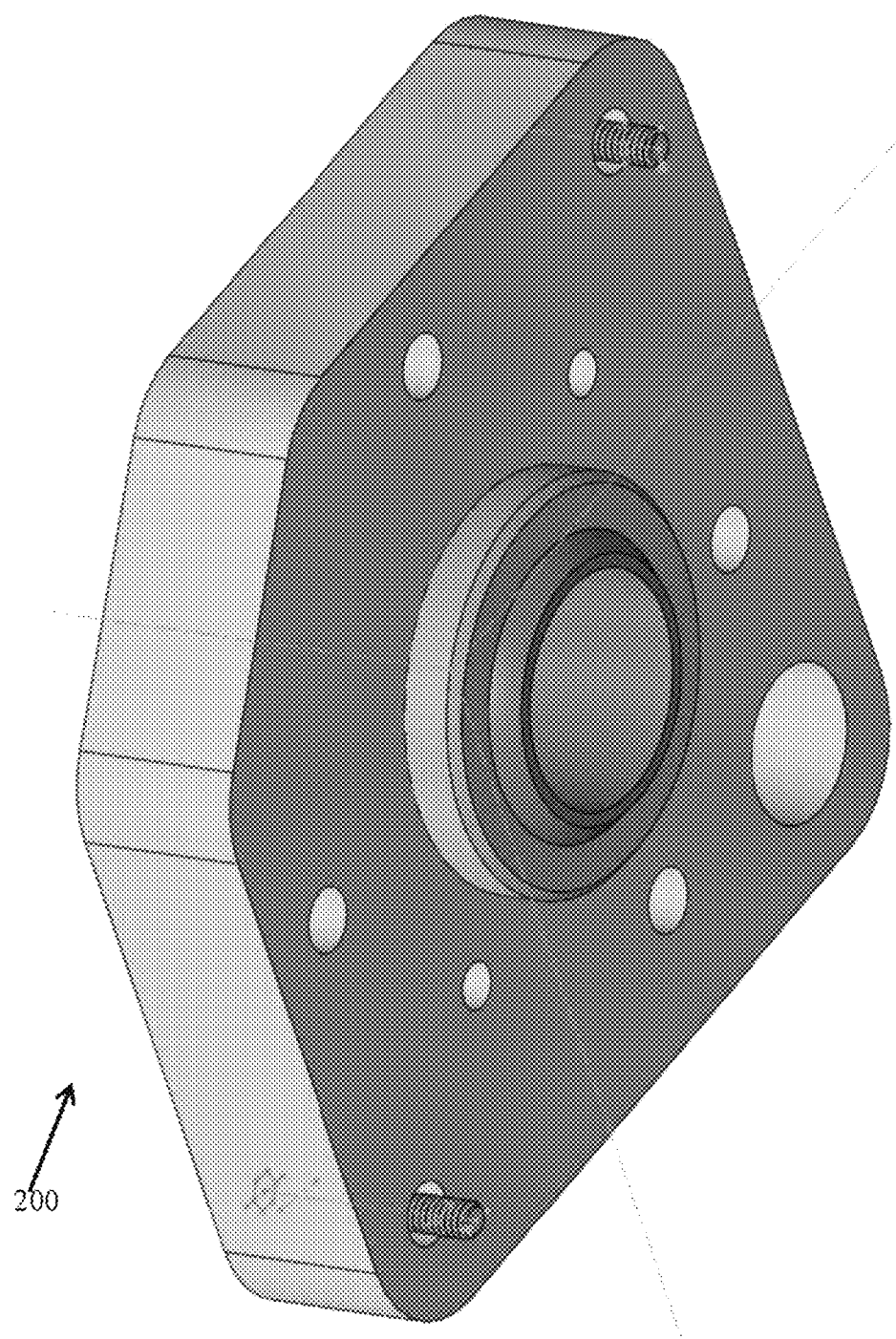
Figure 6N:
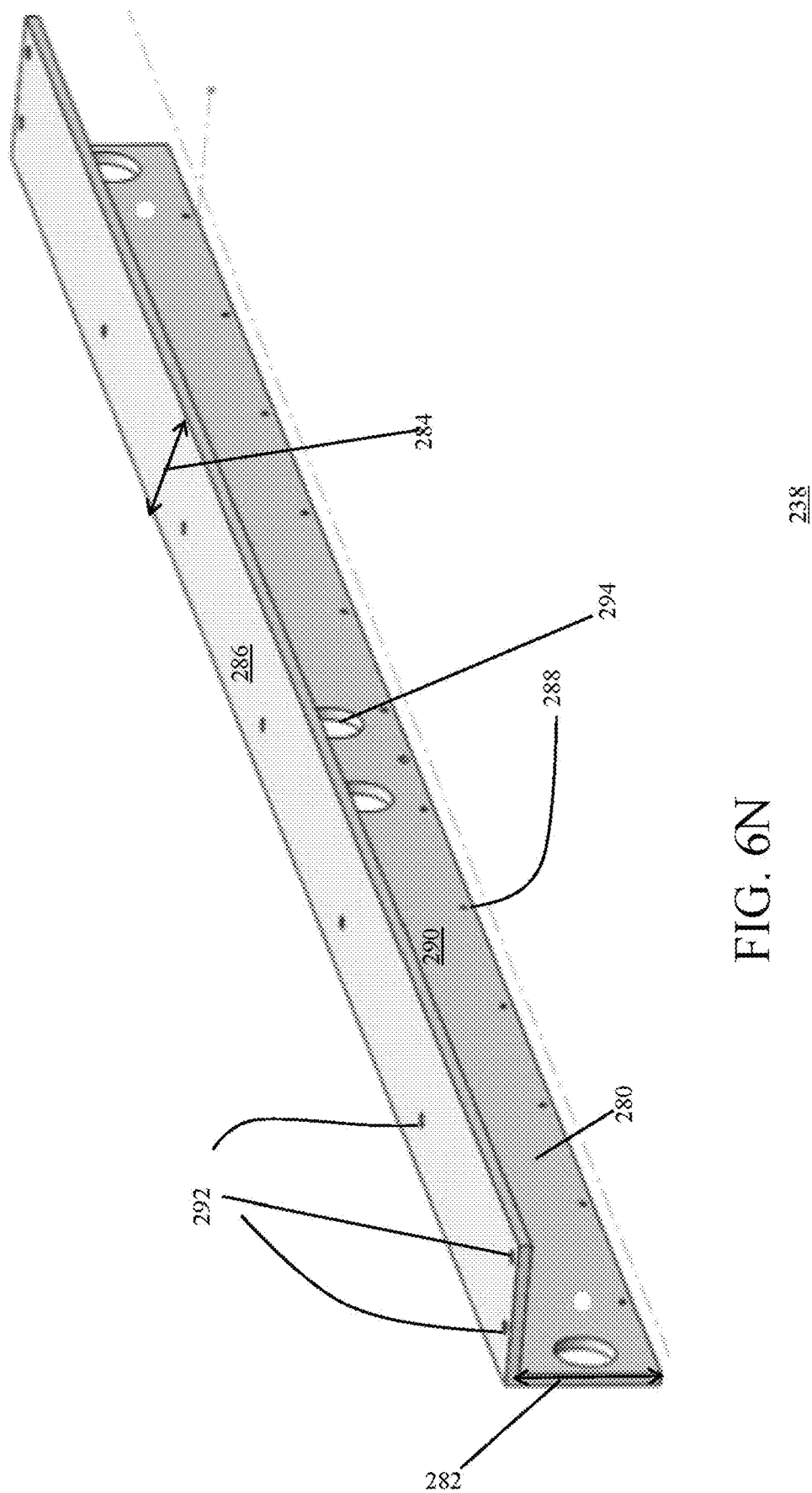
Figures 1, 6O:
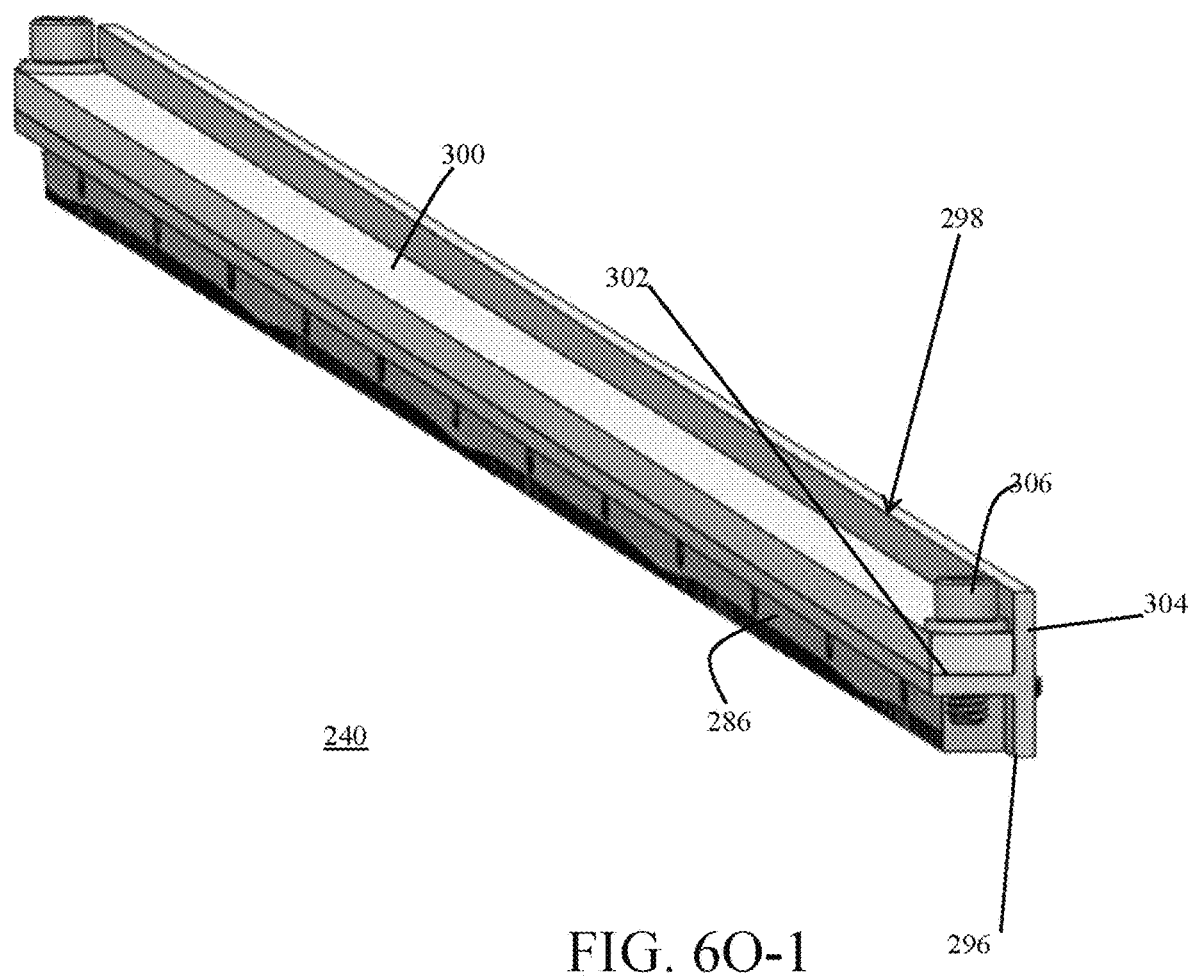
Figures 2, 6O:
Figures 3, 6O:
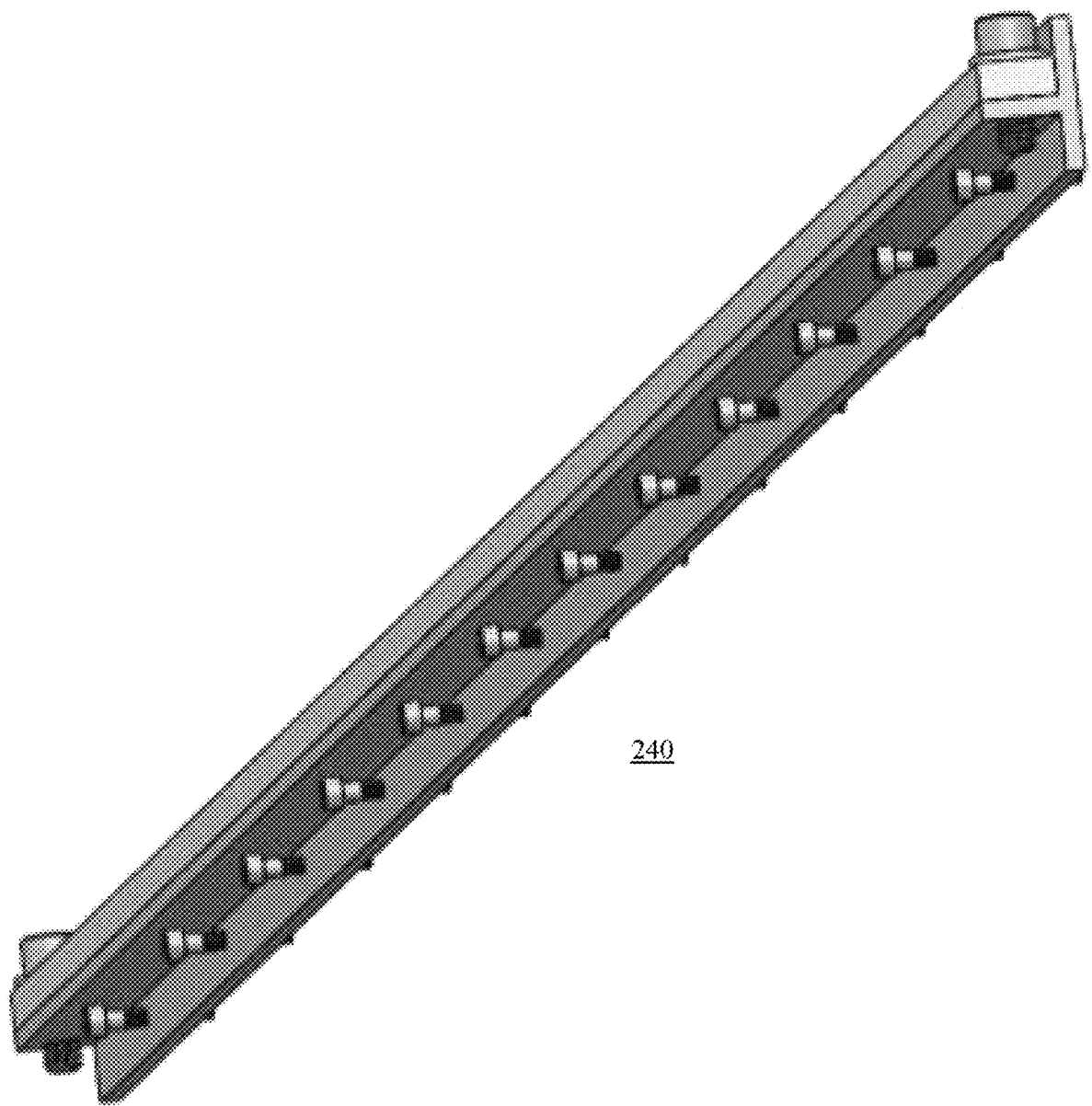
Figures 4, 6O:
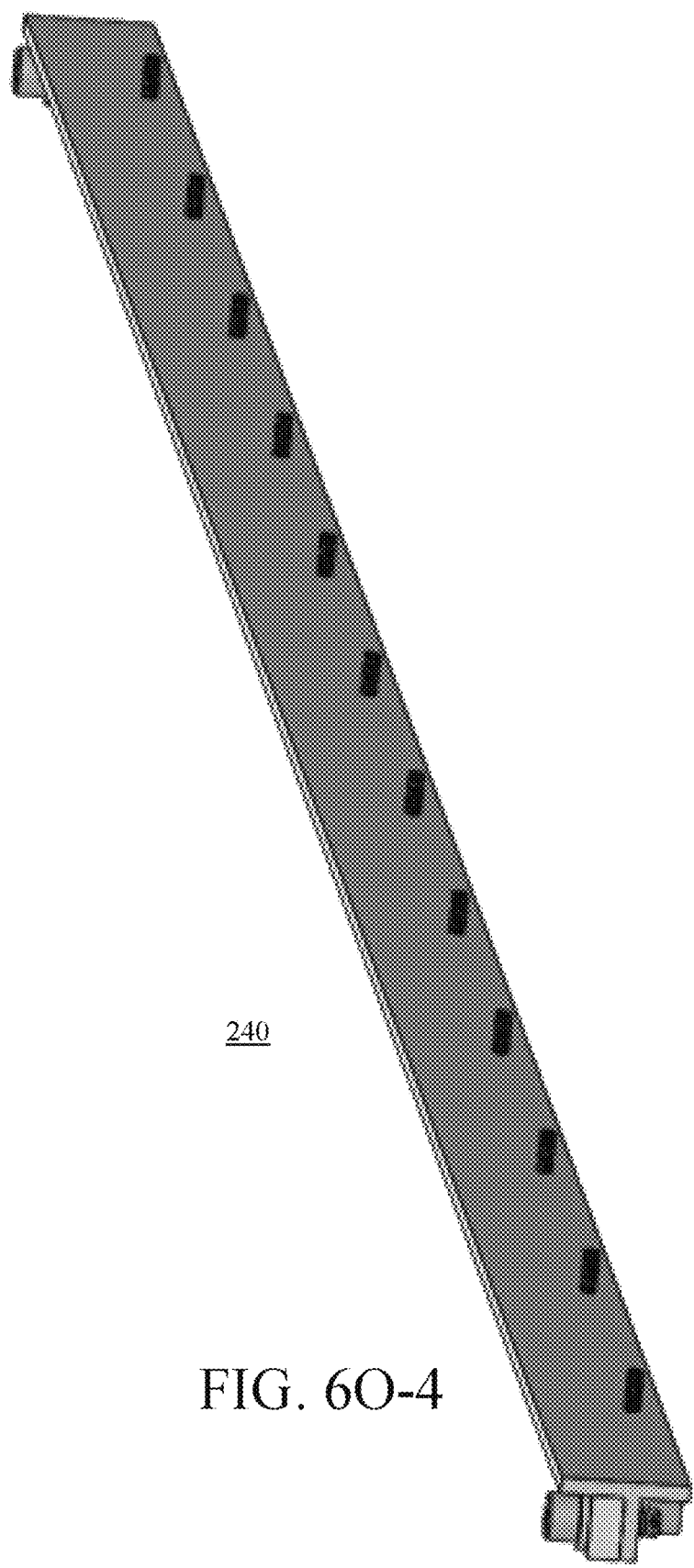

FIGS. 6A to 6O-4 are non-limiting, exemplary illustrations of positioning system of the digital fabrication apparatus shown in FIGS. 1A to 5P in accordance with one or more embodiments of the present invention. As illustrated, digital fabrication apparatus 100 further includes a positioning system for moving and positioning a movable fabrication tool 118 at a desired location within a three dimensional space 102.

The positioning system includes a movable positioning frame 234 that supports movable fabrication tool 118. Movable positioning frame 234 is comprised of a flexible chassis 236 and a track mounting adapter 238 that connects a track mounting assembly 240 to flexible chassis 236.

It should be noted that flexible chassis 236 is comprised of metal (about 6 mm thick aluminum). However, it may be flexed (even by hand) at or near its corners. Given the large movable positioning frame 234 dimensions and the size of the X, Y, and Z motors used, the flexibility of chassis 236 accommodate for variances in motor actuations, etc. while maintaining the movable positioning frame 234 parallel workpiece platform assembly 162.

Flexible chassis 236 is comprised of sides that enclose an open area 242 for free traverse of movable fabrication tool 118. Any one side of chassis 236 has a width 244 that progressively decreases (or tapers) along a length 246 of the side from a middle portion of the side towards a corner (or vertex) 248. Wider middle portion enables flexible chassis 236 to be extremely stiff to thereby resist transverse (in-plane) bending. For example, it would be difficult to bend flexible chassis 236 so that it forms into a trapezoid. Narrower corner portions 248 enable maintaining flexibility at corners 248 of chassis 236 so that it is able to bend at near corners 248 (out of plane motion) to compensate for variations in Z-direction motion actuations from four Z-motors.

Flexible chassis 236 includes a first set of openings 250 positioned along length 246 of the side for securing track mounting adapter 238, and includes a second sets of openings 252 positioned at corners 248 that associate chassis 236 with the Z-direction motive force mechanisms (detailed below).

A first set of corner openings 254 of second set of openings 252 of chassis 236 secure chassis 236 to a linking adapter 200, and a first corner opening 256 of first set of corner openings 254 function as reliefs to allow passage of a first component (i.e., guide rod 196) of the Z-direction motive force mechanisms. The number of guide rods 196 may be two (which are diagonally positioned or four at each corner 248).

A second set of corner openings 258 of second set of openings 252 of chassis 236 secure chassis 236 to a threaded nut assembly 260, which is part of the Z-direction motive force mechanism. As a threaded rod 262 is rotated, threaded nut assembly 260 connected to chassis 236 moves the entire movable position frame 234 along Z-direction. A second corner opening 264 of second set of corner openings 258 of chassis 236 function as reliefs to allow passage of a second component (i.e., threaded rod 262) of the Z-direction motive force mechanisms.

Linking adapter 200 includes a first (or guide) opening 266 that is aligned with a first corner opening 256 that receive guide bar 196 that constrain movable positioning frame 234 from lateral (or in plane) motion while allowing or guiding movement along Z-direction. Linking adapter 200 further includes a second (or Z-axis drive) opening 268 at a distal corner that is aligned with second corner opening 264 of the second set of openings 252 that function as reliefs to allow passage of threaded rod 262 of the Z-direction motive force mechanisms. As detailed below, as threaded rod 262 is rotated clockwise or counterclockwise, movable position frame 234 moves along the Z-direction, constrained by guide bar 196, which provides an in-plane or lateral stabilizing factor.

Linking adapter 200 further includes a main body 200 that includes the first (or guide) opening 266 with a swivel joint 270 inserted therein first opening 266 and retained by a top retainer 272 from the top and a bottom retainer 274 from the bottom (retainers 272 and 274 are identical). Swivel joint 270 supports potential angular misalignment of chassis 236 in relation to guide bar 196, i.e., potential out of plane deflections of chassis 236 perpendicular to guide bars 196. The lower portion of the swivel joint 270 extends passed first corner opening 256 of chassis 238 and retained by bottom retainer 274 to allow for potential angular misalignments of chassis corners 248 in relation to guide bars 196. As illustrated, bottom retainer 274 has a curved outer periphery that function as a relief for securing threaded nut assembly 260 (which is part of the Z drive system).

It should be noted that chassis 236 (although made of metal or alloys thereof) is purposefully made to be "flexible" at the corners and hence, potential angular misalignment with relation to the guide bars 196 exists during movement along Z-direction, which could potentially "bind" or "jam" the movement of the entire movable positioning frame 234 along Z-axis. It is essential for chassis 234 to be flexible to tolerate potential variations or discrepancies between the Z-motors. Accordingly, the set up described maintains chassis 236 perpendicular to the guide bars 196, while guide bars 196 are perpendicular to workpiece platform assembly 162.

This means that chassis 236 is maintained parallel workpiece platform assembly 162.

Threaded nut assembly 260 is comprised of a threaded nut 276 with a support adapter 278 that allows for threaded nut 276 to be connected to an underside of chassis 118 for lifting or lowering movable positioning frame 234. Instead of threaded nut 276, a threaded ball nut may also be used. This way, the balls of the threaded ball nut engage with the threads of threaded rod 262, which provides for a less friction and a smoother rotation of threaded rod 262. The threaded nut piece 276 is fastened onto support adapter 278 by a set of fasteners. FIGS. 6M-1 to 6M-3 are non-limiting, exemplary illustrations showing acme threaded nut assembly 384 instead of assembly 260.

Track mounting adapter 238 is rigid member comprised of an "L" shaped bracket with a first section 280 having a first width 282 that is longer than a second width 284 of a second section 286. In other words, track mounting adapter 238 are "deep hang" in the vertical direction (when installed) due to longer width 282 of first section 280. This provides sufficient rigidity to carry the weight of track mount assembly 240 and gear rack 286, including all of the components that constitute the X and Y direction motive force mechanisms such as motors, roller, etc. (detailed below). Track mounting adapter 238 must remain flat and straight so to provide a rectilinear motion for the movable fabrication tool during use. This is the reason for fastening the gear rack 286 onto the track mounting adapter 238 (detailed below).

Track mounting adapter 238 includes a first set of openings 288 at a first section 280 for mechanically connecting gear rack 286 to a first side 290 of first section 280 of track mounting adapter 238. Track mounting adapter includes a second set of openings 292 at second section 286 for mechanically connecting track mounting adapter 238 to chassis 236. Further included are access openings 294 for maintenance and set of rollers, etc.

Gear rack 286 is a rigid member with a polygonal profile that extends longitudinally along a longitudinal axis of gear rack 286. Gear rack 286 includes cogs (teeth or gears of geared rack 286) positioned along a side of gear rack 286. Gear rack 286 is positioned on a third side 296 of mounting bracket 298 and mechanically connected to track mounting adapter 238 via a set of fasteners. Gear rack 286 has a length that is shorter than a length of mounting bracket 298.

Track mounting assembly 240 is comprised of a track 300, a mounting bracket 298 and gear rack 286. Track 300 is connected to a first side 302 of mounting bracket 298, with a second side 304 of mounting bracket 298 connected to track mounting adapter 238.

Track 286 is a smooth surfaced plastic with a polygonal profile (preferable rectangular) that extends longitudinally along a longitudinal axis of the track 286. Track 286 has distal end openings that secure track 286 on first side 302 of mounting bracket 298 by a set of fasteners 306.

It should be noted that the preferred position of gear rack is facing downwards. linear travel is guided preferentially by the track which is flat in contrast to gear wheel (pinion) which can be expected to have minor deviations, especially once worn. Facing downwards, the arrangement of the gear rack is largely self-cleaning which preserves the required engagement between the pinion and the gear rack.

Movable positioning frame 234 defines a plane at which movable fabrication tool 118 is positioned in relation to workpiece platform assembly 162. It should be noted that the plane at zero—(0) Z-axis (X=m, Y=n, Z=0) is defined by work-surface 158 of work-layer member 160 of workpiece platform assembly 162, which, in turn, is ultimately fixed to and set by floor plate assembly 156 and more particularly, floor plate 164 (with its tab/slot connectivity with the vertical frame members 134) to which workpiece platform assembly 162 is secured.

FIGS. 7A to 7L are non-limiting, exemplary illustrations of X-direction motive force mechanisms and Y-direction motive force mechanisms of the digital fabrication apparatus shown in FIGS. 1A to 6O-4 in accordance with one or more embodiments of the present invention. In the non-limiting exemplary instance illustrated throughout all of the figures and described, X-direction motive force mechanisms (shown in FIG. 7A) and the Y-direction motive force mechanisms (shown in FIG. 7B) are identical in every respect (and detail). Accordingly, a single set of drawings 7C to 7L are used to represent all details for both the X-direction motive force mechanisms (shown in FIG. 7A) and the Y-direction motive force mechanisms (shown in FIG. 7B). It should be noted that optionally, the X- or the Y-direction motive force mechanisms may be different and need not be identical.

An X-direction motive force mechanism and a Y-direction motive force mechanism are mounted onto movable positioning frame 234 that move movable fabrication tool 118 to desired location within an XY-plane defined by the Z position of movable positioning frame 234. As detailed below, Z-direction motive force mechanism moves movable positioning frame 234 along a Z-direction to a desired XY-plane.

X-direction motive force mechanism enables X-direction translational motion of movable fabrication tool 118, Y-direction motive force mechanism enables Y-direction translational motion of movable fabrication tool 118, Z-direction motive force mechanism enables Z-direction translational motion of movable fabrication tool 118.

X- and Y-direction motive force mechanisms are comprised of first X motor 308 and a second X-motor 308 driven (or powered) by X-motor driver, and a first Y-motor 308 and a second Y-motor 308 driven (or powered) by a Y-motor driver. The drivers are located at lower section 104 of digital fabrication apparatus 100 (FIGS. 3C and 3D).

Power to the first and second X-motors 308 are synchronously applied to enable synchronous rectilinear motion of movable fabrication tool 118 in the X-direction within the XY-plane. Power to the first and second Y-motors 308 are synchronously applied to enable synchronous rectilinear motion of movable fabrication tool 118 in the Y-direction within the XY-plane.

Use of two motors 308 associated with opposite distal ends of X-drive shaft reduces possibility of asymmetric drive of moveable fabrication tool 118 in X-direction. Use of two motors 308 associated with opposite distal ends of Y-drive shaft reduces possibility of asymmetric drive of moveable fabrication tool 118 in Y-direction. That is, use of a single motor may move a first distal end of the drive shaft (X or Y drive shaft) while the second end lags. This may generate an in-plane (X-Y plane) rotations for moveable fabrication tool 118 rather than a rectilinear motion. Accordingly, two motors are used and actuated synchronously.

Motors 308 are mounted onto preloading adapters 310, which, in turn, are associated with track mounting assembly 240. The preloading adapters 310 are comprised of a set of rollers 312 that engage track 300 while a pinion 314 engages gear rack 286.

Preloading adapters 310 are further comprised of a compartment 314 that houses a bearing 314. Preloading adapters 310 further include a first set of openings 318 for securely mounting a motor 308, and a second set of openings 320 for mounting drag-chains that may include power and signal cabling for both the motors 308 and moveable fabrication tool 118.

The X-direction motive force mechanism and the Y-direction motive force mechanism are further comprised of a gear-shaft assembly 322 that moveably links first and second motors 308 of respective axis (the X or the Y) while supporting movable fabrication tool 118 within the XY-plane defined by movable positioning frame 234. The gear-shaft assembly 322 is comprised of a cylindrical link-shaft 324 (e.g., a linear motion shaft) having blind-holes 326 bored through partially along a central longitudinal axis of link-shaft 324, defining a first openings 328 for receiving motor output shafts 330. The link-shaft 324 further includes an aligned second set of transversely oriented openings 332.

Gear-shaft assembly 322 further includes a pinion 314 (or engagement gear) that engages gear rack 286 to enable the rotational motion of motor output shaft 330 to be converted to a linear motion for translational motion of movable fabrication tool 118 (along X and Y directions). Pinion 314 has a gear-hub 334 with a set of transversely oriented openings 336.

Pinion 314 is interference fit (also known as press fit or friction fit) secured near an end 338 of link-shaft 324, while one or more set screws 342 are used to secure (or trap or lock) motor output shaft 330 within blind hole 326 through second set of opening 332 of link-shaft 324 and gear-hub openings 336. This enables link-shaft 324 to rotate in tandem with motor output shaft 330. It should be noted that adhesives (including anaerobic adhesives) may also by used instead of interference fit scheme to connect pinion 314 to link-shaft 324.

The free distal ends 340 of link-shaft 324 of gear-shaft assembly 322 are positioned and rest within bearing 316 of preloading adapter 310. Link shaft 324 is long and heavy and therefore, the weight of link-shafts 324 are carried by bearings 316.

As a side note, the link shaft 324 has three movements. It has rotational movement, a translational movement, and potentially an axial (or lateral) movement (parallel along the central longitudinal axis of the link shaft 324.) As the X or Y set of preload adapters are moved, the entire X- or Y-direction motive force mechanism may move axially. This is because the rollers roll along the track with no constraints to force them to have rectilinear motion. For example, as the X-direction motive force mechanism is active, it will move the moveable fabrication tool along the X direction and position the moveable fabrication tool at a location with the proper X coordinate value. However, the motion of the moveable fabrication tool to a location with desired X value may "drag" or move the Y link-shaft of the Y-direction motive force mechanism axially. In other words, potential exists that the rollers of the Y-direction motive force mechanism may move laterally while positioning the moveable fabrication tool at a desired X value when X-direction motive force mechanism is active. However, this axial movement does not impact the correct position of the moveable fabrication tool with respect to the X value. Therefore, although it may be counterintuitive to allow or leave the rollers to "float" axially, their lateral or axial movement does not impact the final or stop position of the moveable fabrication tool at the desired (X, Y, Z) position as each position value (X, Y, and Z) is arrived at separately. For example, a position with the correct X value of the desired location is determined and moveable fabrication tool is moved to that location (regardless of any axial motion of Y-direction motive force mechanism) and the X direction motive force is stopped. Next, the Y value is determined and the Y mechanism moves moveable fabrication tool without affecting the X since the X direction motive force is stopped (no active). Accordingly, present invention provides a simple and cost effective scheme where added costly components to provide restrictions in axial movement (such as using costly V type rollers) is not necessary. Accordingly, active motion in one coordinate (e.g., X) may translate into an axial passive motion in the other coordinately (e.g., Y), with the axial passive motion having no impact or affect on the active motion coordinate. In other words, longitudinal axis movement of non-active axis does not impact the correct positioning of the active axis.

As further side note and as importantly, all rollers 312 for both X-direction motive force mechanism and the Y-direction motive force mechanism are preloaded to give or provide an internal or additional load independent of any working load when engaging track 300, which, in turn, preload the engagement of pinion 314 with gear rack 286. That is, the preloading allows the cogs of pinion 314 to mesh snuggly with the cogs of gear rack 286 to thereby reduce potential distortion of operations (e.g., reduce gear backlash 382, best shown in FIG. 7K) of pinion 314 in relation to gear rack 286. FIG. 7L illustrated a preloaded pinion 314 and gear rack 286 with more intimately meshed cogs. These translate into a controlled motion and hence, correct positioning of moveable fabrication tool 118.

Figure 7A:
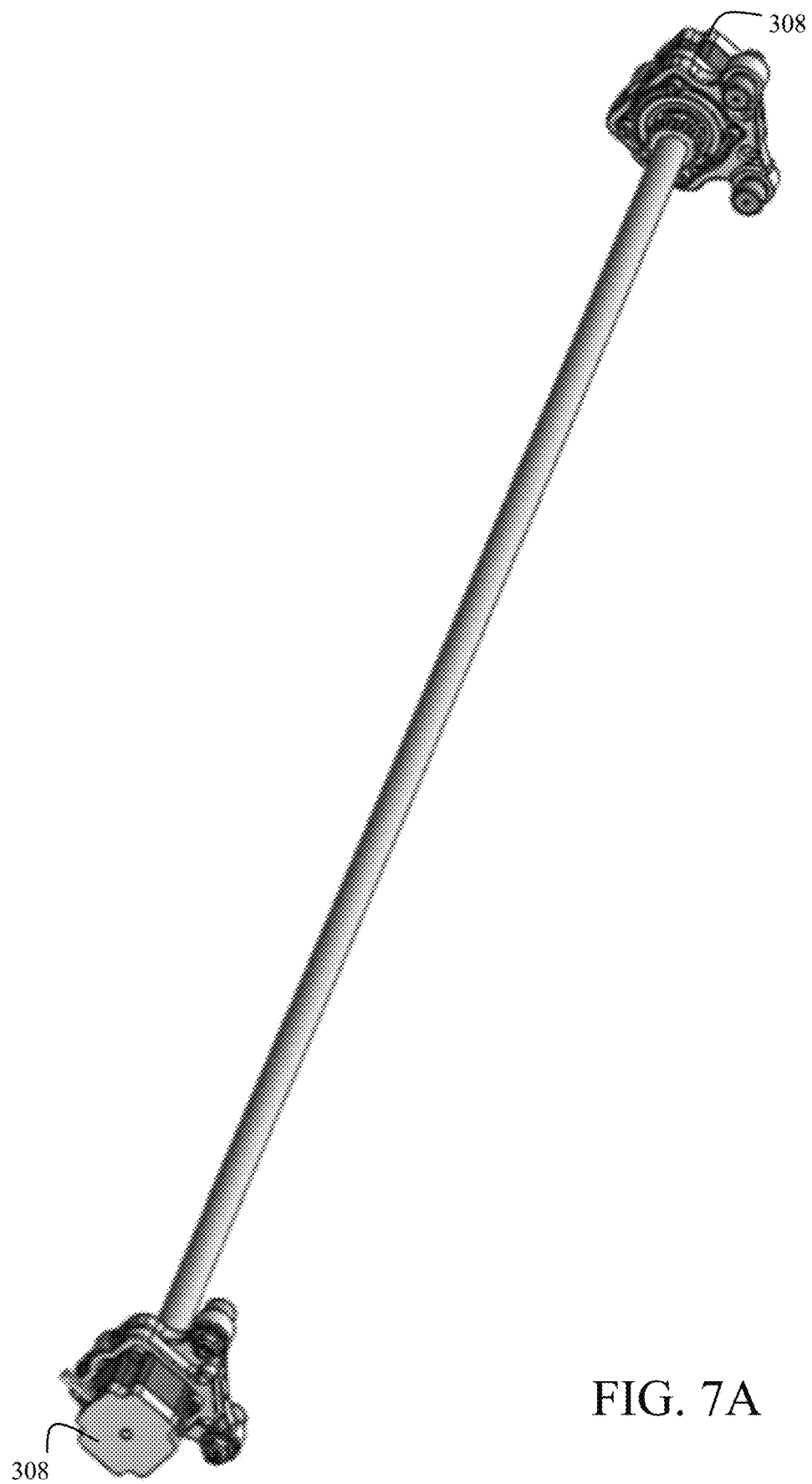
Figure 7B:
Figure 7C:
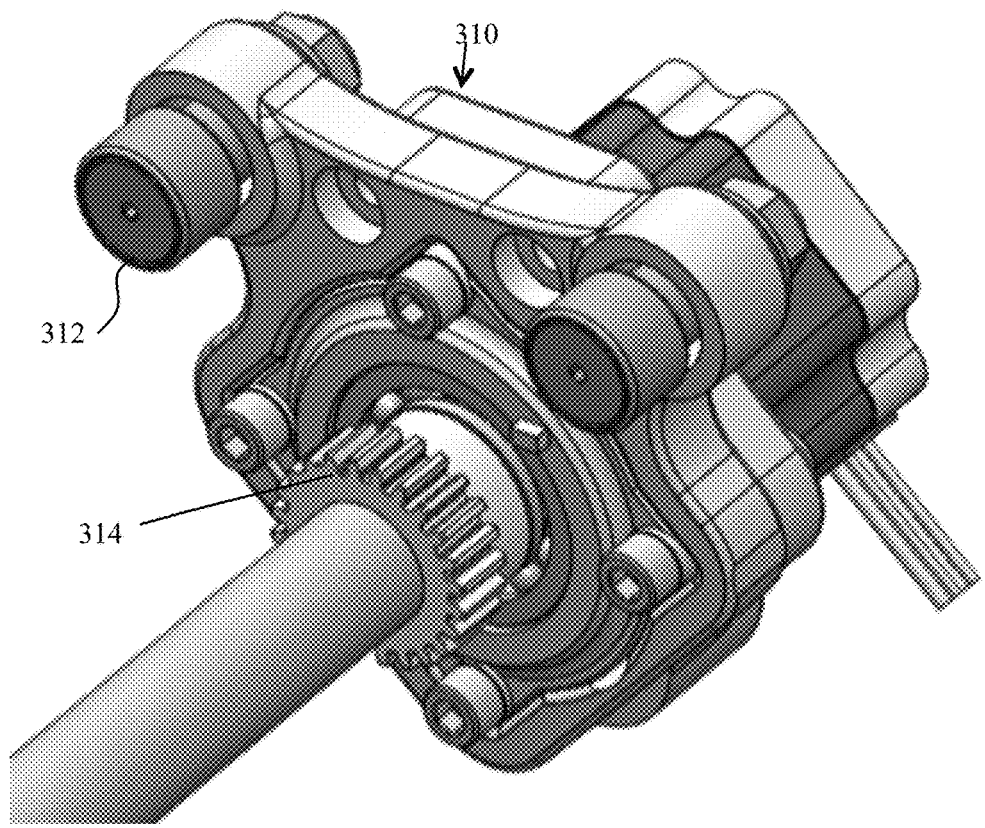
Figure 7D:
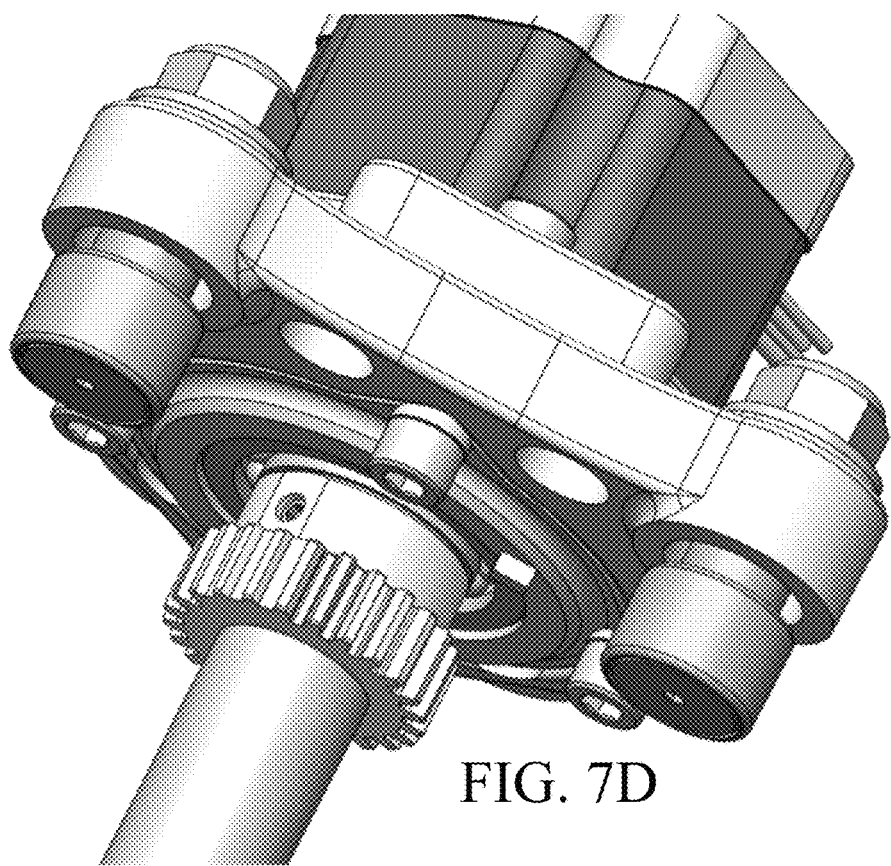
Figure 7E:
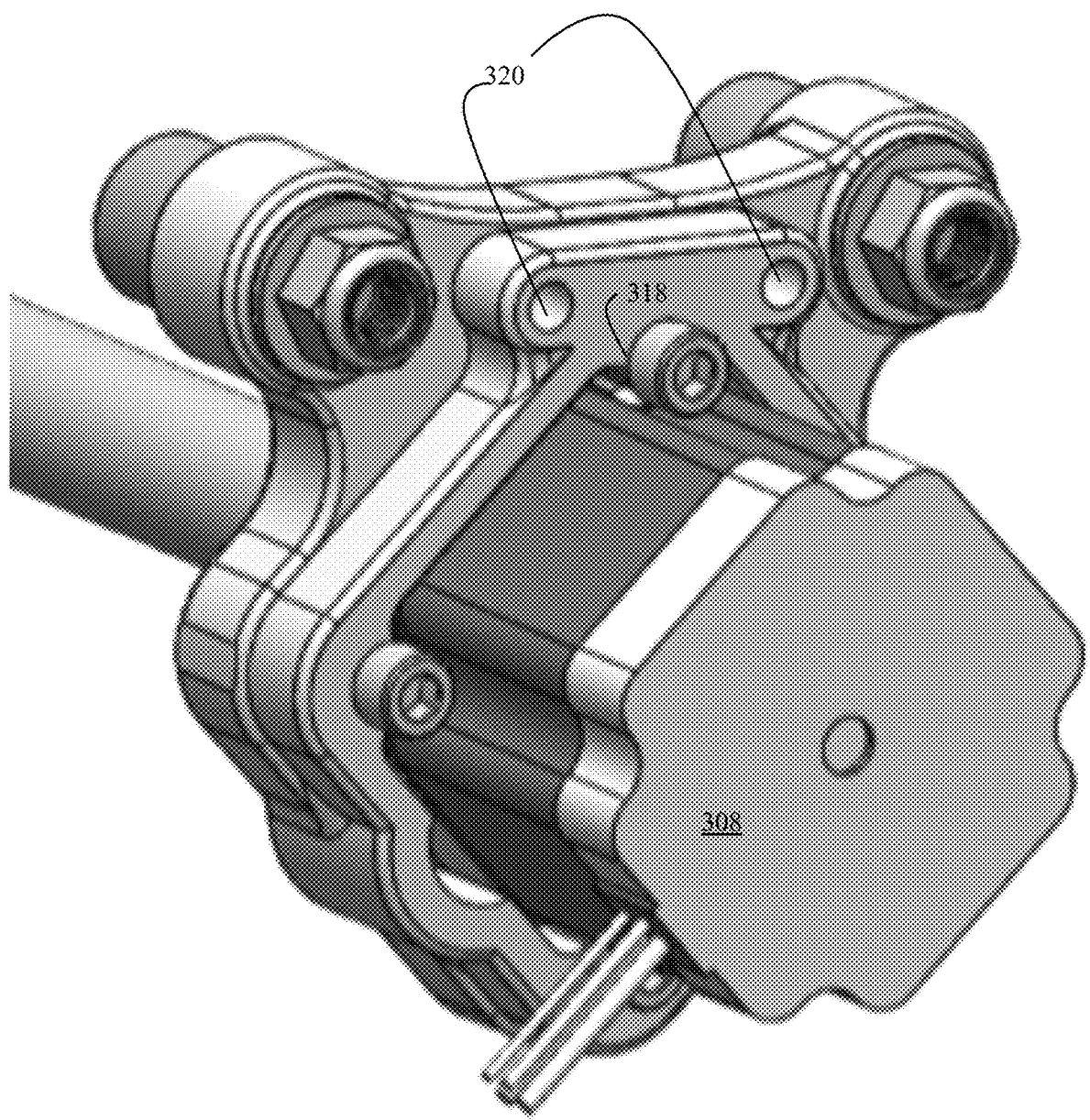
Figure 7F:
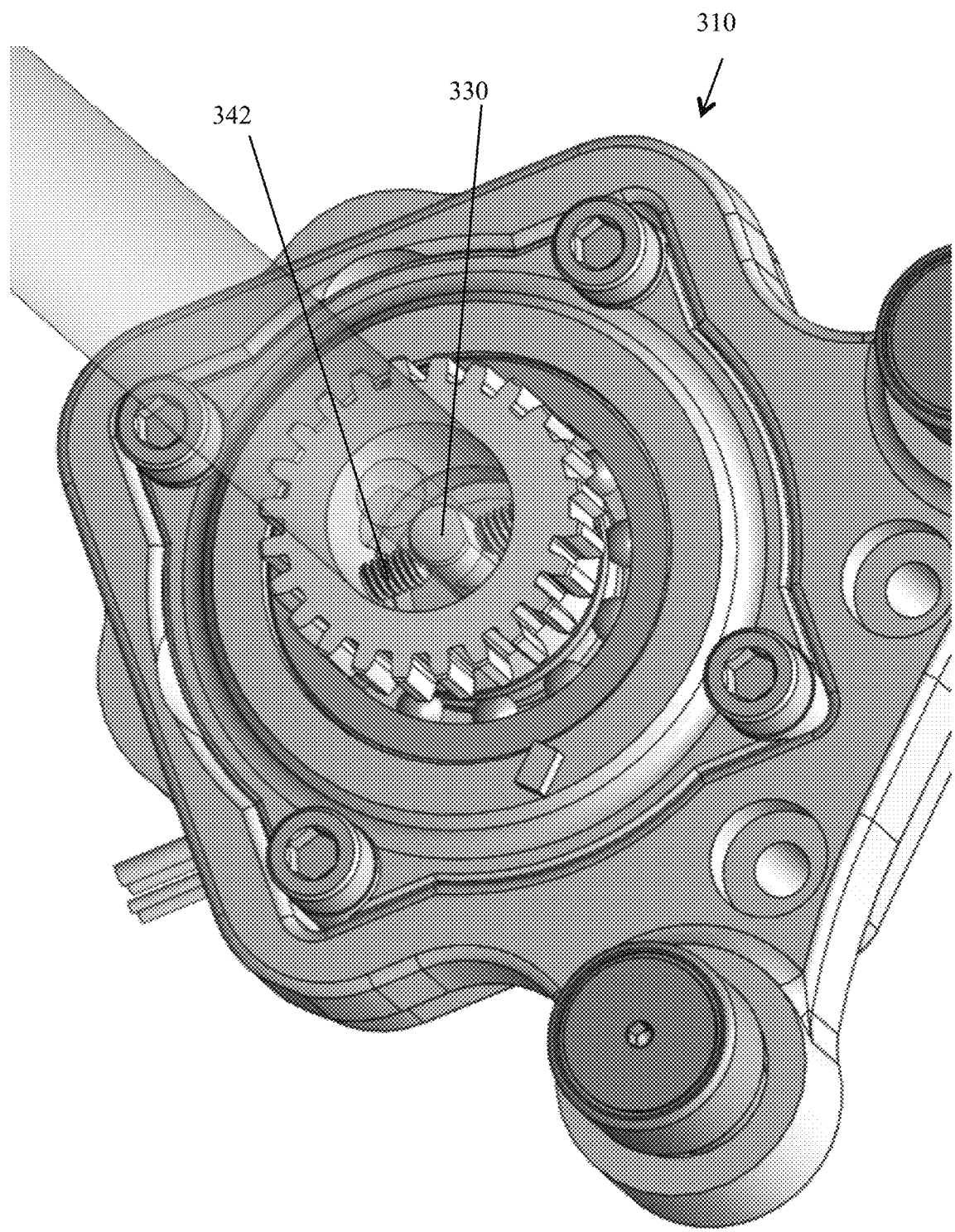
Figure 7G:
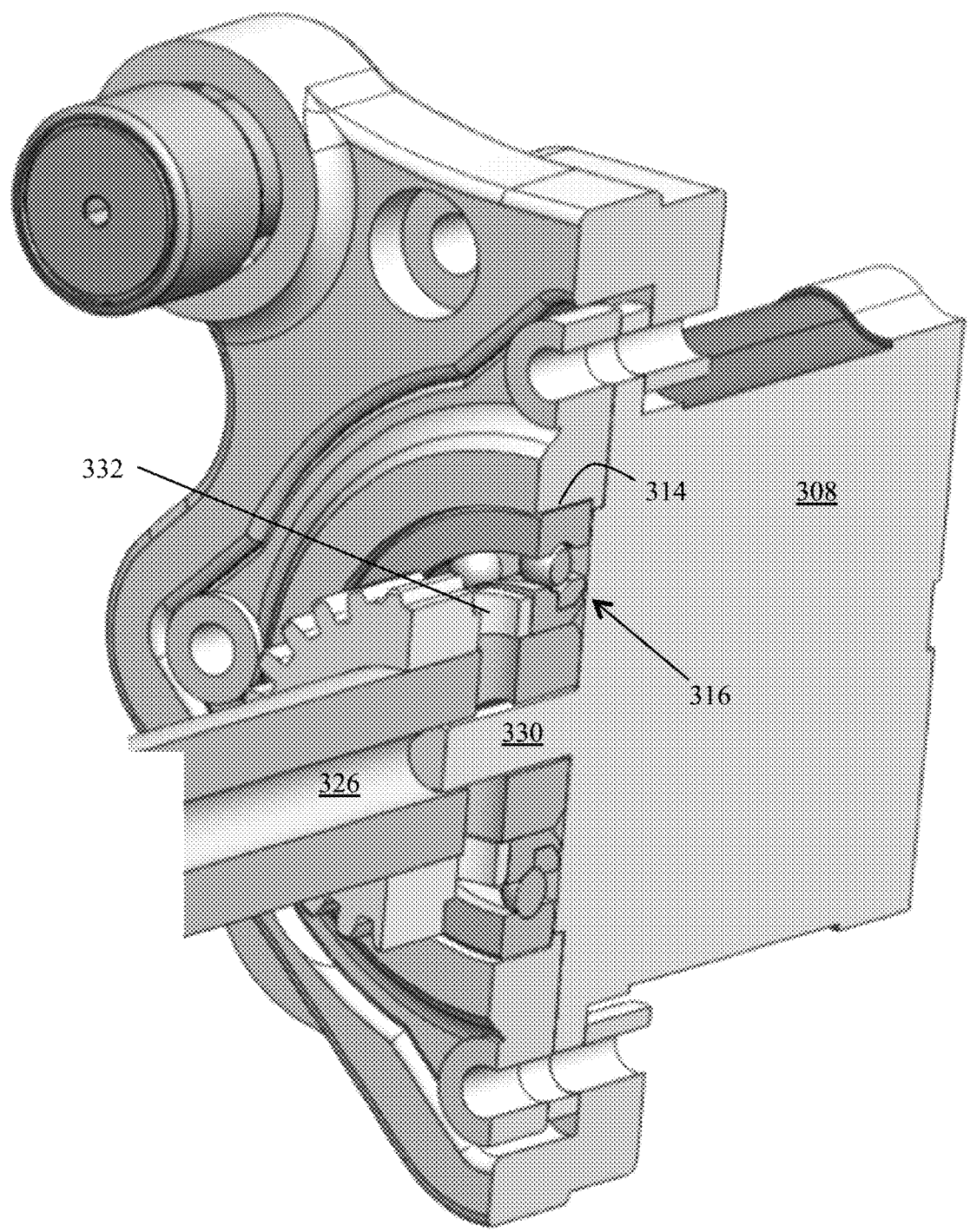
Figure 7H:
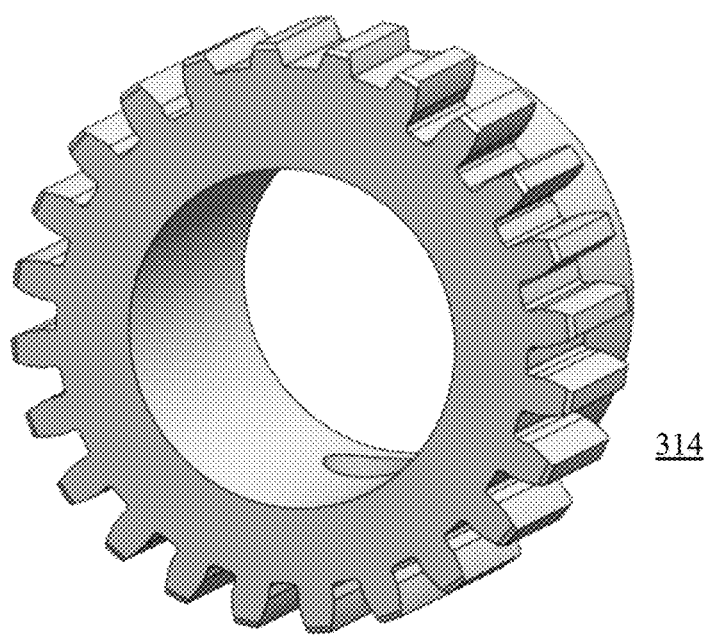
Figure 7I:
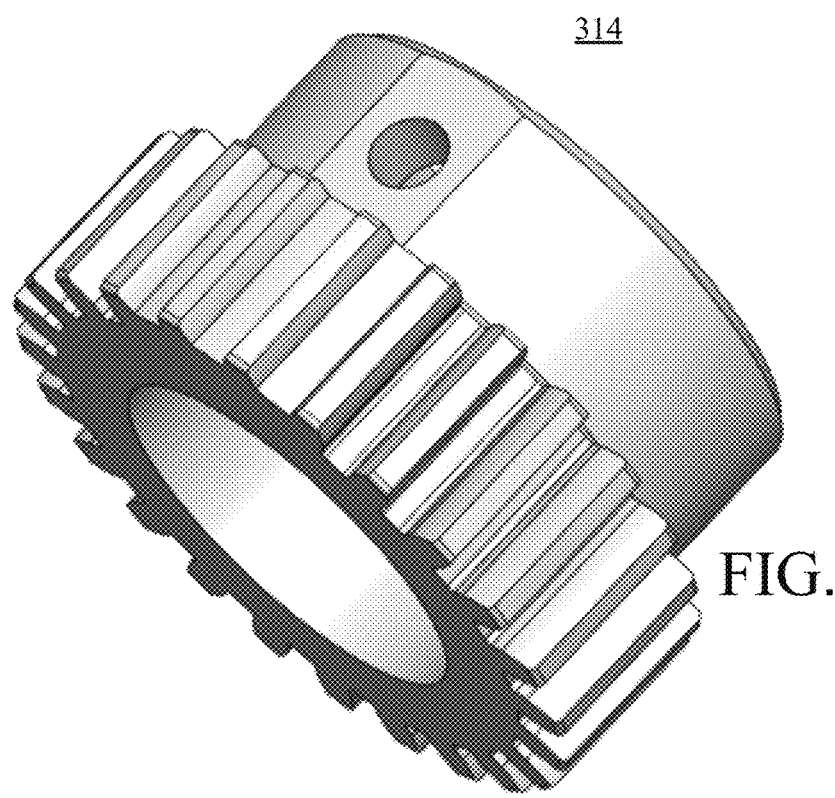
Figure 7J:
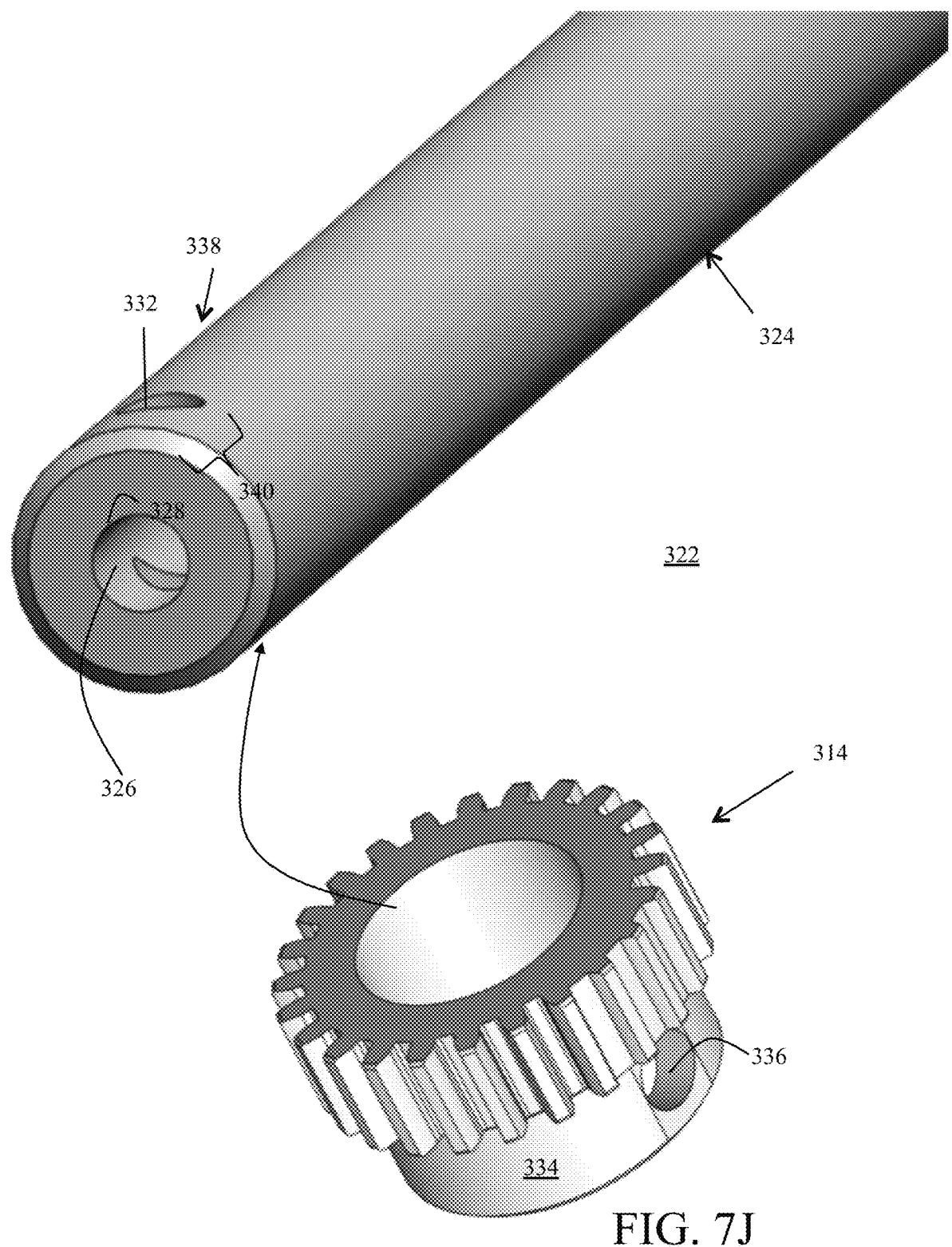
Figure 7K:
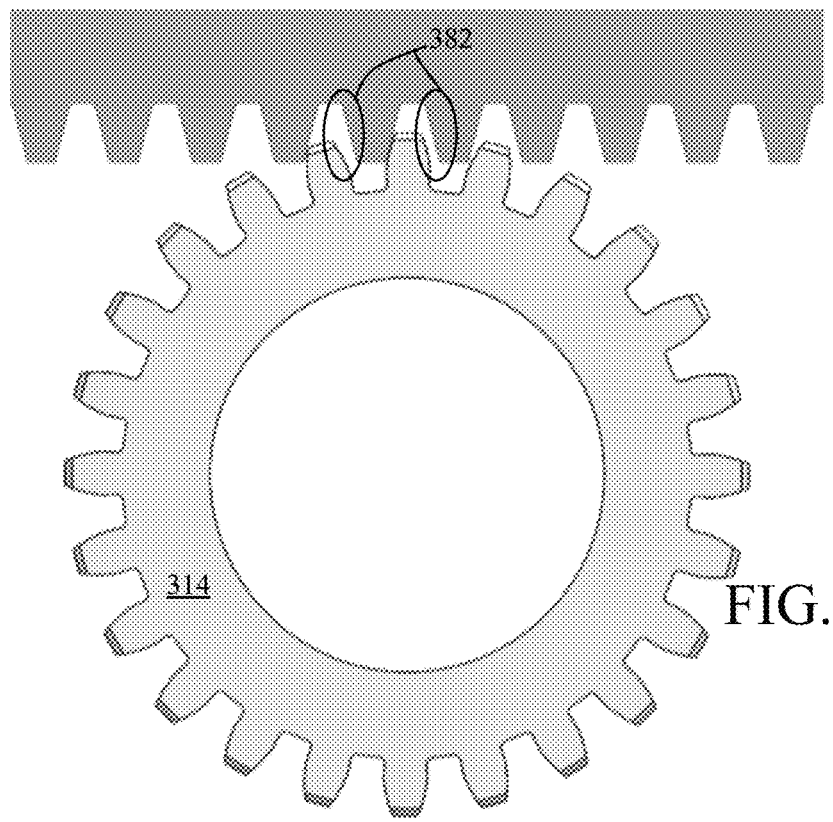
Figure 7L:
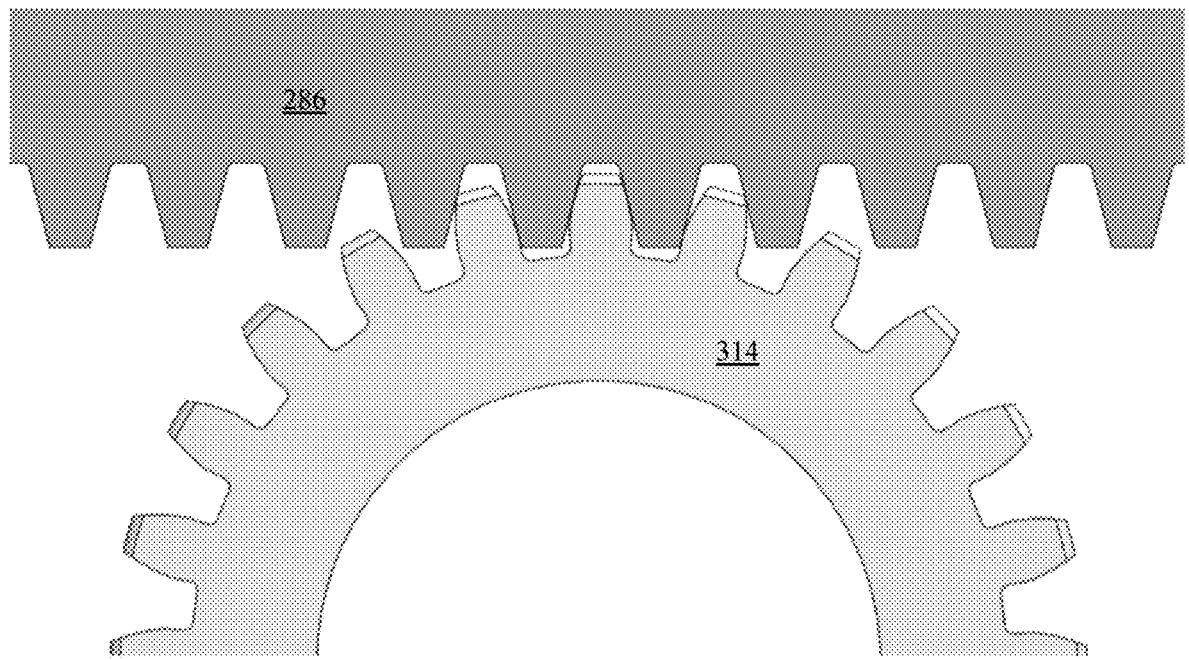
Figure 8A:
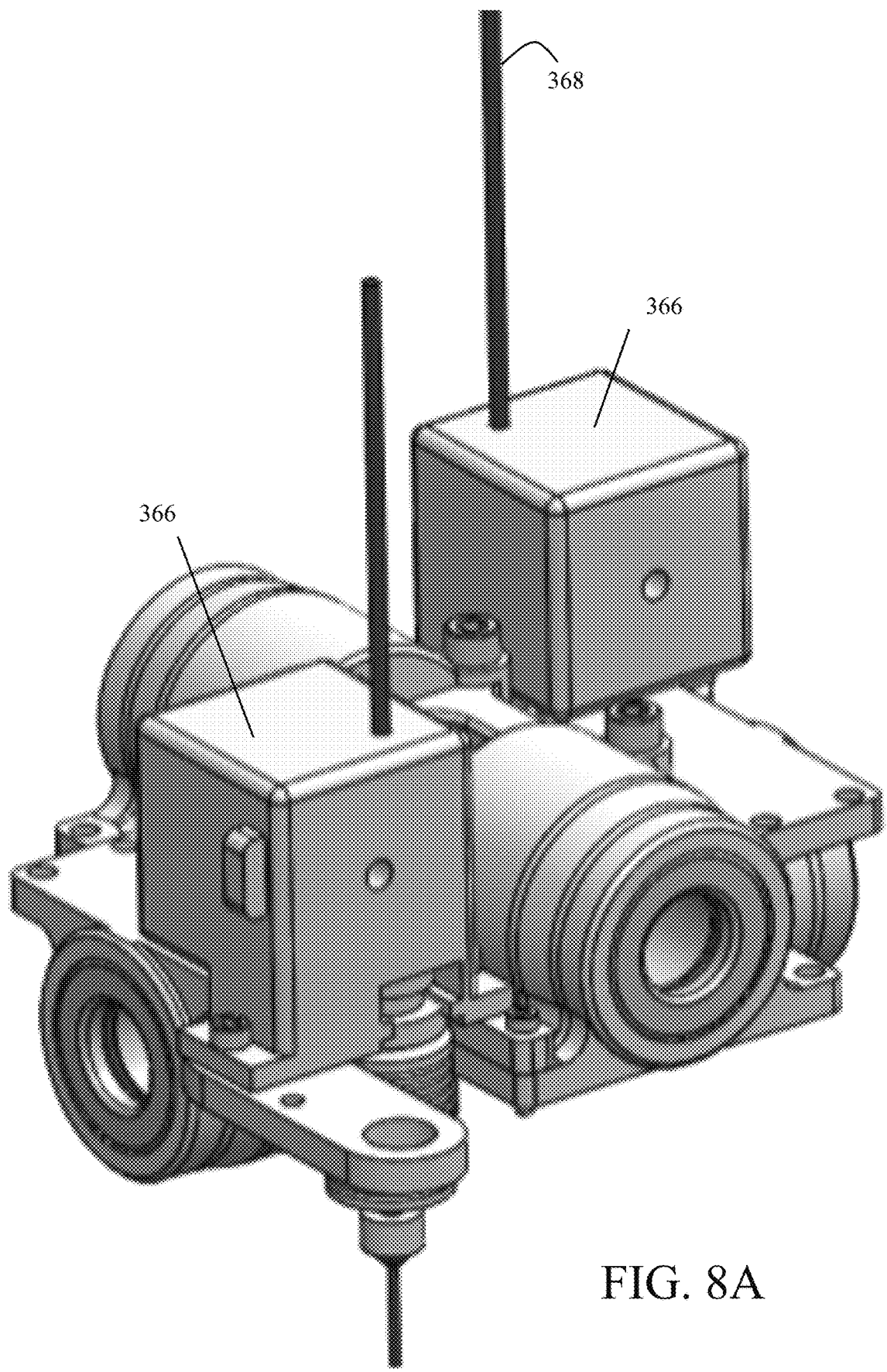
Figure 8B:
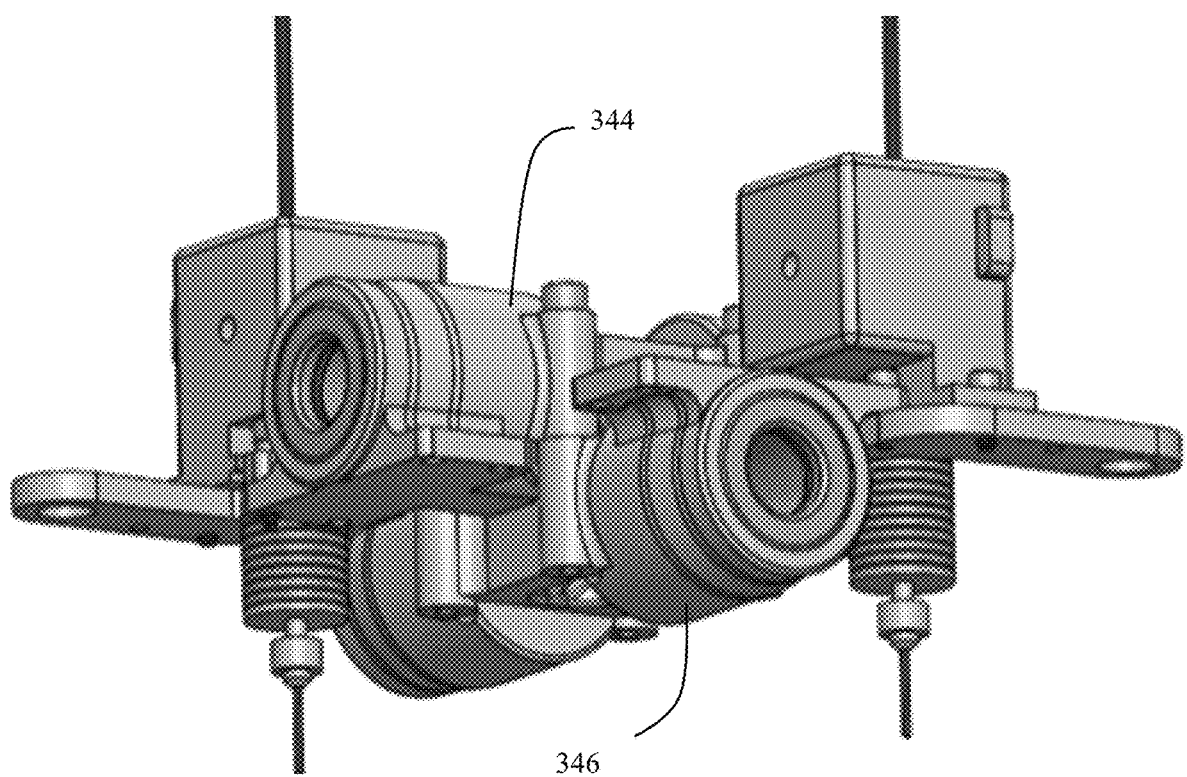
Figure 8C:
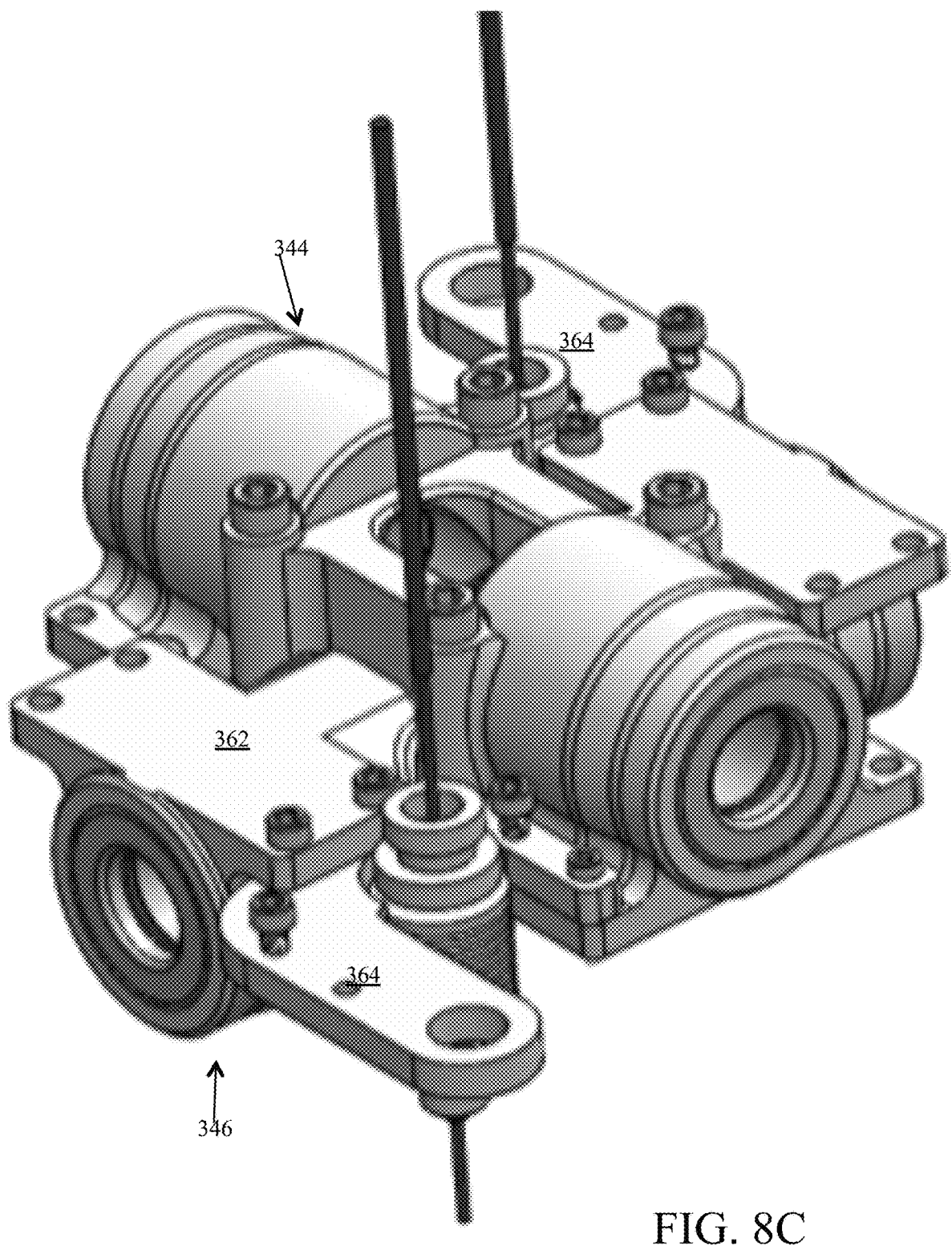
Figure 8D:
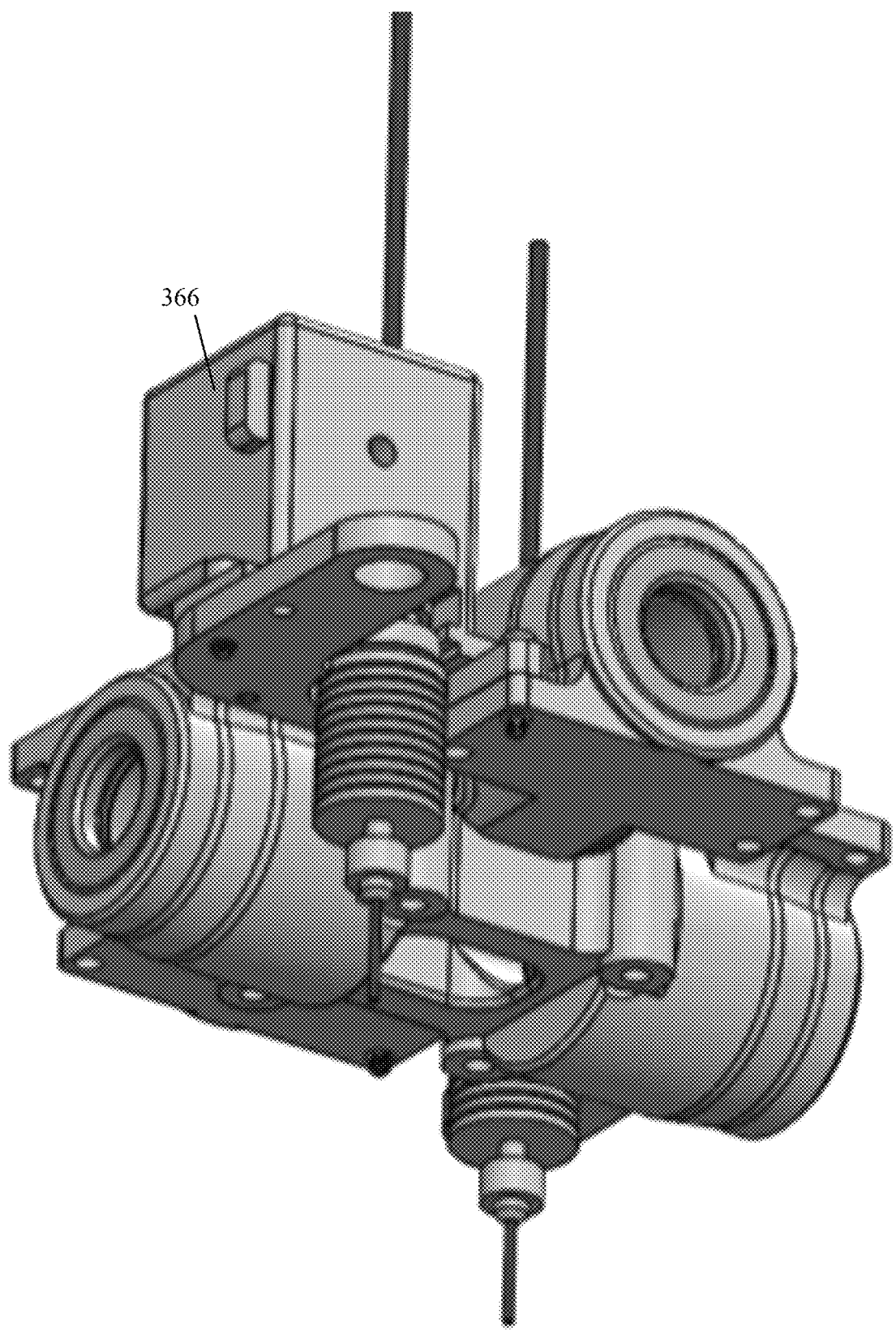
Figure 8E:
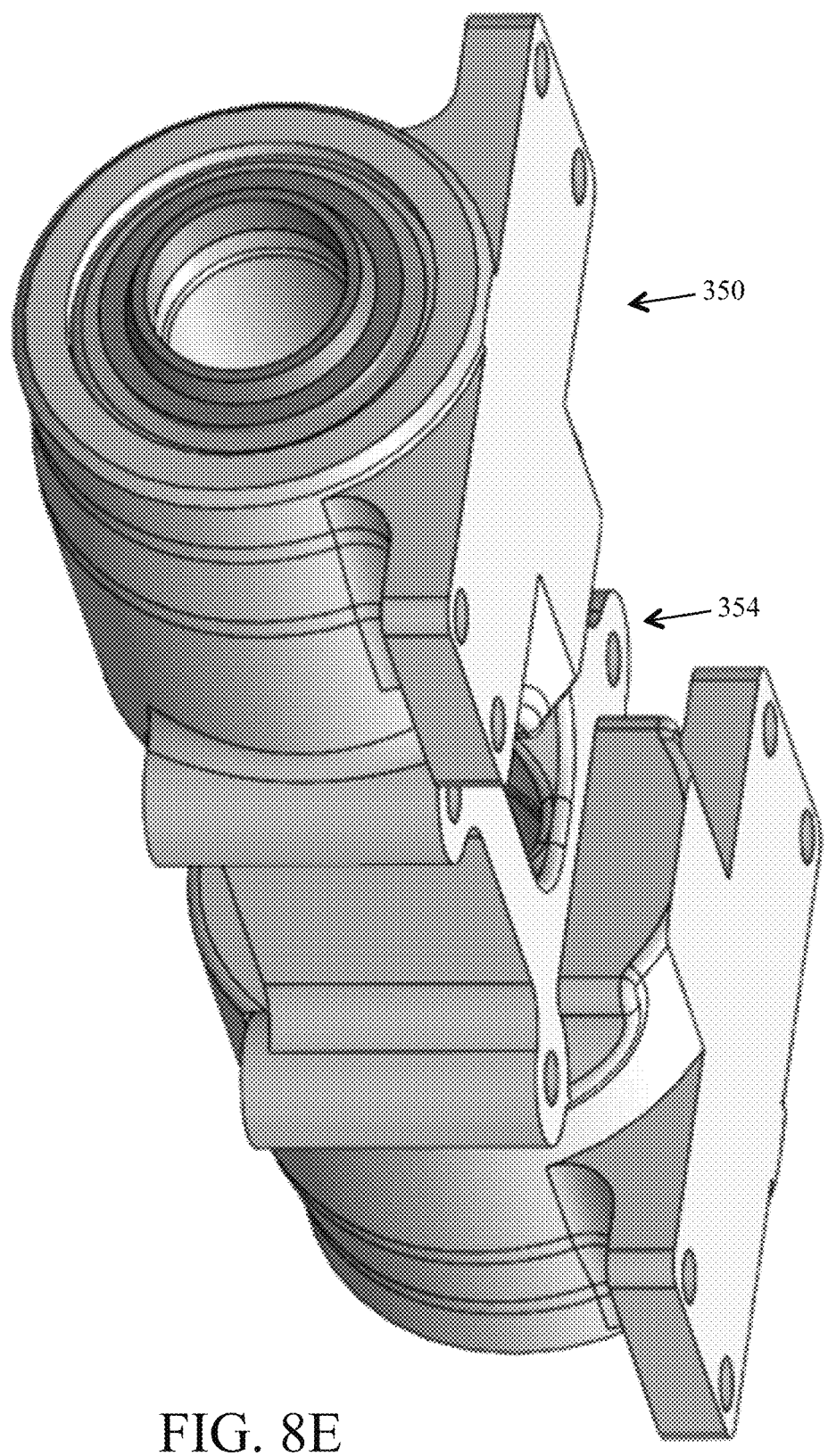
Figure 8F:
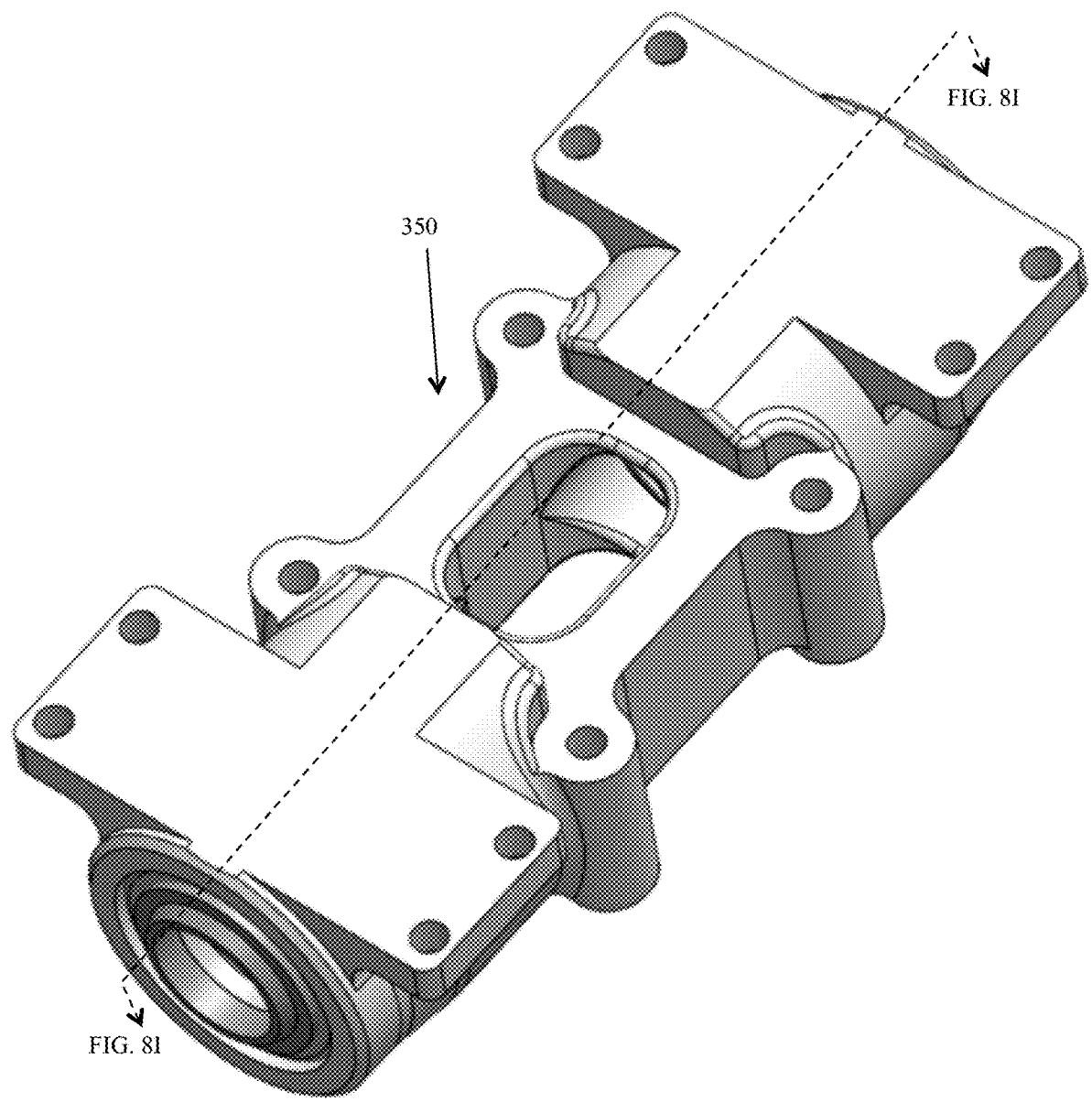
Figure 8G:
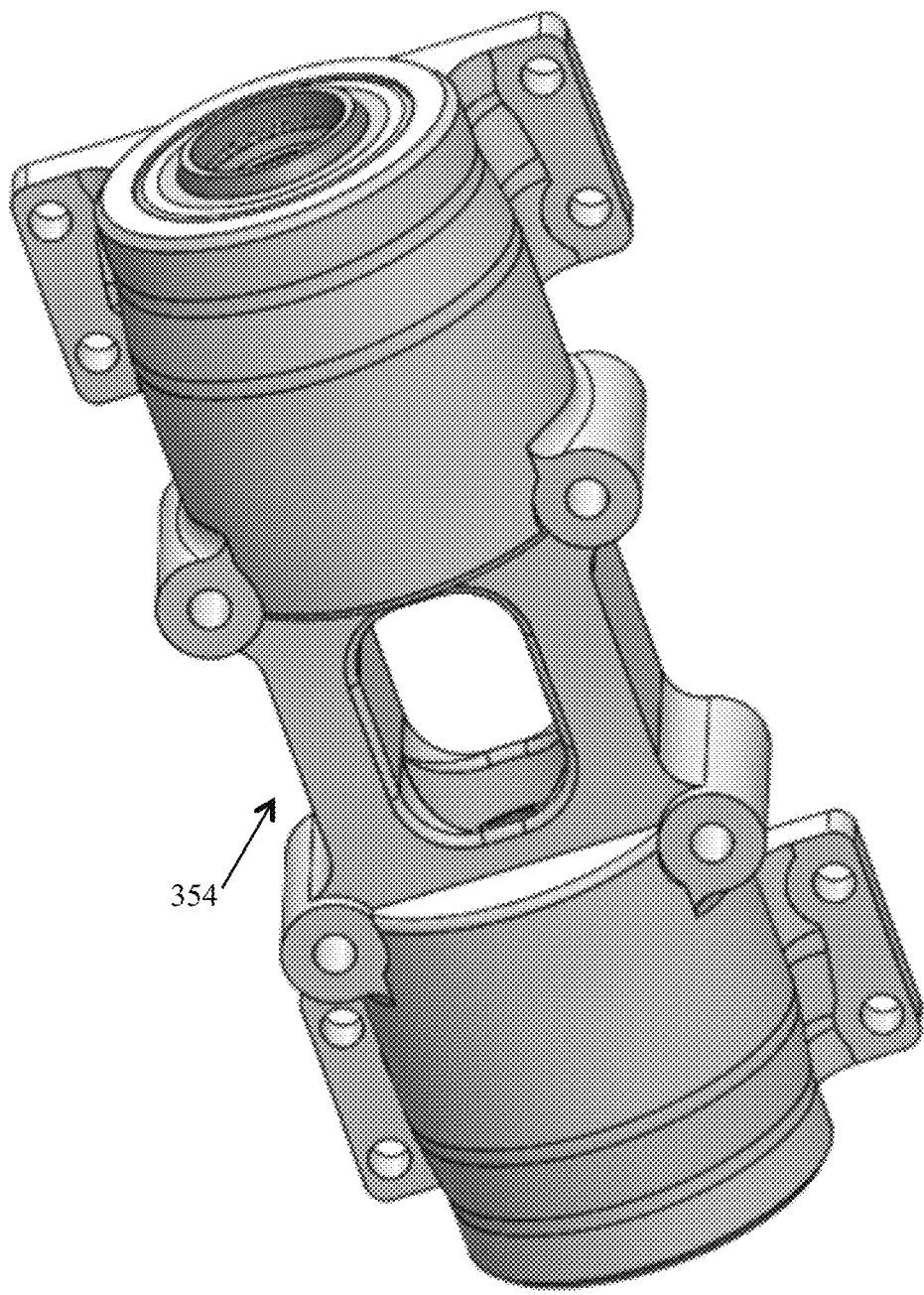
Figure 8H:
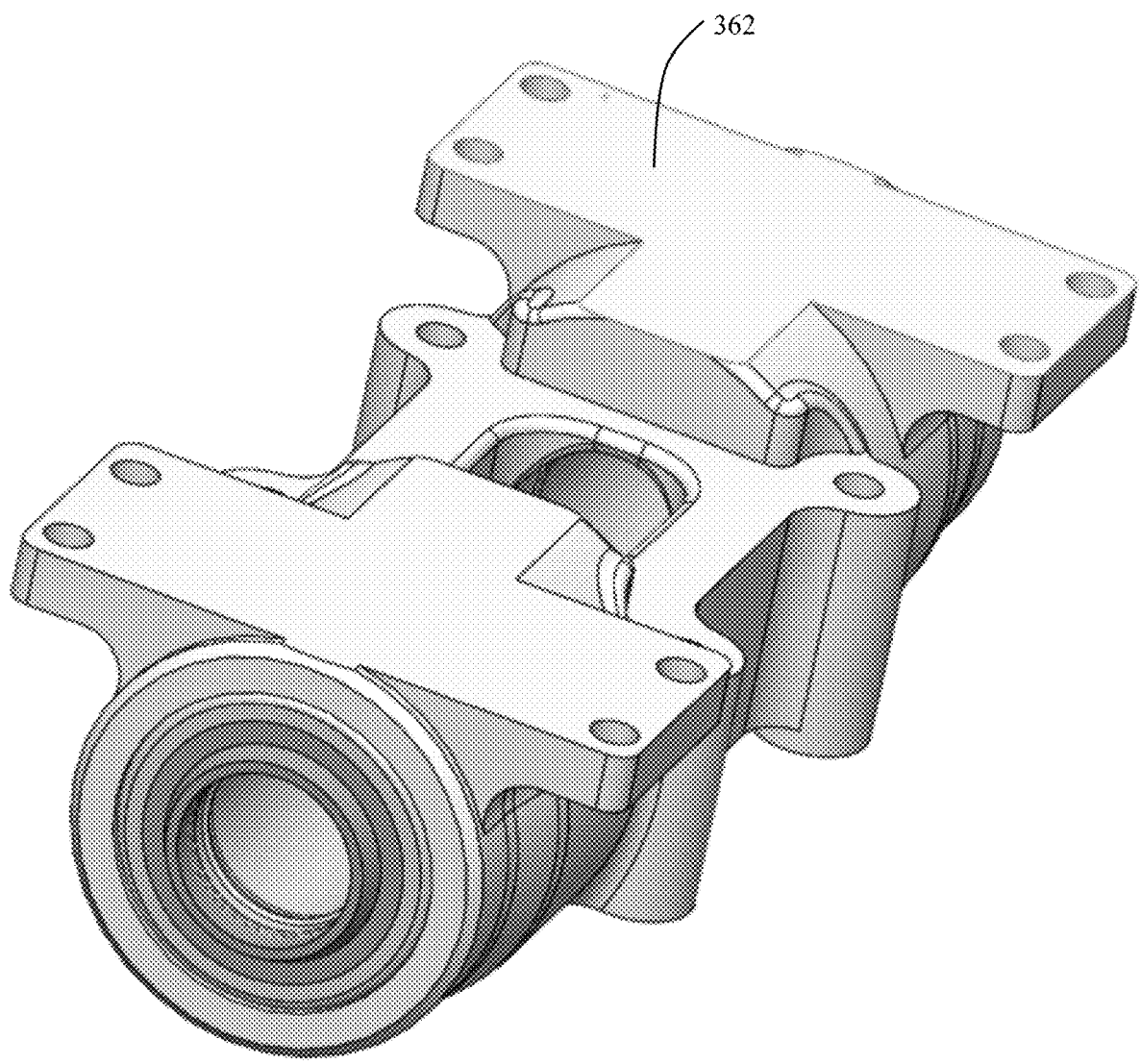
Figure 8I:
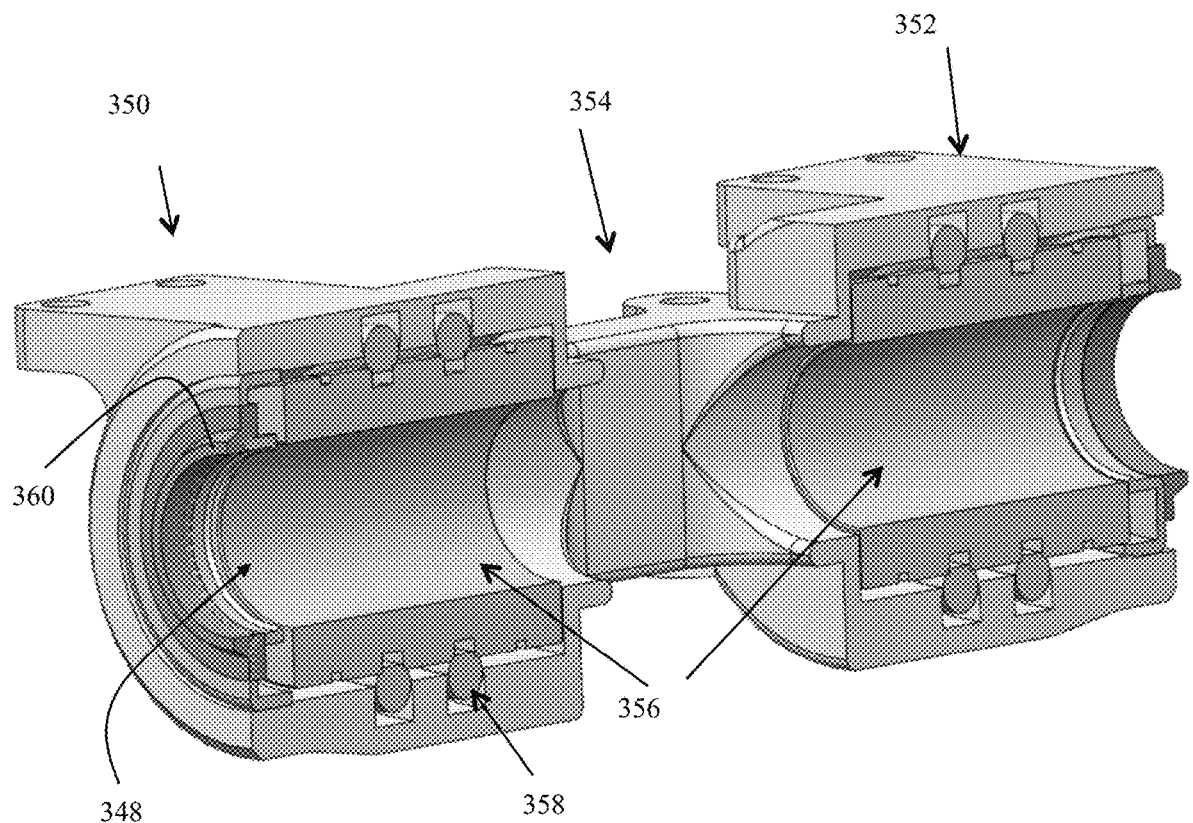

In FIG. 7K illustrates the incorrect engagement of pinion with rack gear. It should be noted that the gear shown rotating counterclockwise to engage against the flank of the gear tooth so as to cause movement to the left. Should the direction of rotation change to clockwise to cause movement to the right, the gap 382 I backlash between the teeth will result in imprecision of translation of the input signal from the control system to the correct location on the gear rack. Since the nature of 3D fabrication requires ongoing reversals of direction and acceleration and deceleration along the X- or Y-axes, any backlash will result in imprecision and therefore, reduced print quality.

As best illustrated in FIG. 7L, reduced backlash arrangement is achieved by preloading the arrangement through use of an elastic track which provides both an elastic load and also allows for minor deviations in gear engagement during motion. It should be noted that while controlling backlash is important, the use of a geared drive intrinsically limits backlash to a very small imprecision, by judicious selection of gear parameters such as the gears and gears with finer tooth spacing (pitch), most imprecision due to backlash may be controlled to an order of magnitude adequate to ensure acceptable quality.

As further detailed below, preloading the gears reduces the "clearance" or "dead zone" between cogs and hence, potential loss of motion, providing a more accurate positioning of moveable fabrication tool 118. However, the force applied for preloading must be sufficient that would substantially reduce backlash, but not jam the gears. It should be noted that the present invention does not use gears for power transmission, but location. That is, the gears are not required to power a tool through a workpiece, but instead are merely used to position moveable prefabrication tool 118 at a desired location. Accordingly, gears are preloaded for improved contact (meshing) of their respective cogs without jamming. The cogs may "rub" against each other, which may slow the speed at which the movable fabrication tool moves or even reduce the power transfer due to added friction, but the moveable prefabricated tool is light and does not require much power.

The present invention defines a load with its plain and ordinary meaning, which is an external mechanical resistance against which a machine (the motor) acts.

The present invention further defines the term "preload" with its plain and ordinary meaning, which is an intentionally and purposefully added or addition load independent of the external mechanical resistances against which a machine acts. In other words, in addition to normal or inherent external mechanical resistances (or loads), the motors must also have sufficient power to overcome the intentionally given or imposed load (i.e., the preload).

The present invention further defines the term backlash with its plain and ordinary meaning, which is a clearance or lost motion in a mechanism caused by gaps between the cogs of one gear and cogs of another gear. In other words, degrees of play between cogs—a mechanical form of a "deadband." As best shown in FIG. 7L, backlash is the amount of clearance between mated gear teeth. It can be seen when the direction of movement is reversed and the slack or lost motion is taken up before the reversal of motion is complete.

Well known threaded track rollers 312 with adjustable shoulder (also known as eccentric track rollers) may be used to preloading the X-direction motive force mechanism and the Y-direction motive force mechanism. The threaded track rollers 312 have shoulders that may be adjusted up or down to align to track 300, enabling uniform alignment among rollers 312 in a system. However, the present invention actually adjusts rollers 312 up or down to preload rollers 312 in relation to track 300 so to preload pinion 314 in relation to gear rack 286.

As rollers 312 are preloaded onto track 300, rollers 312 roll over track 300, which is a flat plastic strip with some elasticity. The elasticity effectively functions as a spring and therefore, when the axle of rollers 312 is oriented "downward" towards track 300, the contacting surfaces of roller 312 contact (press against) the flat top surface of plastic strip 300. This preloads pinion 314 in relation to gear rack 286. That is, the elastic nature of plastic strip track 300 functioning as a "spring" pushes "up" against the rollers' compression to "pull up" and preload pinion 314, pushed against in relation to gear rack 286. In other words, the compression of rollers 312 against the plastic strip (track 300) and the elasticity of track 300 functioning as a "spring" against the roller compression provide a mechanical biasing scheme that generate an increased holding or compression strength (hence facilitating "preloading") for the pinion and gear rack cogs. It should be noted that optionally, reducing a diameter of the pitch circle of the pinion would further improve and reduces backlash and as importantly, further granulate the amount of travel (linear travel) thus improving precision.

FIGS. 8A to 8I are non-limiting, exemplary illustrations of a moveable fabrication tool of the digital fabrication apparatus shown in FIGS. 1A to 7L in accordance with one or more embodiments of the present invention. As illustrated, the moveable fabrication tool 118 is comprised of a first support module 344 and a second support module 346 that are identical and that are cross-mounted.

First and the second support modules 344 and 346 are comprised of a cylindrical interior 348 that extends longitudinally for receiving link-shaft 324. First and the second support modules 344 and 346 further include first and second distal sections 350 and 352 and a cross-mount section 354 that connects first and second distal sections 350 and 352.

Cross-mount section 354 has a lower profile compared to first and second distal sections 350 and 352 to reduce vertical span of link-shafts 324 (for both X and Y) passing through respective first and the second support modules 344 and 346. Cross-mount section 354 forces link-shafts 324 (for both X and Y) to be perpendicularly oriented. That is, since link-shafts 324 have both a rotational as well as translational motion, the cross-mount section forces link-shafts 324 to remain perpendicular during operation. Cross-mount section 354 has fastener openings to enable secure connection of cross-mount sections 354 of first and the second support modules 344 and 346.

Distal portions of cylindrical interior 348 within first and second distal sections 350 and 352 include linear sleeve bearings 356 that support link-shaft 324, with linear sleeve bearings 356 circumferentially supported by O-rings 358. O-rings 358 are used to correctly compensate (by cushioning or deflections) for manufactured tolerances (potential shaft misalignments) of link-shafts 324, the first and the second support modules, and the rotational, translational, and axial motion of the link-shafts. In other words, the linear sleeve bearings 356 and the O-rings 358 maintain proper alignment or position of link-shafts 324 during operation for correct positioning of the moveable fabrication tool 118. As further illustrated, linear sleeve bearings 356 are retained within the first and second distal sections by a retaining cap 360 (a "dust" cap).

Mounted to exterior support section platforms 362 are filament drive adapters 364 for mounting a conventional filament drive. In general, filament drive adapters 364 may have configurations that would best accommodate largest number of different types of filament drivers 366. This way, users are not locked into using a specific brand or cartridge of filament 368 for fabrication. In the non-limiting exemplary instance, the filament drive adapter 364 is configured as a "C"-like shape with fastener openings to connect filament drive 366 to the exterior support section platforms 362 and allow for securing of filament drive 366 onto filament drive adapter 364. Other forms of filament drive adapter are contemplated such as an "L" shape or others.

Figure 9A:
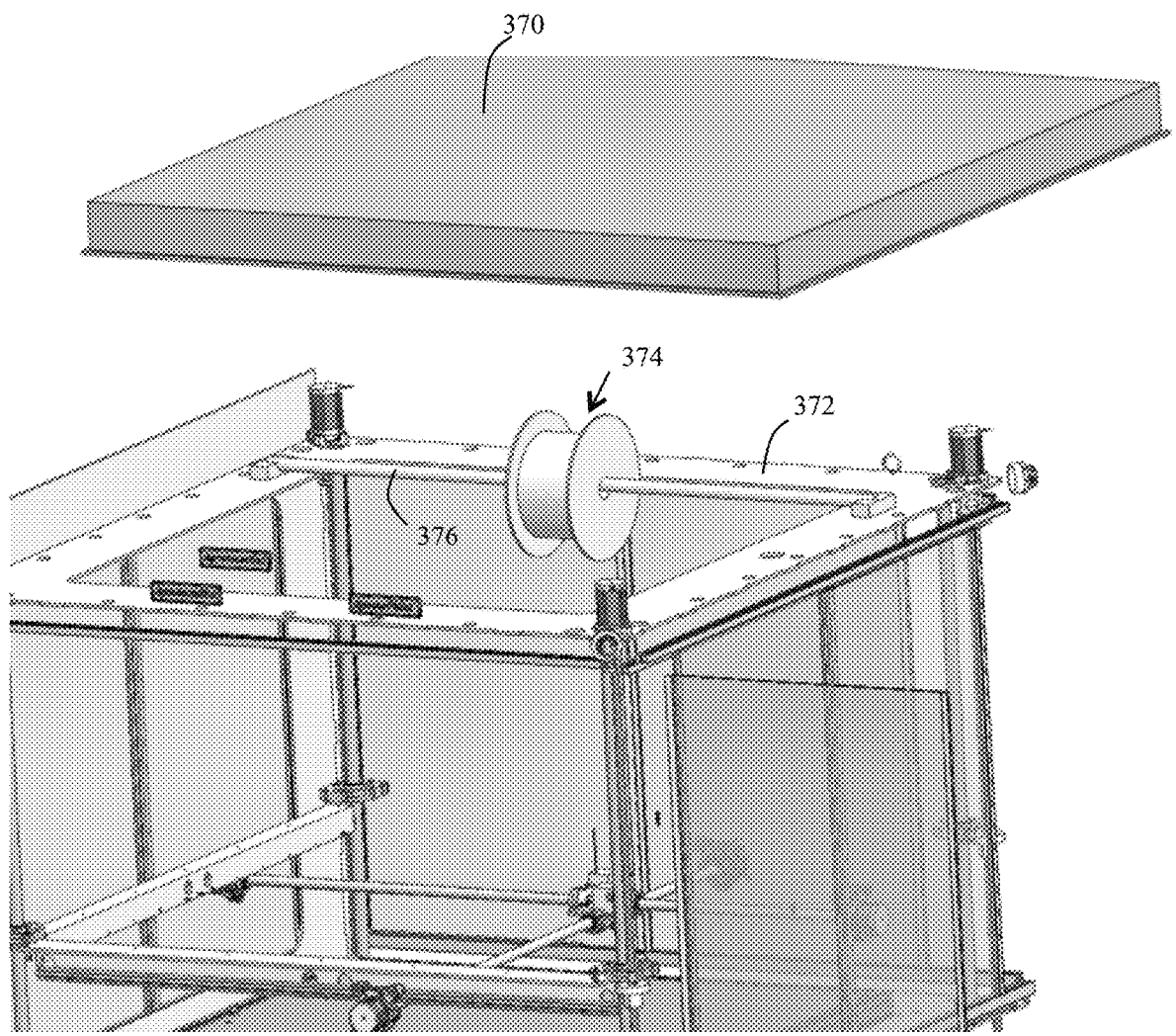
Figure 9B:
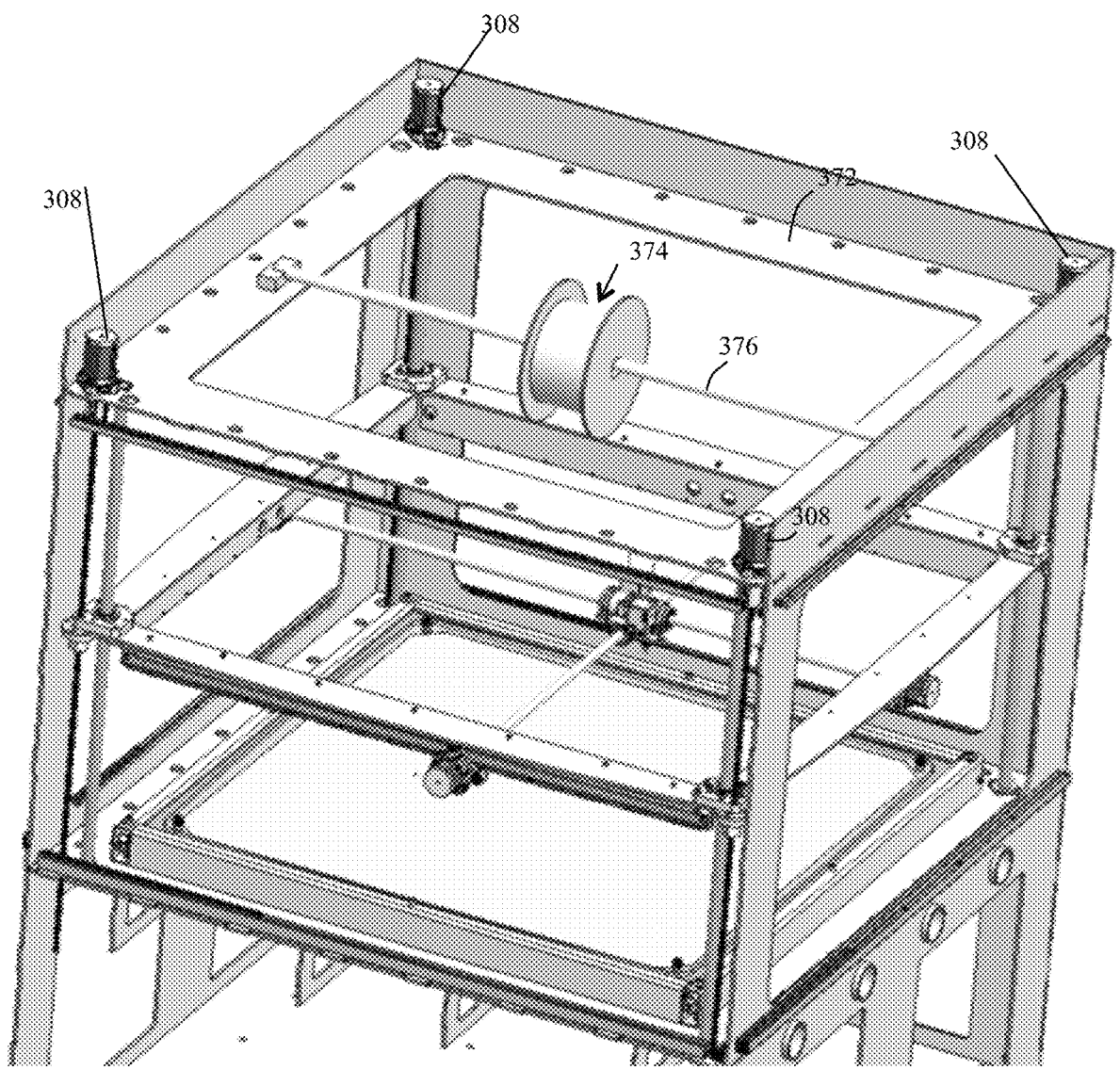
Figure 9C:
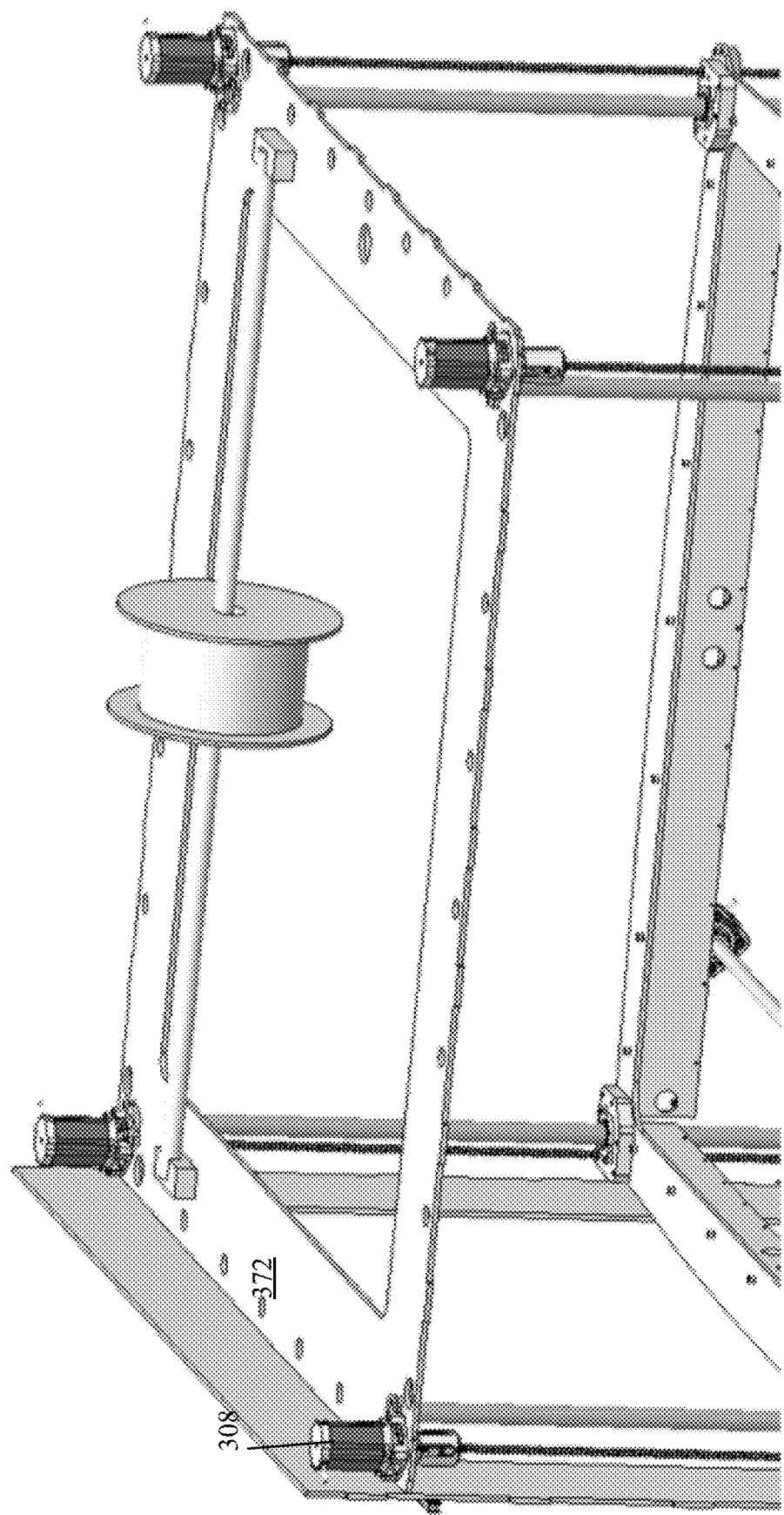
Figure 9D:
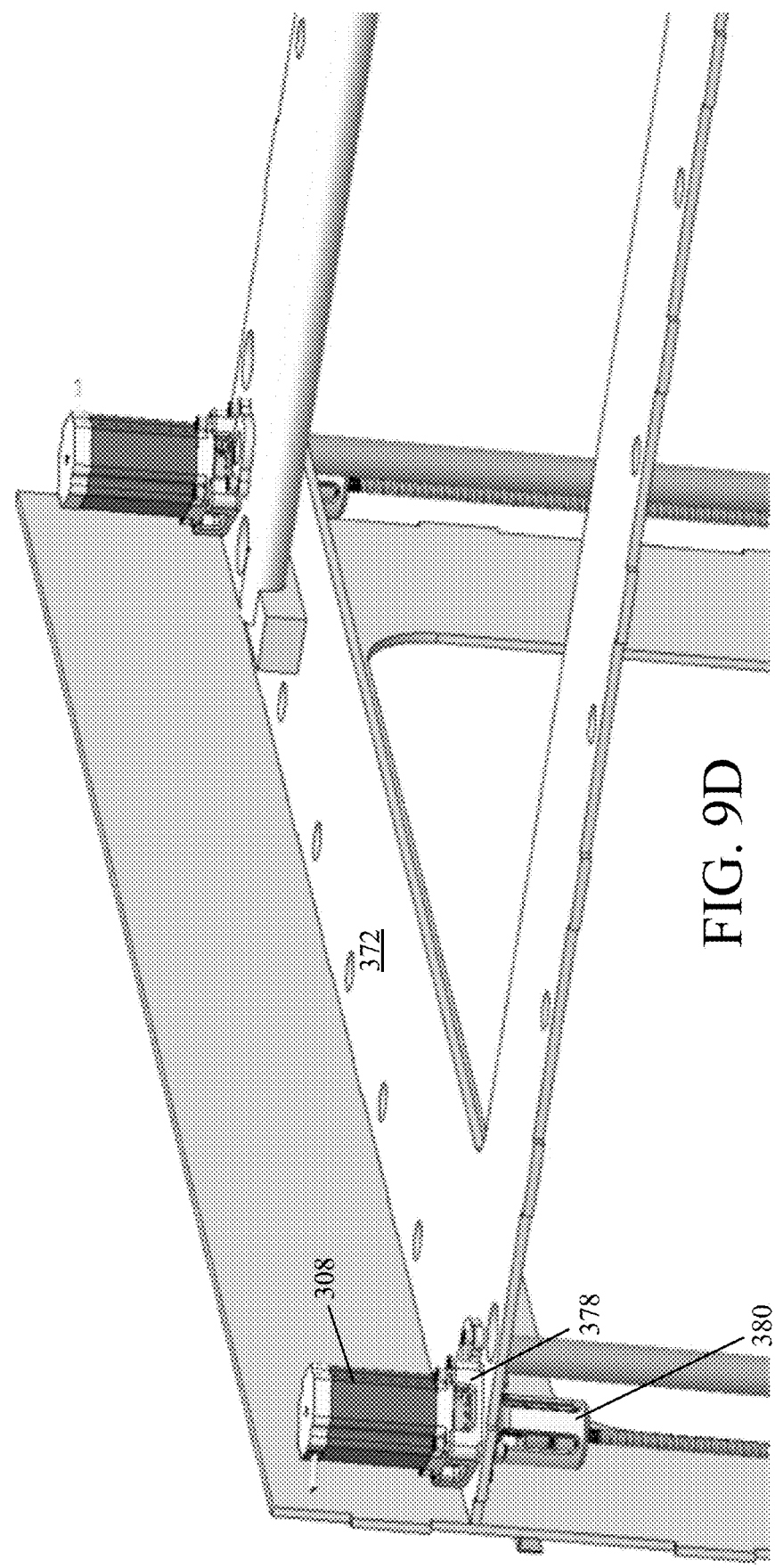
Figure 9E:
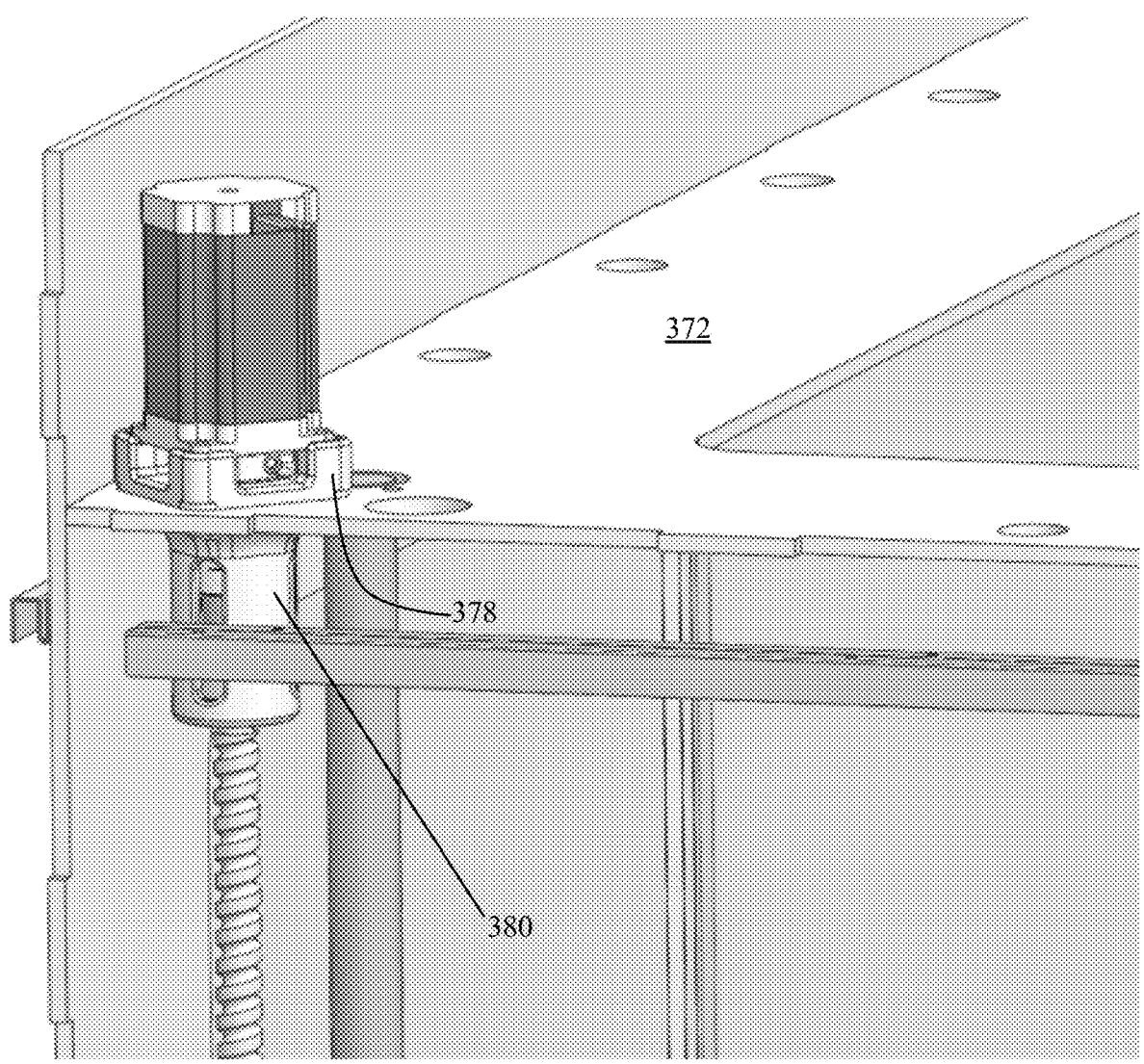
Figure 9F:
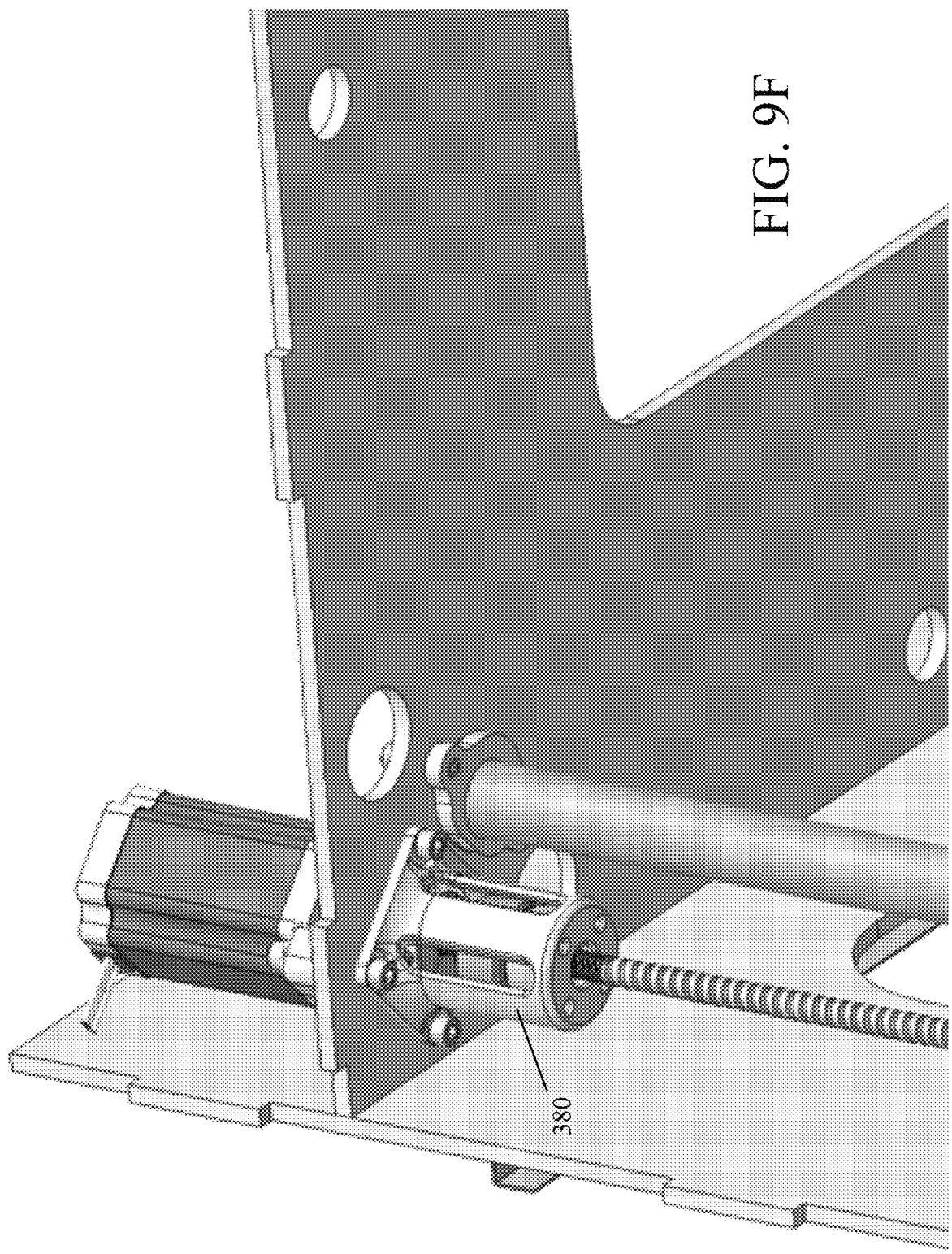
Figure 9G:
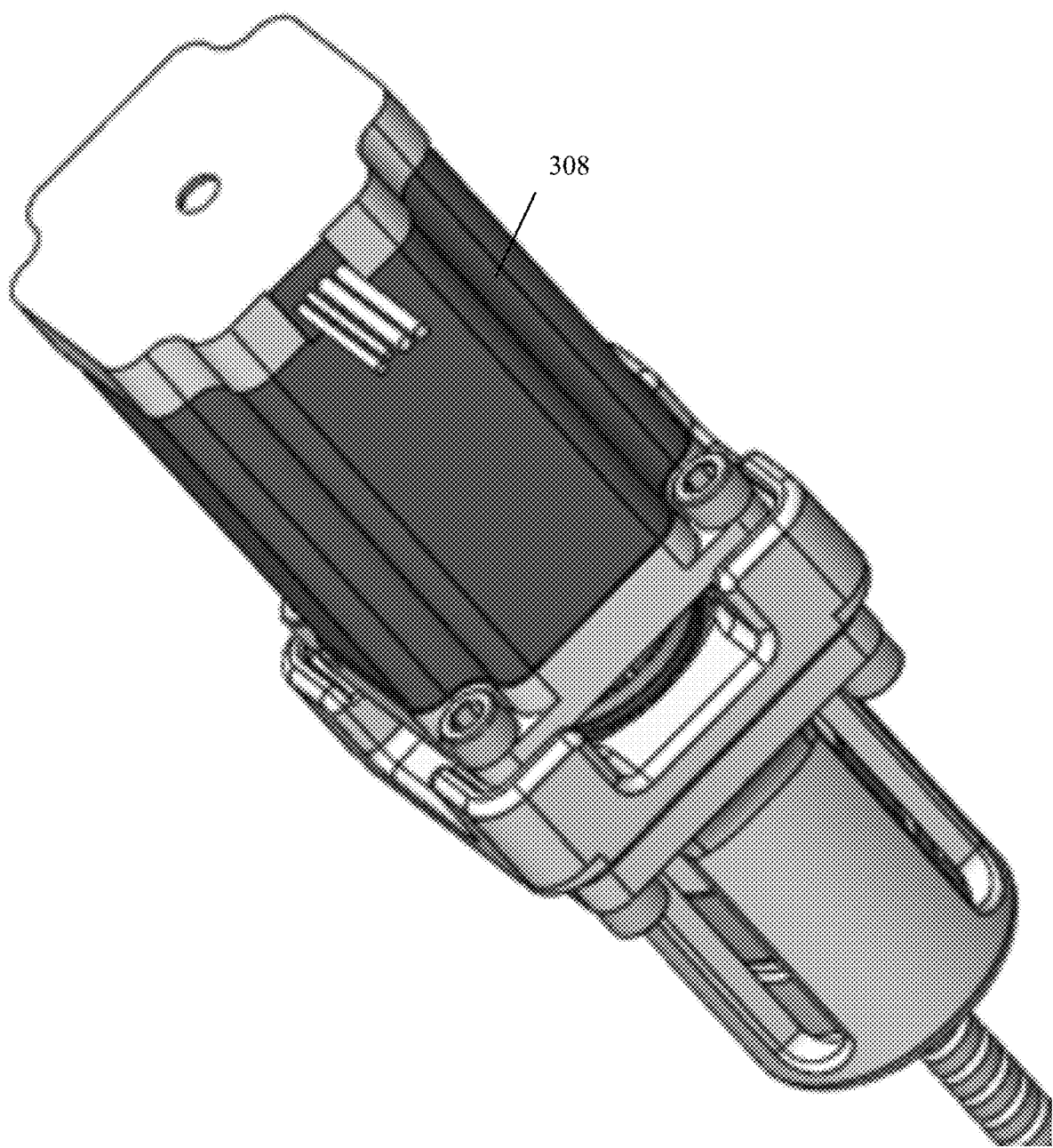
Figure 9H:
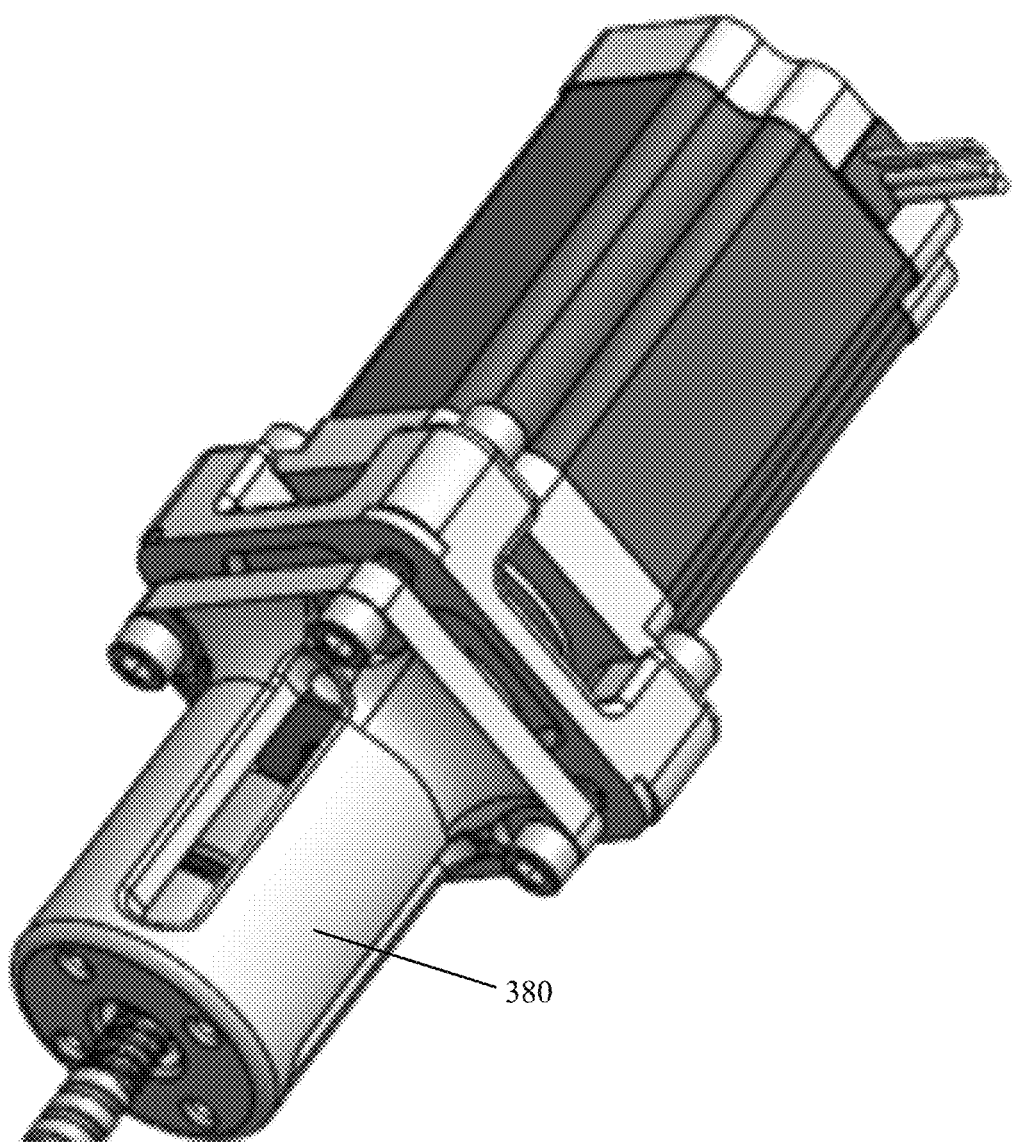
Figure 9I:
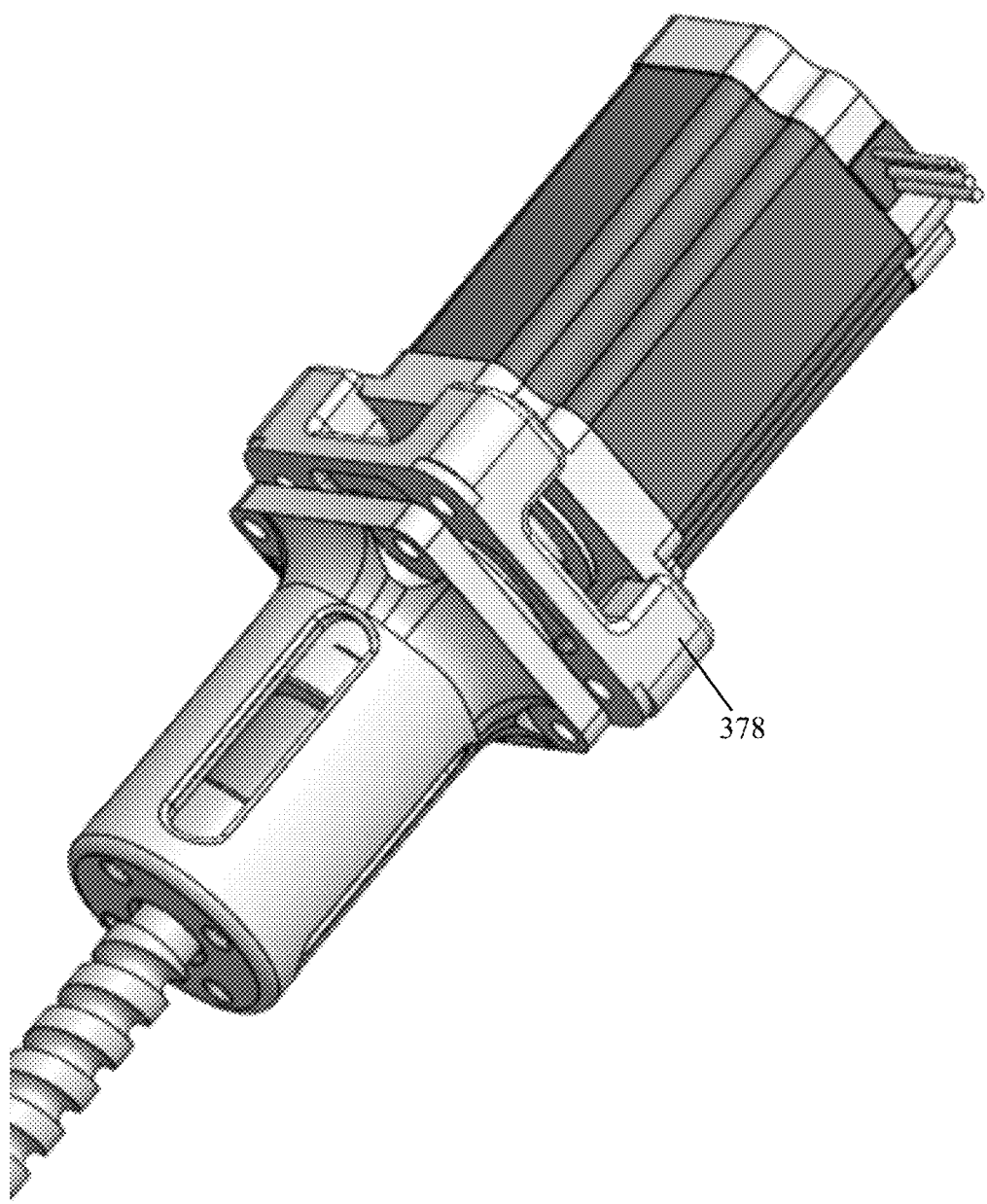
Figure 9J:
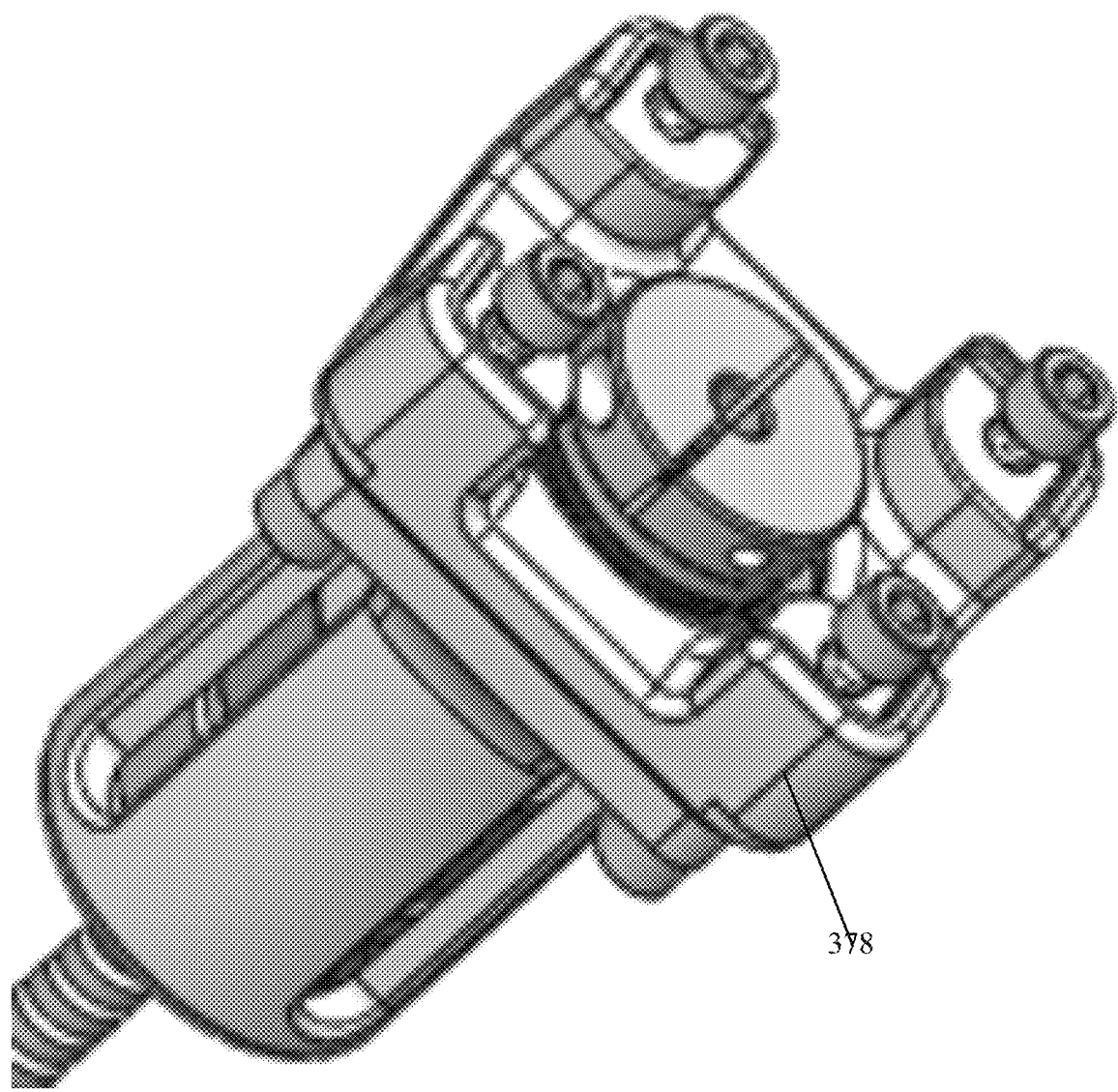
Figure 9K:
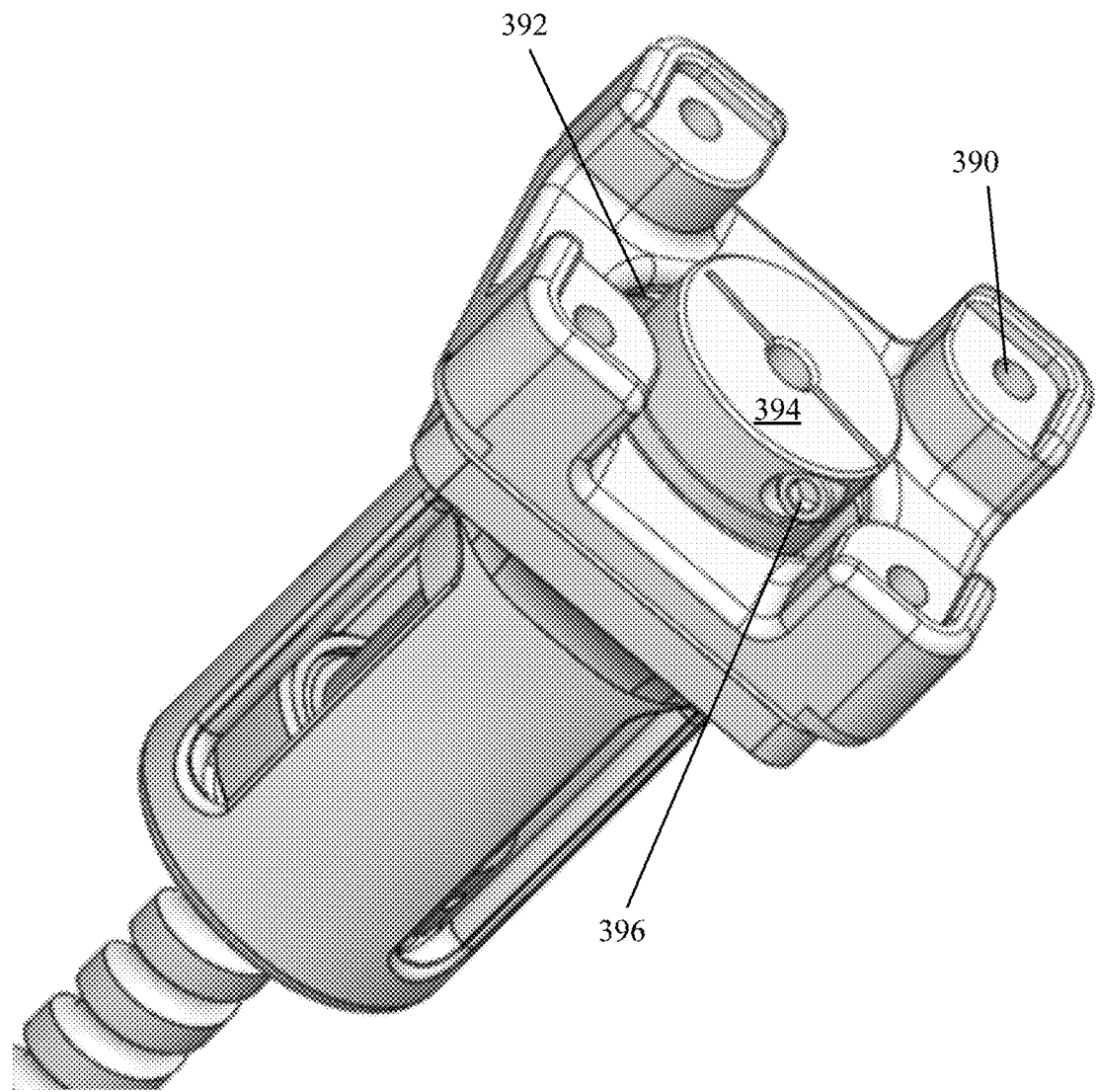
Figure 9L:
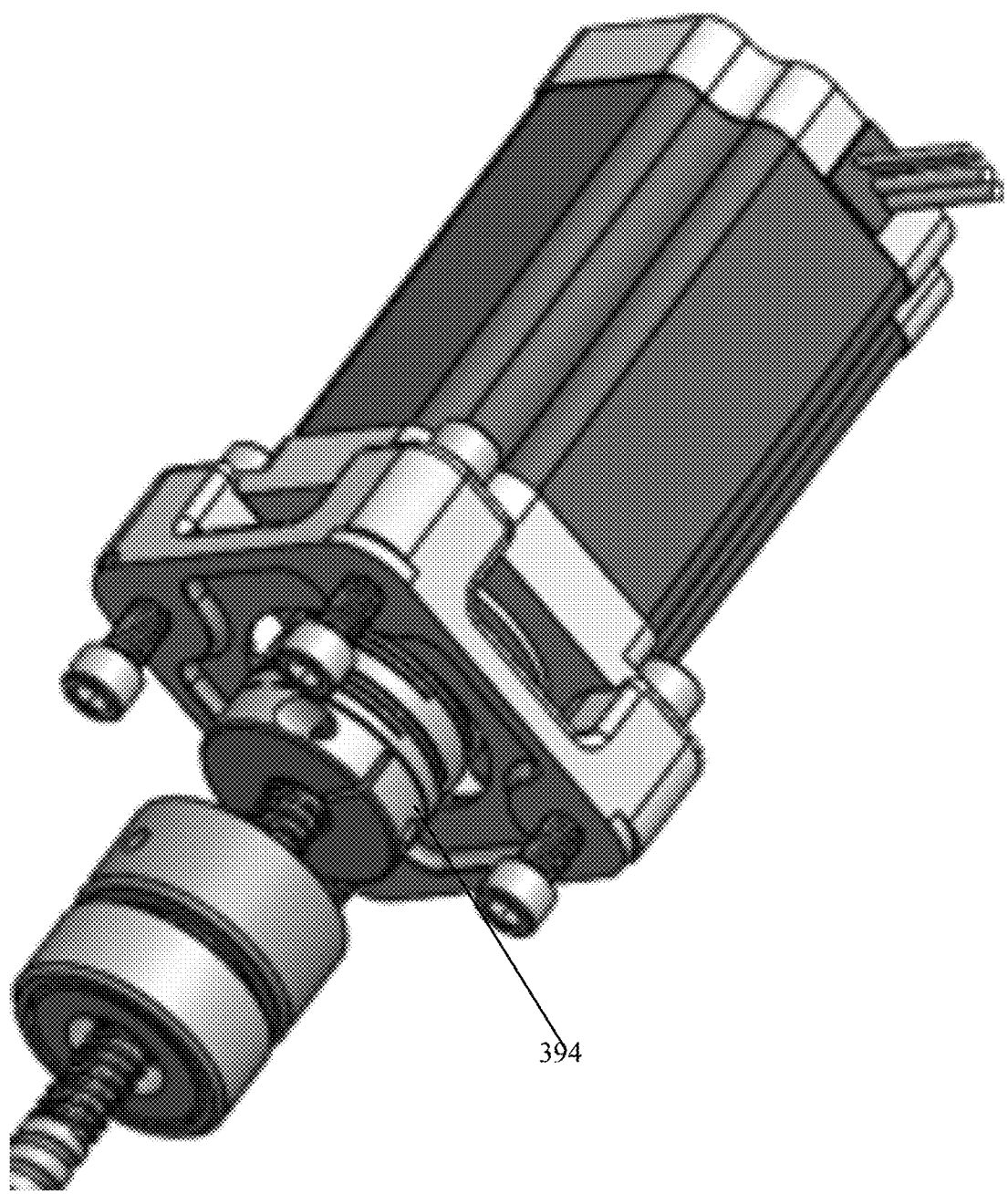
Figure 9M:
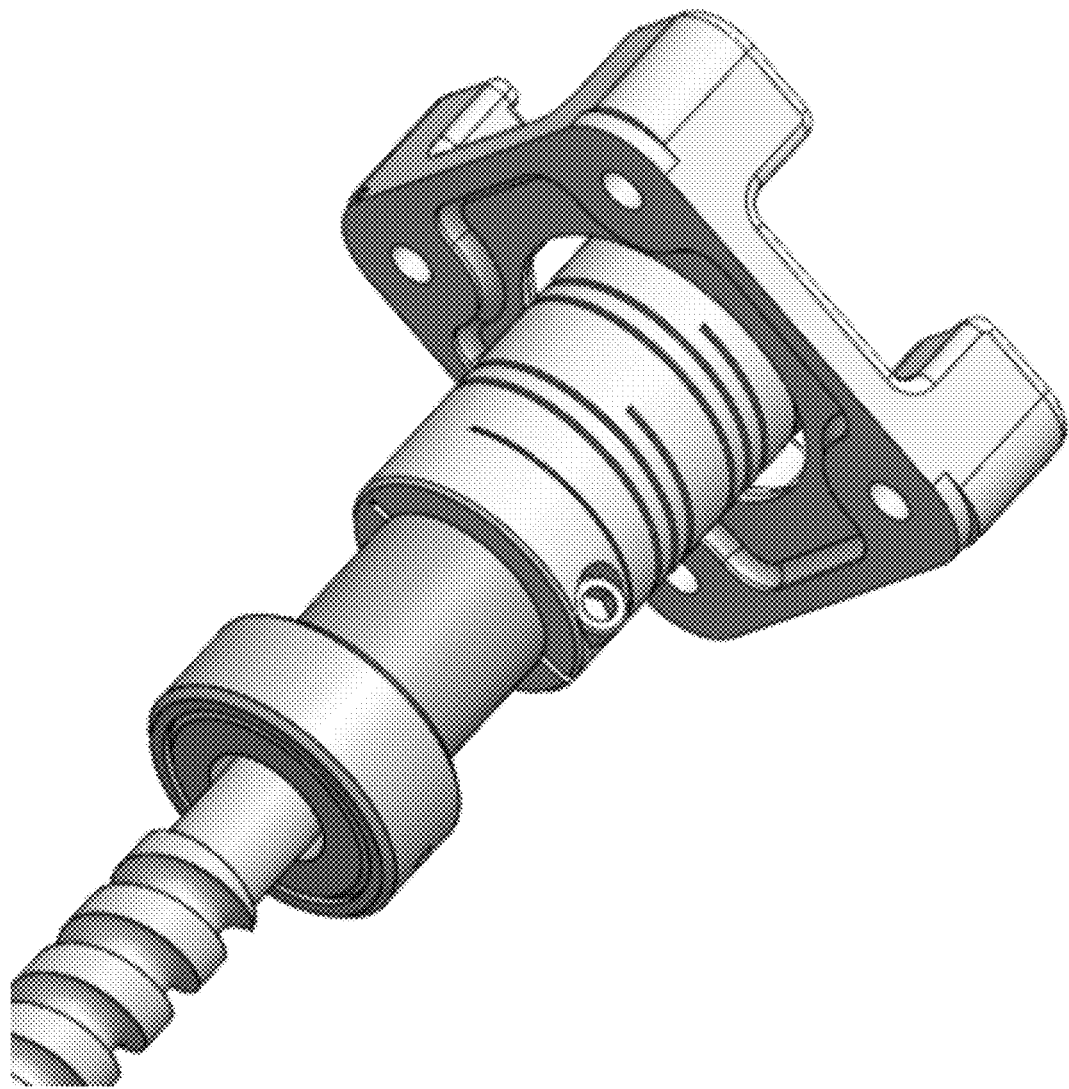
Figure 9N:
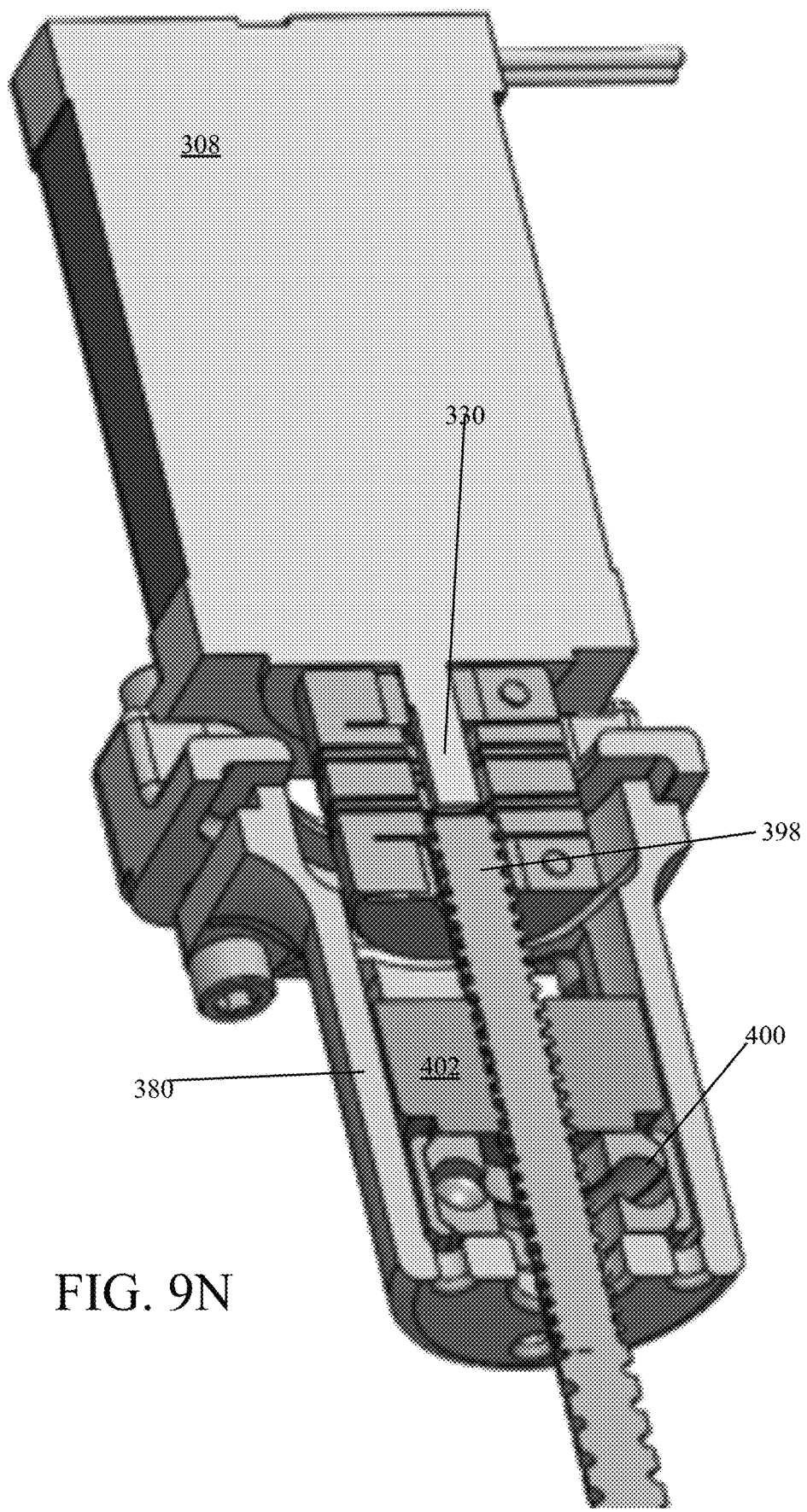

FIGS. 9A to 9N are non-limiting, exemplary illustrations of a top plate and Z-direction motive force mechanisms of the digital fabrication apparatus shown in FIGS. 1A to 8I in accordance with one or more embodiments of the present invention. As illustrated, top-section 108 includes a removable top closure (or the roof) 370 to provide a controlled environment (in terms of temperature, humidity, etc.) within mid-section 106 where the product is fabricated. The removable top closure 370 enables full access to the top and middle sections for initialization and setup of the workpiece platform assembly 162 and moveable fabrication tool 118. It should be noted that completed fabricated piece may also be removed from the top (if necessary) after removing the top closure.

As illustrated, digital fabrication apparatus 100 includes a third horizontally oriented member 136 as a top-plate 372. Top plate 372 is comprised of a single piece polygonal ledge (preferably square to mimic floor-plate 164 configuration) with openings that are aligned with floor plate 164 openings for guide bars 196 to ensure parallel orientation of guide bars 196. This is further facilitated by the tab/slot connectivity scheme described above.

As further illustrated, filament 368 is wound on a spool 374 that is supported on an axel 376, which is connected to top plate 372. Spool 374 is free to move or slide laterally along the longitudinal axis of axel 376 as filament 368 is fed to moveable fabrication tool 118. There is always sufficient slack of filament 368 that allows moveable fabrication tool 118 to move freely. It should be noted that instead of a stationary axel 376, the distal ends thereof may be associated with rollers accommodated on tracks on the top plate. Further, two different spools 374 (on the same axel 376) with two different types of filaments 368 may be used to feed two different types of filament drivers 366.

As indicated above, the Z-direction motive force mechanism enables Z-direction translational motion of movable fabrication tool 118. Z-direction motive force mechanism is comprised of four Z-motors 308 and one Z-motor driver (located with other X and Y drivers). The Z-motors 308 are secured onto respective four foundation-adapters 378 that are connected to four corners of top surface of top plate 372 and to respective four axial load-bearing housings 380, which are connected to the respective four foundation-adapters 378 from a bottom surface of top plate 372.

The four foundation-adapters 378 include raised openings 390 where the Z-motor rests and is secured, and a central opening 392 that accommodates flexible coupler 394 (e.g., a helically flexible shaft coupler). The raised openings 390 accommodate the upper portion of the flexible coupler 394 and also enable access to the clamping fastener 396 of flexible coupler 394.

Four flexible couplers 394 connect motor output shaft 330 and the distal end 398 of threaded rods 262 together so that as the motor output shaft 330 rotates, it rotates threaded rod 262, which, in turn, raises or lowers movable position frame 234. Helical flexible shaft couplers 394 compensate for shaft misalignments such as angular, off-center, and axial (it literally stretch along Z direction) by being flexible.

Axial load-bearing housing 380 carries the weight of movable positioning frame 234 and includes a thrust bearing 400 for supporting an axial load carried by the threaded rod 262 (one distal end of which is connected to the threaded nut 276/384, which upholds movable position frame). Axial load-bearing housing 380 also includes a boss 402 that includes a set screw that is used to attach boss 402 to threaded rod 262.

Boss 402 rests and provides axial load on a top of the thrust bearing 400, with a top piece of thrust bearing 400 rotating while a bottom piece of thrust bearing 400 is stationary and in full contact with an interior bottom surface of axial load-bearing housing 380 to thereby enable axial load bearing support while allowing rotation of the threaded rod. As is well known, a thrust bearing is a particular type of rotary bearing that is designed to support a predominately axial load.

To set a common Z-point within a single XY-plane for all Z-direction motive force mechanisms, the nozzle of the moveable fabrication tool is lowered to various points on the work-surface of the work-layer member of the workpiece platform assembly, with gaps therebetween nozzle and surface measured by a feeler gage. Thereafter, the chassis is adjusted by simply rotating the appropriate threaded rod of the specific Z motor is misaligned (the nozzle does not position within the XY plane. As with XY motors, all signals to all Z-motors are synchronized to synchronously rotate all four threaded rods and hence, move the moveable fabrication tool along the Z-direction perpendicular the XY plane of the work-surface.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Further, the specification is not confined to the disclosed embodiments. Therefore, while exemplary illustrative embodiments of the invention have been described, numerous variations and alternative embodiments will occur to those skilled in the art. For example, work tool can be a router or similar machining tool; a laser or similar etch or marking tool; employ a digital device for measuring a body placed on the work surface for purposes of discovering the shape of such body (reverse engineering)' can be employed to simultaneously produce multiple workpieces. Such variations and alternate embodiments are contemplated, and can be made without departing from the spirit and scope of the invention.

It should further be noted that throughout the entire disclosure, the labels such as left, right, front, back, top, inside, outside, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction, orientation, or position. Instead, they are used to reflect relative locations/positions and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

Further the terms "a" and "an" throughout the disclosure (and in particular, claims) do not denote a limitation of quantity, but rather denote the presence of at least one of the referenced item.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:

1. A digital fabrication apparatus, comprising:
   a frame having a frame longitudinal axis and a frame transverse axis;
   first frame members that are parallel the frame longitudinal axis, forming vertically, oriented frame members that form the sides of the frame;
   second frame members that are parallel the frame transverse axis, forming horizontally oriented frame members;
   one of the first frame members and the second frame members include a plurality of frame connection slots and an other of the second frame members and the first frame members include a plurality of frame connection tabs;
   wherein: a frame connection tab of the plurality of connection tabs includes:
   a flange that extends from a periphery of the one of the first frame members and the second frame members and is inserted and fixed into a frame connection slot of the plurality of frame connection slots;
   interconnection and fixing of the frame connection tabs and frame connection slots constraint the movement of vertical and horizontal frames, providing rigidity;

wherein: combination of vertically oriented frame members and horizontally oriented frame members sectionalize the frame, forming frame sections.

2. The digital fabrication apparatus as set forth in claim 1, wherein:
the frame includes removable window panels that move along a reciprocating path from a fully closed to a fully open position on window sill and window header rails.

3. The digital fabrication apparatus as set forth in claim 2, wherein:
the frame further includes a horizontally oriented member as a floor-plate assembly that is mechanically connected to the vertically oriented frame members, with a floor plate of the floor plate assembly defining coordinates of a work surface;
wherein: the floor plate assembly does not move, is stationary, and fixed at a position.

4. The digital fabrication apparatus as set forth in claim 3, wherein:
the floor-plate assembly supports and stiffens a stationary fixed workpiece platform assembly.

5. The digital fabrication apparatus as set forth in claim 3, wherein:
the floor plate is comprised of:
a plurality of openings that define thermal expansion openings.

6. The digital fabrication apparatus as set forth in claim 5, wherein:
thermal expansion openings are oriented and positioned to allow for in-plane thermal expansion of a workpiece platform assembly.

7. The digital fabrication apparatus as set forth in claim 6, wherein:
the workpiece platform assembly is secured onto the floor-plate to enable in-plane thermal expansion of the workpiece platform assembly while preventing movement of the workpiece platform assembly parallel along the frame longitudinal axis.

8. The digital fabrication apparatus as set forth in claim 6, wherein:
the workpiece platform assembly is heated.

9. The digital fabrication apparatus as set forth in claim 6, wherein:
the workpiece platform assembly is comprised of:
a diffuser plate;
a thermally conductive pad associated with a top surface of the diffuser plate;
a work-layer member that includes the working-surface, with the work-layer positioned onto a top surface of the thermally conductive pad.

10. The digital fabrication apparatus as set forth in claim 1, further comprising:
a positioning system for moving and positioning a movable fabrication tool at a desired location within a three-dimensional space.

11. The digital fabrication apparatus as set forth in claim 10, wherein:
the positioning system includes:
a movable positioning frame supports the movable fabrication tool.

* * * * *